(12) United States Patent
Pouchak

(10) Patent No.: US 7,738,972 B2
(45) Date of Patent: Jun. 15, 2010

(54) MODULAR SHARED-MEMORY RESOURCE STAGE DRIVER SYSTEM FOR FLEXIBLE RESOURCE LINKING IN AN ENERGY CONVERSION SYSTEM

(75) Inventor: Michael A. Pouchak, Saint Anthony, MN (US)

(73) Assignee: Honeywell International Inc., Morristown, NJ (US)

( * ) Notice: Subject to any disclaimer, the term of this patent is extended or adjusted under 35 U.S.C. 154(b) by 476 days.

(21) Appl. No.: 11/770,668

(22) Filed: Jun. 28, 2007

(65) Prior Publication Data

US 2008/0009956 A1 Jan. 10, 2008

Related U.S. Application Data

(63) Continuation-in-part of application No. 11/670,911, filed on Feb. 2, 2007, and a continuation-in-part of application No. 11/620,431, filed on Jan. 5, 2007, now Pat. No. 7,653,459, and a continuation-in-part of application No. 11/564,797, filed on Nov. 29, 2006, and a continuation-in-part of application No. 11/427,750, filed on Jun. 29, 2006.

(51) Int. Cl.
G05B 11/01 (2006.01)
(52) U.S. Cl. ............... 700/11; 700/16; 700/22; 700/23; 700/286; 700/291
(58) Field of Classification Search ........... 700/11, 700/18, 23, 276; 717/109; 703/22; 219/486
See application file for complete search history.

(56) References Cited

U.S. PATENT DOCUMENTS

| | | | |
|---|---|---|---|
| 4,654,653 A | 3/1987 | Brindle et al. | |
| 4,723,513 A | 2/1988 | Vallett et al. | |
| 4,784,580 A | 11/1988 | Takata et al. | |
| 4,793,800 A | 12/1988 | Vallett et al. | |
| 5,225,974 A * | 7/1993 | Mathews et al. | 700/11 |
| 5,416,908 A * | 5/1995 | DiCarlo et al. | 710/34 |
| 5,449,319 A | 9/1995 | Dushane et al. | |
| 5,479,812 A | 1/1996 | Juntunen et al. | |
| 5,605,280 A | 2/1997 | Hartman | |
| 5,774,355 A * | 6/1998 | Mizuno et al. | 700/23 |
| 5,778,368 A | 7/1998 | Hogan et al. | |

(Continued)

OTHER PUBLICATIONS

Echelon, "ShortStack Developer's Kit Model 23400," 3 pages, 2002.

(Continued)

*Primary Examiner*—Ramesh B Patel
*Assistant Examiner*—Dave Robertson
(74) *Attorney, Agent, or Firm*—Crompton Seager & Tufte LLC

(57) ABSTRACT

A system for optimizing usage of energy converting stages. It may have a stage driver, and stage driver adds as needed. The system may control the on-times of the stages according to a pattern that optimizes energy usage, processing and memory. The pattern may control the stages according to lead lag, rotating or runtime. The pattern may incorporate modulating. The system may be scalable and have a small memory footprint. The system may be implemented with function blocks of a function block engine. Network variables may be incorporated for input and output connections of the system.

12 Claims, 44 Drawing Sheets

U.S. PATENT DOCUMENTS

| | | | |
|---|---|---|---|
| 5,989,020 A | 11/1999 | Glass et al. | |
| 6,008,805 A | 12/1999 | Land et al. | |
| 6,029,092 A * | 2/2000 | Stein | 700/11 |
| 6,272,400 B1 | 8/2001 | Jankins et al. | |
| 6,301,509 B1 * | 10/2001 | Obata | 700/11 |
| 6,330,806 B1 | 12/2001 | Beaverson et al. | |
| 6,428,312 B1 | 8/2002 | Smelcer et al. | |
| 6,453,687 B2 | 9/2002 | Sharood et al. | |
| 6,536,678 B2 | 3/2003 | Pouchak | |
| 6,549,826 B1 | 4/2003 | Pouchak et al. | |
| 6,615,404 B1 | 9/2003 | Garfunkel et al. | |
| 6,619,951 B2 | 9/2003 | Bodnar et al. | |
| 6,694,926 B2 | 2/2004 | Baese et al. | |
| 6,745,085 B2 * | 6/2004 | Pouchak | 700/21 |
| 6,779,048 B2 * | 8/2004 | Seki et al. | 710/15 |
| 6,813,631 B2 * | 11/2004 | Pouchak et al. | 709/203 |
| 6,831,257 B2 * | 12/2004 | Walker | 219/486 |
| 6,832,120 B1 | 12/2004 | Frank et al. | |
| 6,934,862 B2 | 8/2005 | Sharood et al. | |
| 7,120,908 B1 | 10/2006 | Klimchynski | |
| 7,124,163 B2 | 10/2006 | Geofroy et al. | |
| 7,209,870 B2 * | 4/2007 | Simmons et al. | 703/1 |
| 7,424,329 B2 * | 9/2008 | McKelvey et al. | 700/18 |
| 7,490,138 B2 * | 2/2009 | Crater et al. | 709/219 |
| 7,555,364 B2 * | 6/2009 | Poth et al. | 700/276 |
| 2003/0158975 A1 | 8/2003 | Frank et al. | |
| 2003/0159129 A1 | 8/2003 | Frank et al. | |
| 2004/0144849 A1 | 7/2004 | Ahmed | |
| 2004/0238653 A1 | 12/2004 | Alles | |
| 2004/0267515 A1 * | 12/2004 | McDaniel et al. | 703/22 |
| 2005/0230490 A1 * | 10/2005 | Pouchak et al. | 237/81 |
| 2006/0020350 A1 * | 1/2006 | Khanchin | 700/11 |
| 2007/0225829 A1 * | 9/2007 | Abe | 700/11 |
| 2007/0255536 A1 * | 11/2007 | Simmons et al. | 703/1 |
| 2009/0062932 A1 * | 3/2009 | Caldwell et al. | 700/11 |
| 2009/0076779 A1 * | 3/2009 | Simmons et al. | 703/1 |

OTHER PUBLICATIONS

Echelon, "Echelon ShortStack Micro Server Answers to Frequently Asked Questions," pp. 1-5, Apr. 2002.

Echelon, "ShortStack Overview," 12 pages, prior to Nov. 29, 2006.

Echelon, "ShortStack User's Guide, Version 2" 152 pages, Mar. 2002.

Honeywell, "T7770A,B,C,D,E,F,G, Wall Modules, Excel 5000 Open System," pp. 1-4, 1997.

"LonMark Functional Profile: VAV Controller (VAV)," pp. 1-19, 1996.

* cited by examiner

| SimTime | ADD1.y | nviIn3. | Tag1_4. | LIMIT8.y | LIMIT12.y | SQRT8.y | MUL10.y |
|---|---|---|---|---|---|---|---|
| 11 | 17 | 2 | 17 | 10 | 17 | 4.123106 | 8 |
| 21 | 27 | 2 | 27 | 20 | 27 | 5.196152 | 8 |
| 31 | 37 | 2 | 37 | 30 | 37 | 6.082763 | 8 |
| 41 | 47 | 2 | 40 | 40 | 40 | 6.324555 | 8 |
| 51 | 57 | 2 | 40 | 50 | 40 | 6.324555 | 8 |
| 101 | 63 | 2 | 40 | 5 | 40 | 6.324555 | 8 |
| 111 | 17 | 2 | 17 | 10 | 17 | 4.123106 | 8 |
| 121 | 27 | 2 | 27 | 20 | 27 | 5.196152 | 8 |
| 131 | 37 | 2 | 37 | 30 | 37 | 6.082763 | 8 |
| 141 | 47 | 2 | 40 | 40 | 40 | 6.324555 | 8 |
| 151 | 57 | 2 | 40 | 50 | 40 | 6.324555 | 8 |
| 201 | 63 | 2 | 40 | 5 | 40 | 6.324555 | 8 |
| 211 | 17 | 2 | 17 | 10 | 17 | 4.123106 | 8 |
| 221 | 27 | 2 | 27 | 20 | 27 | 5.196152 | 8 |
| 231 | 37 | 2 | 37 | 30 | 37 | 6.082763 | 8 |
| 241 | 47 | 2 | 40 | 40 | 40 | 6.324555 | 8 |

Analog Inputs

| Input Name | Cfg | Range | | Input Value | Description |
|---|---|---|---|---|---|
| | | Low | High | | |
| nStagesActive | IN_ONLY | 0 | 255 | unconnected | Stages all off |
| | | | | invalid | Stages all off |
| runtimeReset | IN_ONLY | 0 | 255 | unconnected | No action to reset; runtime can accumulate |
| | | | | invalid | No action; runtime can accumulate |
| | | | | Value=0 | No action; runtime can accumulate |
| | | | | 1<=VAL<=255 | Stage runtime for stage VAL is reset to 0; runtime for this stage will not accumulate-you must reset VAL to 0 to allow accumulation of runtime. |

| Outputs | | Range | | Description |
|---|---|---|---|---|
| Output Name | Cfg | Low | High | |
| Stage1 | OUT_DIG | 0 | 1 | Stage 1 output |
| Stage2 | OUT_DIG | 0 | 1 | Stage 2 output |
| Stage3 | OUT_DIG | 0 | 1 | Stage 3 output |
| Stage4 | OUT_DIG | 0 | 1 | Stage 4 output |
| Stage5 | OUT_DIG | 0 | 1 | Stage 5 output |
| stgStatusOut | OUT_FLT | | | Output value to connect to StageDriverAdd block. The floating number must be converted to an integer and then converted to a 2 byte value. The upper byte (value right shifted 8 bits) is the maxStgs info and the lower byte (value AND 0xFF) is the stageStatus offset to reference the starting location in digital memory for the stageStatus bytes. |
| offset | OUT_FLT_SAV | | | Float value has two components - after conversion to a two byte unsigned integer value the upper byte is offset of number of nonvolatile entries to get to the start of the stage runtime storage (used only for leadLag=LL-RUNEQ) and the lower byte is the offset of number of digital memory locations to the start of the stage status bytes (one byte allocated per 8 stages assigned in maxStgs) |

Analog Inputs

| Input Name | Cfg | Range | | Input Value | Description |
|---|---|---|---|---|---|
| | | Low | High | | |
| stgStatusIn | IN_ONLY | 1 | 255 | unconnected | Stages all off |
| | | | | invalid | Stages all off |

Outputs

| Output Name | Cfg | Range | | Description |
|---|---|---|---|---|
| | | Low | High | |
| Stage1 | OUT_DIG | 0 | 1 | Stage 1 output |
| Stage2 | OUT_DIG | 0 | 1 | Stage 2 output |
| Stage3 | OUT_DIG | 0 | 1 | Stage 3 output |
| Stage4 | OUT_DIG | 0 | 1 | Stage 4 output |
| Stage5 | OUT_DIG | 0 | 1 | Stage 5 output |
| Stage6 | OUT_DIG | 0 | 1 | Stage 6 output |
| Stage7 | OUT_DIG | 0 | 1 | Stage 7 output |
| Stage8 | OUT_DIG | 0 | 1 | Stage 8 output |

*Figure 26*

From Figure 29
↓ Yes
─ 517

Input = nstgActive
if (input < old num stages)
diff = oldnumstages-input
stg = diff + seqStartptr
seqStart ptr = stg % max Stgs;
oldnumstages = input i startptrTemp = seqStartptr;
if (input = 0) seqEndptr = seqStartptr
else seqEndptr = (seqStartptr + input -1) % maxStgs;
endptrTemp = seqEndptr;
i = 0;
while (i < max Stgs)
if (i > = start ptr temp & i < endptrtemp)
else cmd = 0;
SetStageStatus (VID_ControlDigitalBase + offset Stage Status,i,cmd)
if (i<5) PotFVAL (stage[i] cmd); i ++

*Figure 30*

```
stage Status = Get Stage Status (base Stage Status,i)
    // if (stageStatus) // stage is On
        runtime copy ++;
        number Stages Counted On;++;
    Put FVAL (base Stage Runtimer + i, runtime copy)
    if (runtime copy > = highest Stage Runtime)
        highest Stage Runtime = runtime copy
        highest Stage NumRuntime = i;

else // stage is off
    if (runtime copy < lowest Stage Runtime)
        lowest Stage Runtime = rutnime Copy;
        Lowest Stage Num Runtime = i;
        Stage Runtime = Runtime copy
```

```
i++;
if (input > number Stages Counted On)
    Set Stage Status (base Stage Status, lowest Stage Num Runtime, 1)
if (input < number Stages counted On)
    Set Stage Status (base Stage Status, highest Stage Num Runtime, 0);
        // cmd Stgs.
        i = 0;
        while (i < 5)
        runtime copy = Get FVAL (base Stage Runtimer + i)
        Stage Status = Get Stage Status (base Stage Status, i);
        put FVAL (stage[i], stage Status)
        i ++
if (runtime reset : = 0)
    put FVAL (base Stage Runtimer + runtime Reset - 1, 0)
    // reset runtime value to 0 for number specified
```

Analog Inputs

| Input Name | Cfg | Range | | Input Value | Description |
|---|---|---|---|---|---|
| | | Low | High | | |
| nStagesActive | IN | 0 | 255 | unconnected | Stages all off |
| | | | | invalid | Stages all off |
| maxStgs | PAR_IN | 1 | 255 | invalid | maxStgs=1 |
| | | | | VAL>255 | maxStgs=255 |
| | | | | VAL<1 | maxStgs=1 |
| leadLag | BYTE_PAR | 0 | 2 | | Enumeration:<br>LL_STD=0-first on last off<br>LL_FOFO=1-first on first off<br>LL_RUNEQ=2-runtime equalization for lowest runtime |
| | | | | VAL>2 or <0 | Stages initialized to off and not commanded. |

*Figure 38*

Analog Inputs

| Input Name | Cfg | Range | | Input Value | Description |
|---|---|---|---|---|---|
| | | Low | High | | |
| stgStatusIn | IN | 0 | 15 | unconnected | Stages all off |
| " | " | " | " | invalid | Stages all off |
| firstStage Num | PAR | 0 | 255 | invalid | firstStageNum=1 |
| " | " | " | " | VAL<0 | firstStageNum=0 |
| " | " | " | " | VAL>255 | firstStageNum=255 |

MODULAR SHARED-MEMORY RESOURCE STAGE DRIVER SYSTEM FOR FLEXIBLE RESOURCE LINKING IN AN ENERGY CONVERSION SYSTEM

This application is a continuation-in-part of U.S. patent application Ser. No. 11/670,911, filed Feb. 2, 2007.

This application is a continuation-in-part of U.S. patent application Ser. No. 11/620,431, filed Jan. 5, 2007.

This application is a continuation-in-part of U.S. patent application Ser. No. 11/427,750, filed Jun. 29, 2006.

This application is a continuation-in-part of U.S. patent application Ser. No. 11/564,797, filed Nov. 29, 2006.

U.S. patent application Ser. No. 11/670,911, filed Feb. 2, 2007, is hereby incorporated by reference. U.S. patent application Ser. No. 11/620,431, filed Jan. 5, 2007, is hereby incorporated by reference. U.S. patent application Ser. No. 11/427,750, filed Jun. 29, 2006, is hereby incorporated by reference. U.S. patent application Ser. No. 11/564,797, filed Nov. 29, 2006, is hereby incorporated by reference. U.S. patent application Ser. No. 11/559,706, filed Nov. 14, 2006, is hereby incorporated by reference. U.S. patent application Ser. No. 10/809,115, filed Mar. 25, 2004, is hereby incorporated by reference.

BACKGROUND

The present invention pertains to controlling energy conversion devices and particularly to patterns of controlling the devices. More particularly, the invention pertains to for designing systems for controlling these devices.

SUMMARY

The invention is a flexible stage changing mechanism.

BRIEF DESCRIPTION OF THE DRAWING

FIG. 7 shows a table of data from the simulation of the designed circuit or system of FIGS. 5 and 6;

FIG. 22 is a table of analog inputs for the stage driver;

FIG. 23 is a table of analog outputs of the stage driver;

FIG. 25 is a table of the analog input for the stage driver addition;

FIG. 26 is a table of the analog outputs for the stage driver addition;

FIGS. 28-33 constitute a block diagram of the stage driver;

FIGS. 35-40 relate to stage drivers as discussed herein;

DESCRIPTION

Figure 1:
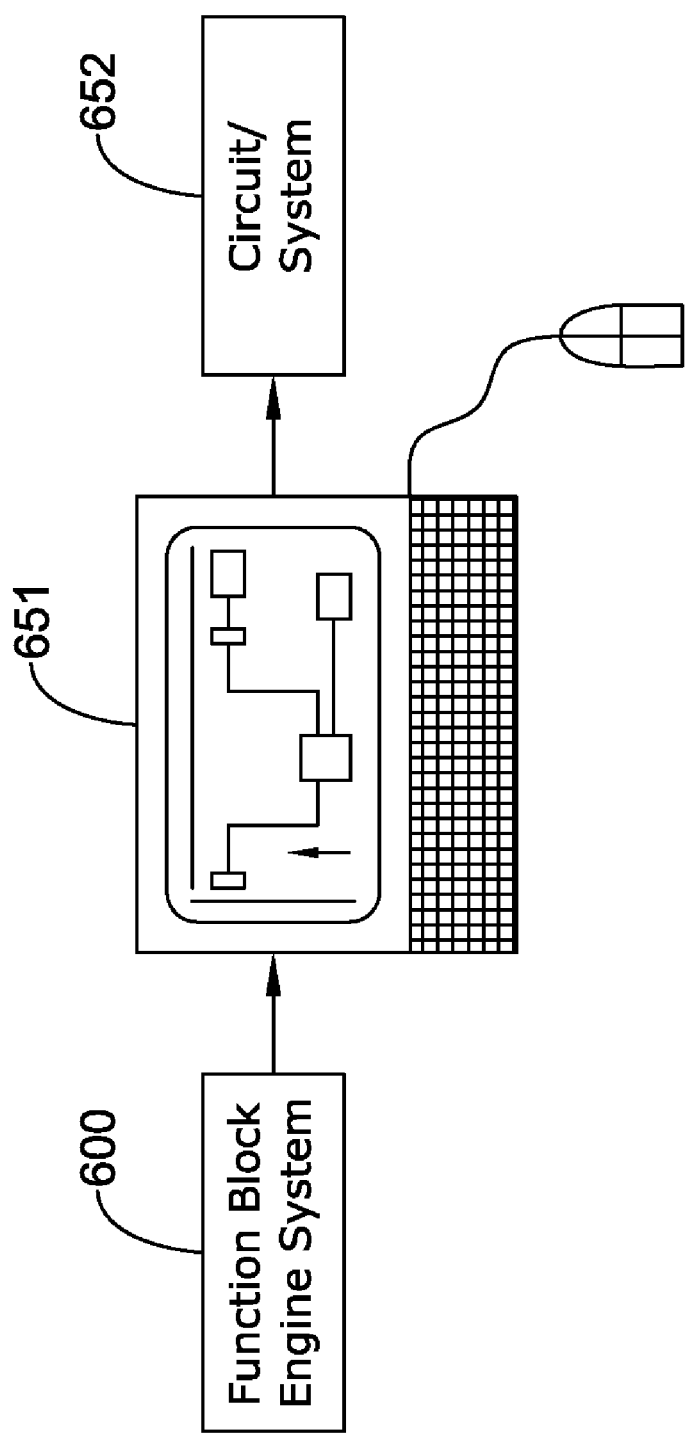
FIG. 1 is a diagram of a relationship of the function block engine system, computer and resulting circuit or system.

A present system may incorporate a "flexible resource stage rotation linking appliance". In a design of programmable controls in the commercial HVAC industry, there may be a need to dynamically assign stage outputs from a single input such as number of stages requested. Some block approaches and memory resources may require a fixed area that is an integer multiple of the maximum size of the block. For example, if 16 outputs are required, then a block of 16 or some scheme to share the information of staging and memory resources may be required. There appears a further need to dynamically allocate resource and stages in a resource efficient manner that is tied in with a flexible block architecture.

The present system may solve a design and implementation issue through an efficient use of two function blocks that work with stagers of HVAC systems having CVAHUs, VAVs, and have stage utilization algorithms.

As more stages are set up during a design, the configuration tool may calculate the starting address for both stage status and runtime and allocate the memory and calculate the offset from the base index that is the starting address for the runtime area and the stage status area in their respective memories.

One may design and/or implement a system controller or another system having virtually no hardware except for the computer used to design and put the resulting software into a memory, e.g., in a form of microcode or other manner. An ordinary computer, though not necessary, may provide the resulting function block engine designed software input to it, i.e., to a memory, and the computer may effectively become the designed controller with function blocks, interconnections, links, inputs, outputs, selections, adjustments, interfaces, a display, visual and/or audio indicators for showing variables, parameters, readings, prescriptions, results, on-station and/or remote monitoring and control whether by keyboard, mouse, touch screen, voice command, eye tracking and blinking control, or other communicative manner, having diagnostics, simulation capabilities within itself and a system to be controlled, plus more, effectively all in conveyable software. However, for an illustrative instance, one's home computer or other mechanism may be loaded with and use the present system level function block engine to design virtually any kind of system controller in a context of software. After design, simulation and testing, as desired, this computer may become the designed system controller for an actual application, or the software may be transferred to another computer or other device to become the system controller. The computer, or some other like-designed processor, programmable personal assistant (PDA), cell phone, device and so on, with the software may become the designed system controller such as, for one among many examples, a programmable thermostat for a building HVAC. Communication between the controller on the computer and the controlled system may be via wireless or non-wireless media.

Additionally, in the commercial HVAC industry, there may be a need to have complex applications that are tested and implemented in controlling devices. These devices should be low cost and be able to meet application needs. There also appears to be a need to have a flexible low cost controller that allows applications to be met as demands change within the low cost controller platform and tools. The function block framework of the present invention may provide a logical application structure that allows a system control application designer (e.g., HVAC) to combine pre-designed blocks featuring powerful control capabilities and thorough connections of libraries and block functions, that may be incorporated the development of sophisticated applications to meet new and advanced customer needs.

The present function block engine system may use relatively little memory in view of its significantly powerful and revolutionary capabilities. Programmable controllers may be implemented as engines that can interpret a meta language that is resident wholly or partially in a random access memory (RAM) as it runs. This means that minimal RAM requirements for a small program may be about 15K bytes (Kb) and can grow in proportion to the program. An inexpensive microprocessor may typically have a rather small RAM (e.g., 2K bytes or less) which means that a little amount of RAM (i.e., about 1 Kb) is available after operating system (OS) and communication capabilities are taken into consideration. However, by providing programmability from a function block engine, as described herein, that is resident in FLASH and having the functions use a common pool of RAM to hold minimal static value storage while the rest of the pool is reused by all the blocks for temporary execution space, fairly complex programs can be executed with a fixed memory allocation of about 1K of RAM. The program may simply be a list of "function" calls, as described by the function block definitions herein, which can be downloaded to a small file in FLASH.

FIG. 1 is a diagram showing relationship of the function block engine system 600, computer 651 and a resulting circuit or system 652. One may take the present function block engine system 600, perhaps on a memory medium (e.g., disk, FLASH, stick, or the like) to store and/or load it into a memory of an operating system such as that of a personal computer 651. One may design a circuit or system 652, for example, a controller, with the function block engine system 600. That circuit or system 652 may be put into a memory, for instance, in microcode, or another code, manner or mode. The memory with the system 652 may be tied in with an operating system to provide the activity of a controller having the connections with the hardware or other to be controlled and monitored based on the function block designed system 652.

FIGS. 2-8 show an operation for designing simple example system 652 with the function block engine system 600. This operation may be implemented in a system designer and simulator on a personal computer 651 with software such as, for example, "Microsoft Windows XP Professional™". One may have a screen like that shown in FIG. 2. A mouse may be used to move an arrow 611 to click on "controller" and then on "configure" of the tool bar 612. Then one may, for example, click and drag out a function block 601 entitled "Timeset" from function block source area 602 into an area 603 of a display screen with the mouse arrow 611. Even though a function block 601, for instance, may be dragged from area 203 to area 603, the source 601 of the function block would remain in area 602. Then one may drag a Limit 604 from area 602 to area 603. One may place the mouse arrow 611 on an output terminal 605 of block 601 and drag a connection 606 to an input terminal 607 of limit 604. An add function block 608 may be dragged from area 602 to area 603. A network variable input block 609 may be dragged with the mouse arrow 611 into area 603. A multiply function block 610 may be dragged from area 602 to area 603. The mouse arrow 611 may be placed and clicked on a terminal 613 of block 609 and a line 614 may be dragged from terminal 613 to a terminal 615 of function block 610 to make a connection between block 610 and input 609. In a similar manner a line 616 may be dragged from an output terminal 617 of block 610 to an input terminal 618 of block 608. Also, a connection may be made with a line 619 from an output terminal 621 of limit block 604 to an input terminal 622 of the add block 608. The add function block 608 may add input values at terminals 618 and 622 to result in a sum at an output terminal 623 of block 608. The output at terminal 623 may be provided to an input terminal 624 of another limit function block 625 with a line 626. The source of limit function block 625 may be the same as that for limit function block 604 which is from area 602. To check the inputs of add function block 608, one may right click the mouse and click on edit to get a dialogue box that shows the inputs which may changed to one or more parameters with values placed in them in lieu of inputs to the add function block 608. The same may be done for the multiply function block 610 where one input is replaced with a parameter of four which can be multiplied with a value at input at 615 to get a result at terminal 617. Also, other things, such as function block names, may be changed in this right-clicked edit dialogue box.

The circuit or system design with function blocks in area 603 may continue on to another page as shown in the tool bar 612. The pages may be relabeled, for example, as page 1 was relabeled ad ADD1 at place 626 and page 2 was relabeled as ADD2 at place 627. The circuit or system may be continued on to the next page ADD2 with a TAG connection block 628, which can be dragged with the arrow 611 from the block source area 602 to area 603. An output terminal 629 of block 625 may be connected with a line 631 dragged out with arrow 611 from terminal 629 to a terminal 632 of tag block 628.

Figure 3:
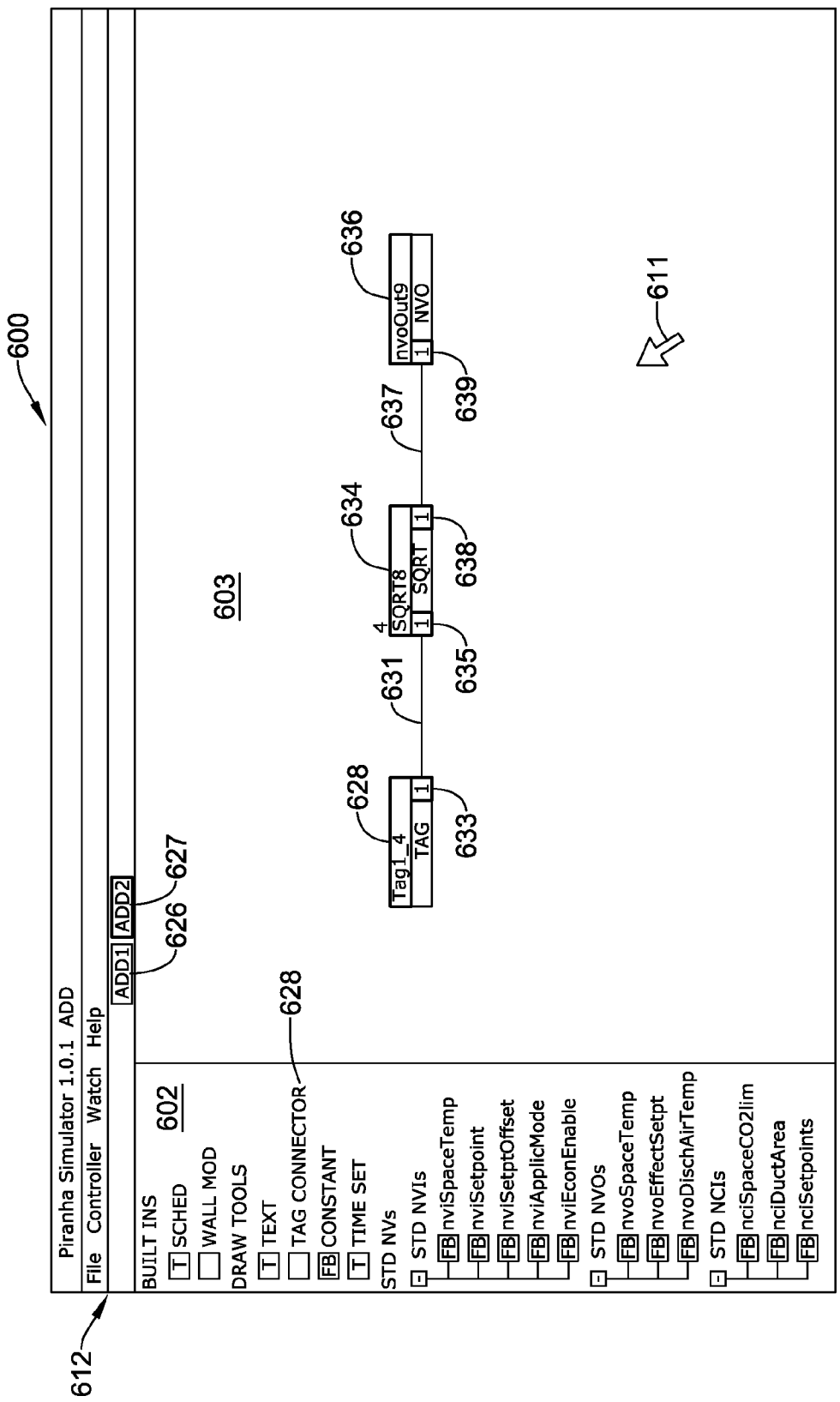
FIG. 3 shows a second page of the screen of FIG. 2.

FIG. 3 shows a continuation of the circuit or system from page ADD1 to page ADD2. Tag 628 may be a continuation of line 631 via input terminal 632 and an output terminal 633 of tag 628 in FIG. 3. A square root function block 634 may be dragged from area 602 to area 603 of the display. The line 631 connection may be dragged with the arrow 611 from terminal 633 to an input terminal 635 of the square root function block 634. A network variable output 636 may be dragged from area 602 into area 603 of the display with the mouse arrow 611. A connection line 637 may be dragged from an output terminal 638 of block 634 to a terminal 639 of output block 636.

The ADD1 626 and ADD 627 pages may themselves be placed into individual function blocks with their respective inputs and outputs. The block of pages 626 and 627 may be placed into one function block. If there are other function blocks having a number of pages of circuits made from various function blocks, they also may be combined into one function block. These one function blocks might be interconnected and also combined into still another one function block. This hierarchical progression of function blocks being combined may continue until an entire system of a design is in one block, such as an aircraft instrumentation, industrial plant, HVAC or some other kind of controller. The resulting function block might be treated as a black box in some instances.

Figure 4:
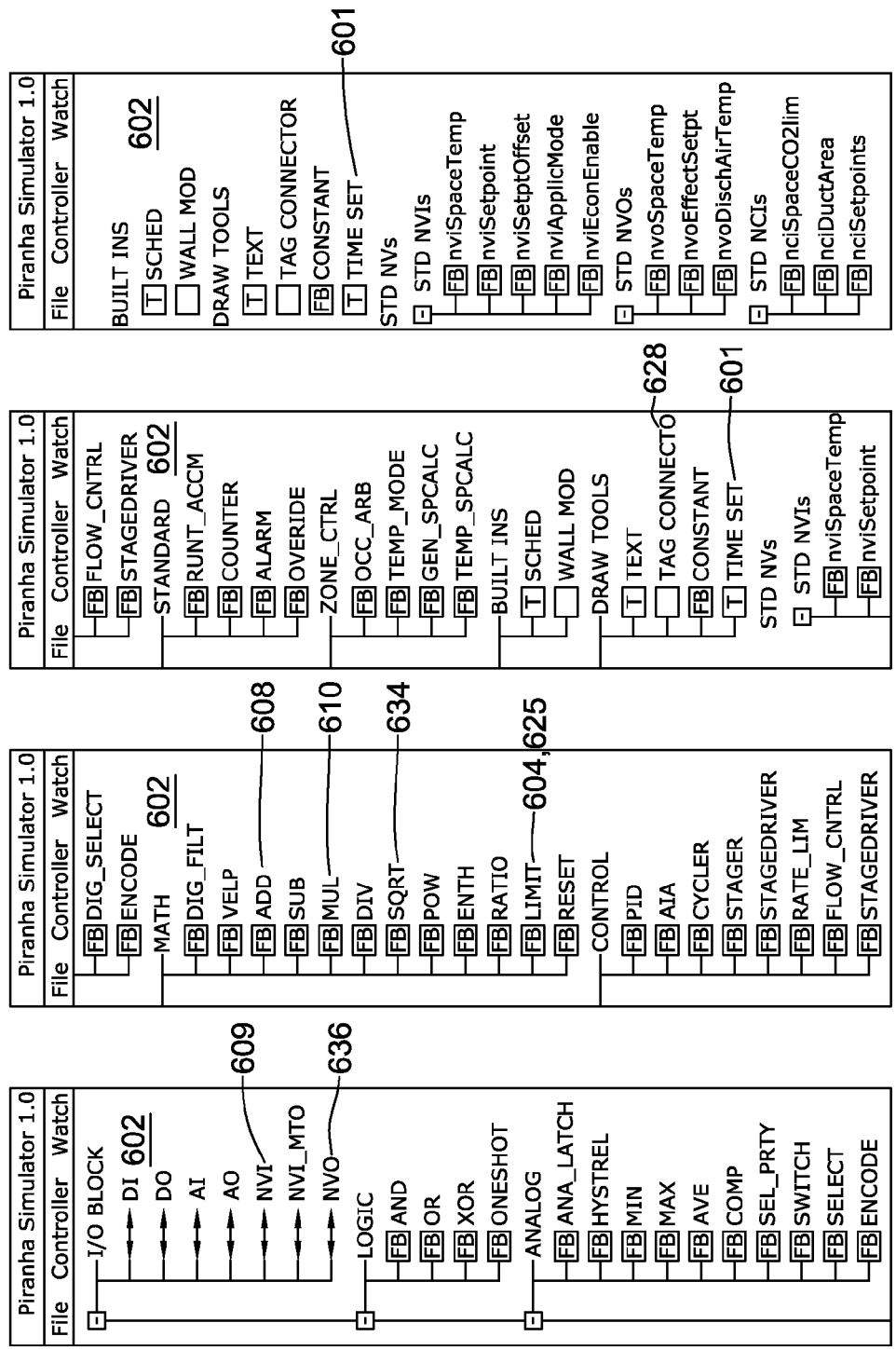
FIG. 4 shows from the screen a partial list of function blocks and other items that may be used in designing a circuit or system.

FIG. 4 shows a list of function blocks and terminals in area 602 of the display that may be selected for developing various kinds of designs. The list is not inclusive in that other function blocks and terminals may be added.

Figure 2:
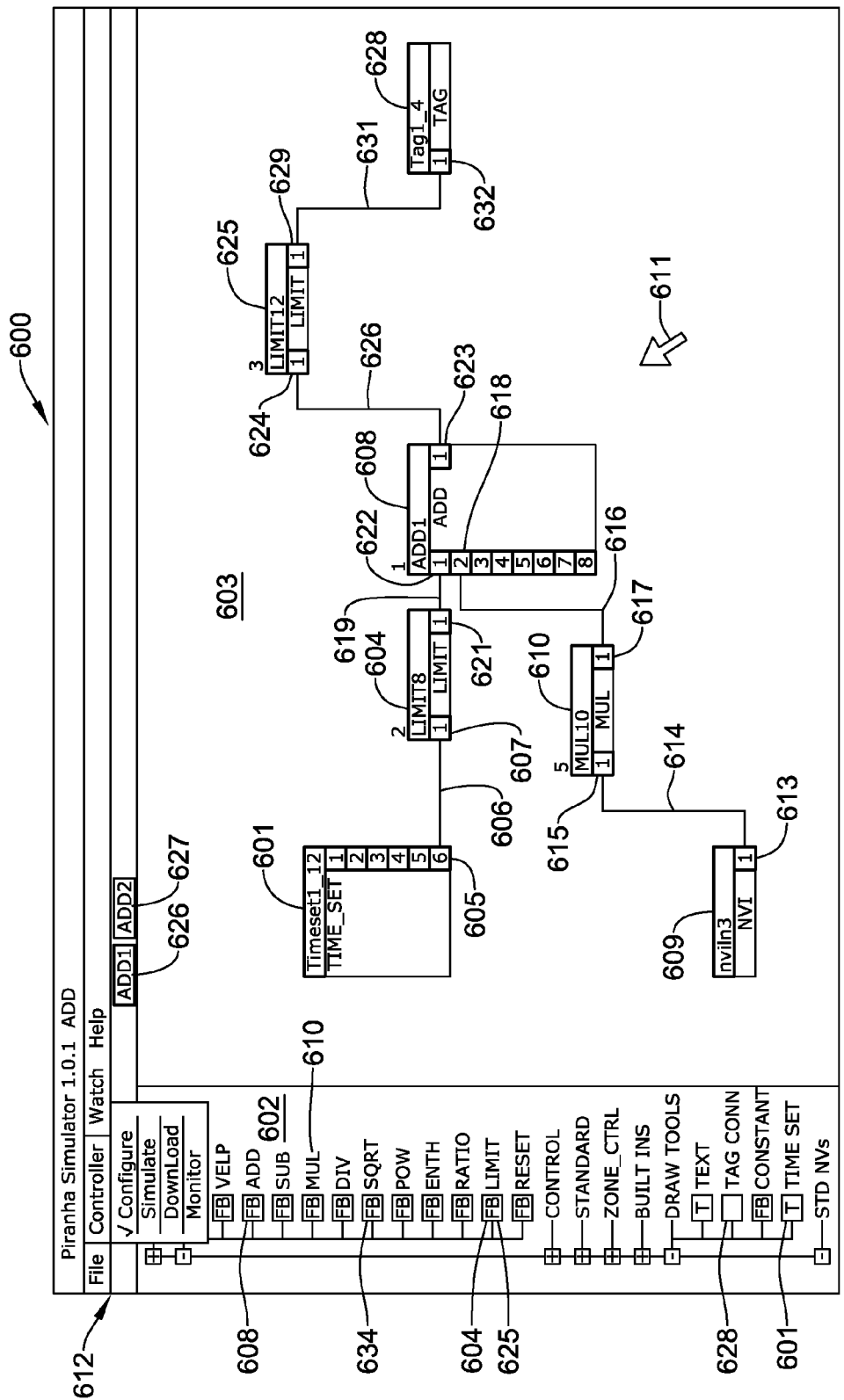
FIG. 2 shows a display screen set up for designing circuits or systems with function blocks.
Figure 5:
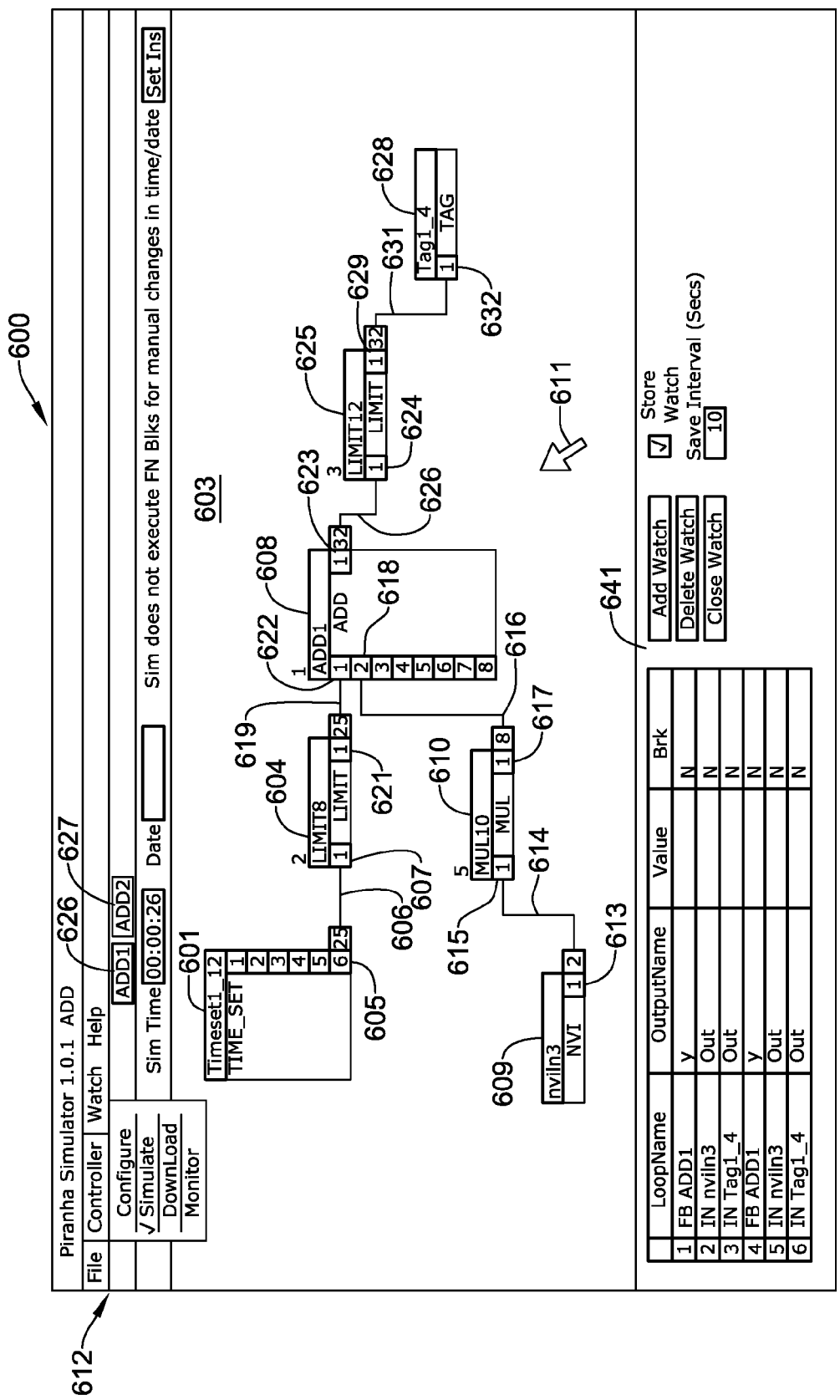
FIG. 5 shows a screen for a simulate mode for the designed circuit or system of FIGS. 3 and 4.
Figure 6:
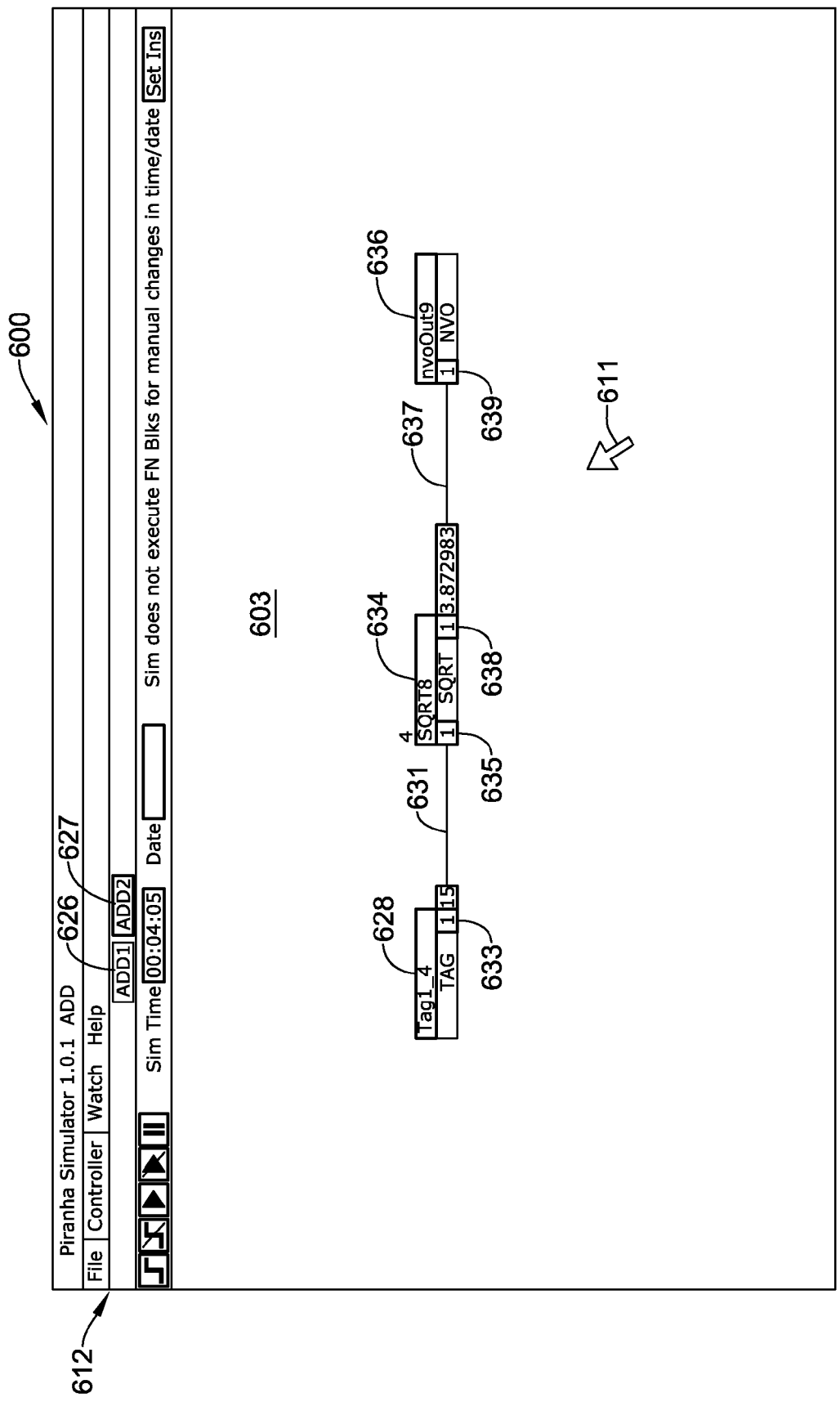
FIG. 6 shows a second page of the screen of FIG. 5.
Figure 8:
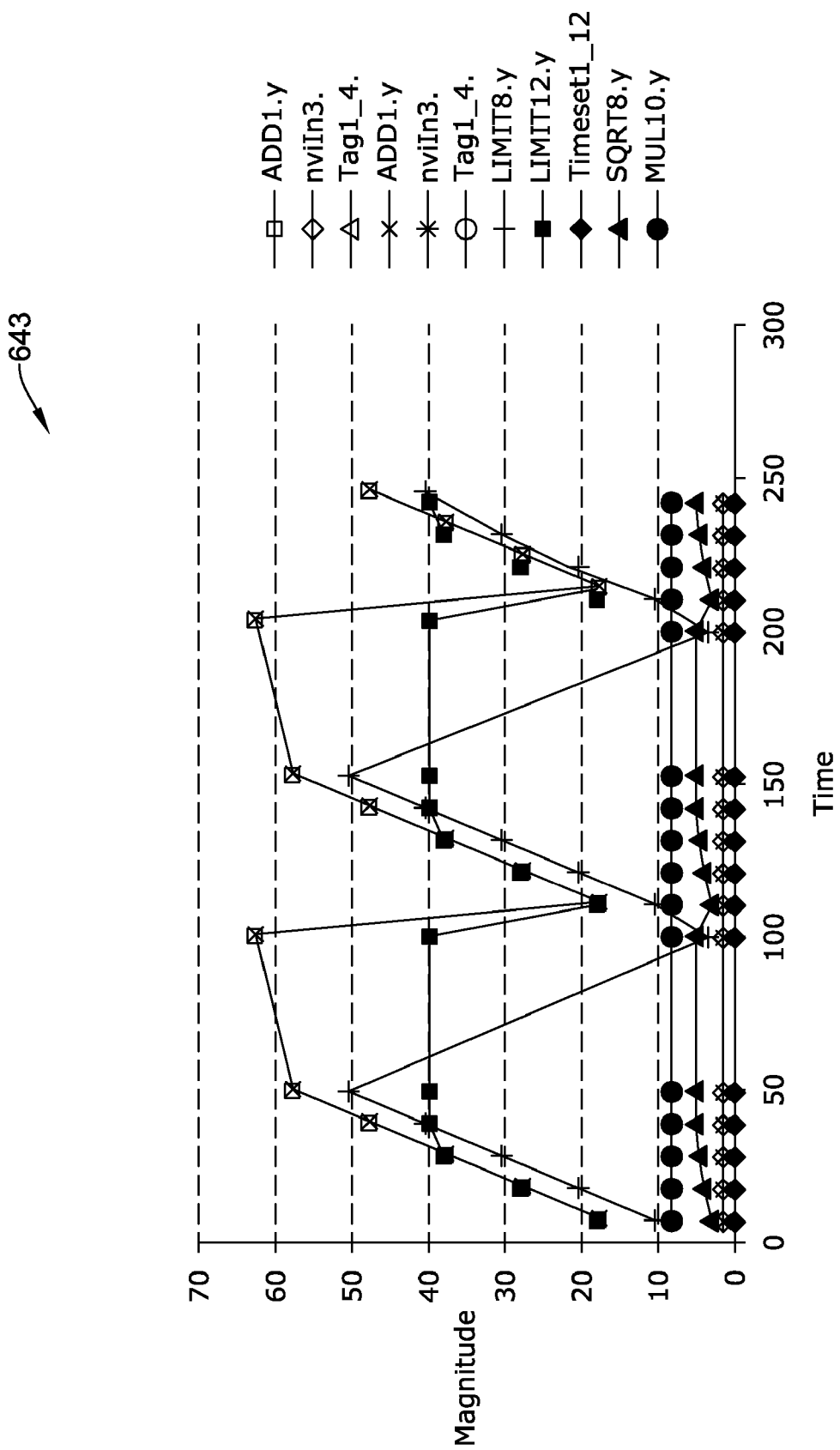
FIG. 8 is a graph of the data in the table in FIG. 7.

FIGS. 5 and 6 show the circuits of FIGS. 2 and 3, respectively, in a simulate mode which may be selected by clicking on "controller" of the tool bar 612 with the mouse arrow 611. Then "simulate" may be clicked on to put the designed circuit into an operational-like scenario. The label "watch" on the tool bar 612 may be clicked on to get the watch dialogue box 641. The loops and outputs along with their respective values may be listed in box 641. Also, values for each increment of time may be provided at the various output terminals of the function blocks. For example, a value of "25" is shown at the output terminal 621 of the limit function block 604. Units may be of time, magnitudes, or some other kind of measurement. The circuit or system, on pages ADD1 626 and ADD2 627 indicated on the tool bar 612, may include analog, digital or a combination of digital and analog function blocks. A simulation may run for various inputs may be recorded in a table 642 as shown in FIG. 7 and plotted as shown in a graph 643 of FIG. 8. Graph 643 shows magnitudes for various outputs versus time.

Figure 9:
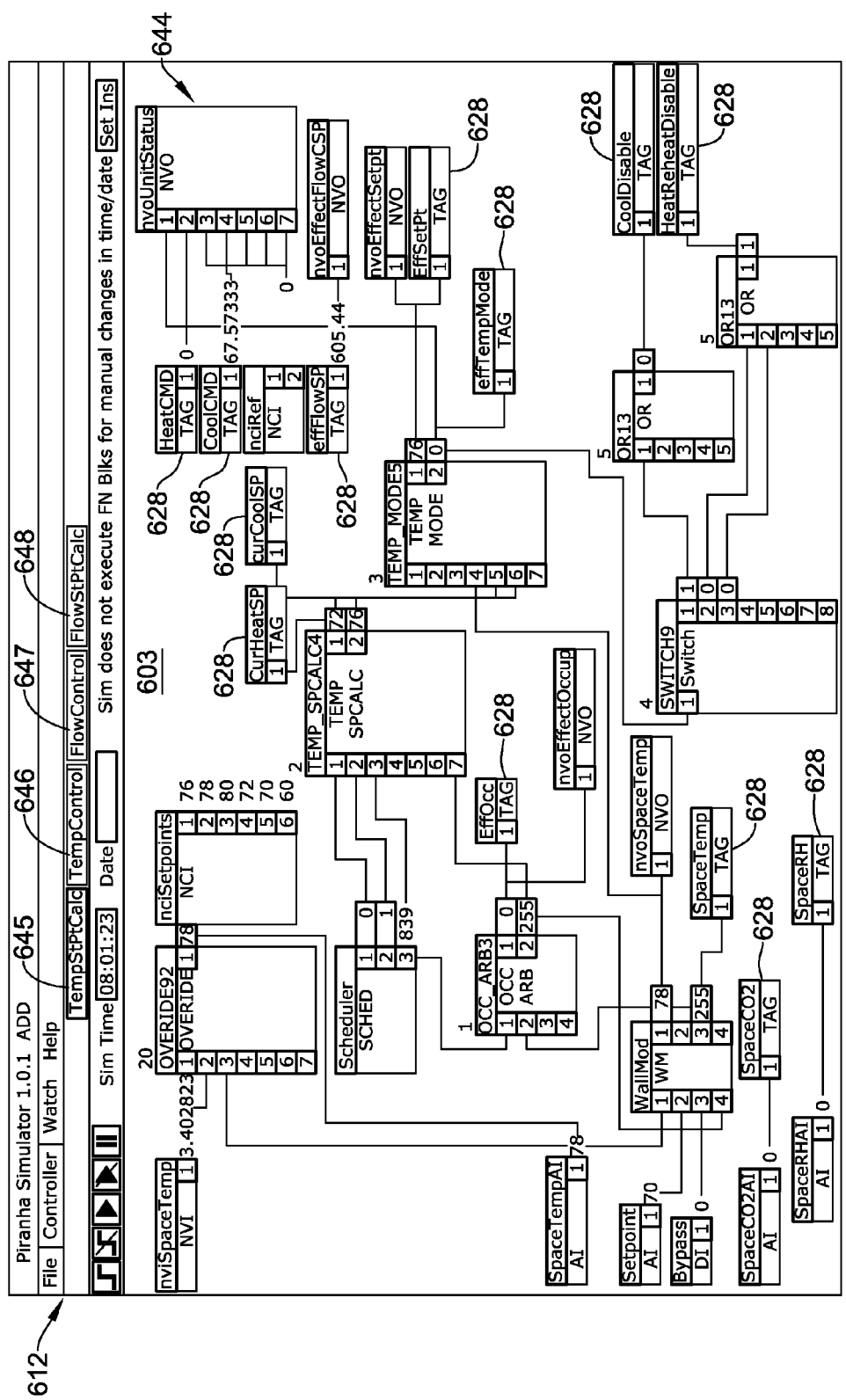
FIG. 9 shows a display screen with one of several pages showing a designed system have somewhat more complexity that the example circuit or system of FIGS. 2 and 3.

FIG. 9 shows a simulation mode of a somewhat intricate circuit 644 of function blocks. Tool bar 612 appears to show that this circuit 644 is one of four pages 645, 646, 647, and 648 of a larger combination of function blocks interconnected via tag connections 628.

Figure 10:
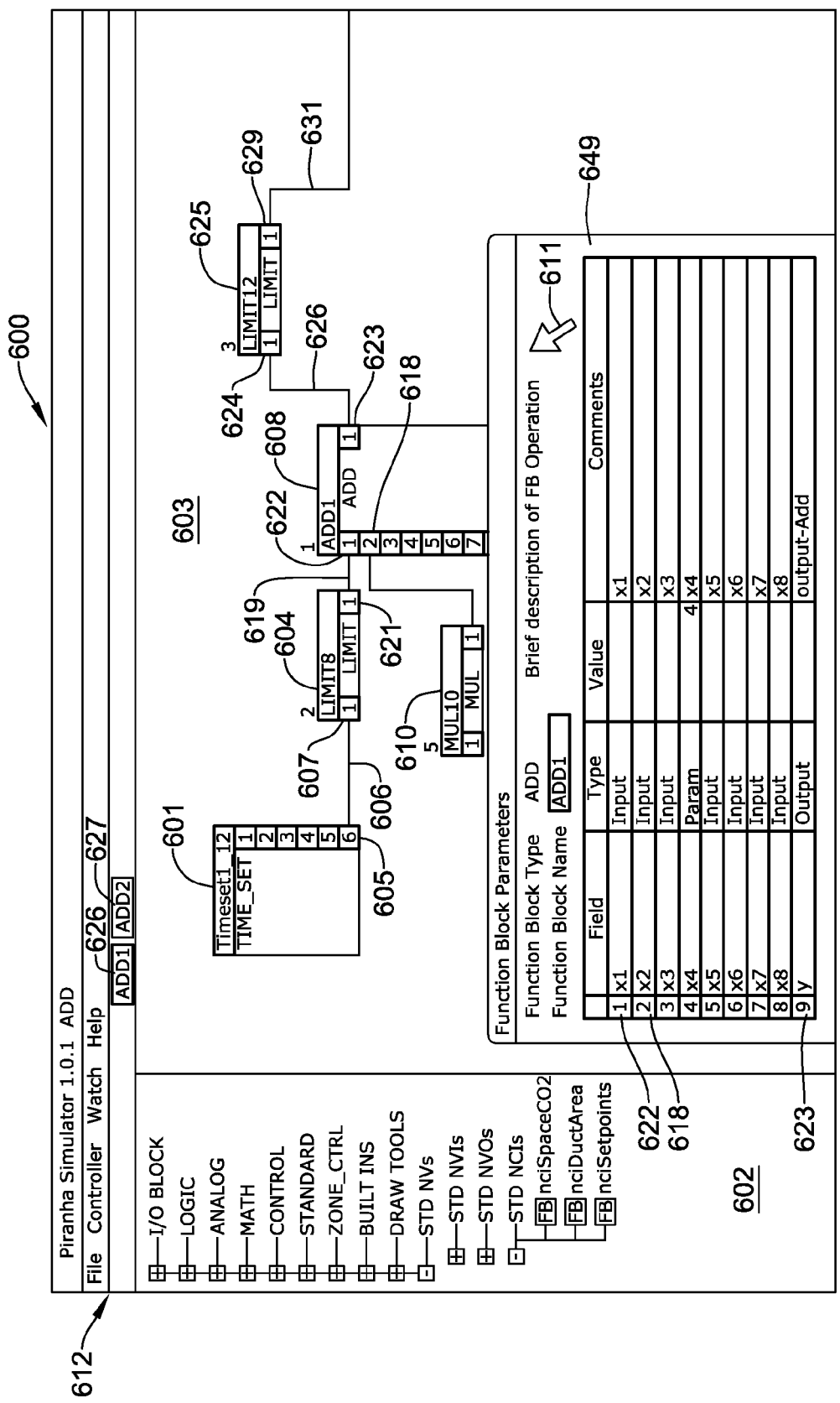
FIG. 10 shows a dialog box with inputs, a parameter and an output.

FIG. 10 shows a portion of the layout of the circuit in FIG. 3, but with a dialogue box 649 showing the inputs and output of the add function block 608, as discussed herein.

An illustrative example resulting from the present function block engine system may be a VAV (variable air volume) system used for reducing the air quantity under periods of limited or no occupancy and saves both energy of air delivery and the energy involved in the heating/cooling the air. The present VAV system has an ability to have high resolution of air flow and the accurate control to an air setpoint, especially at low flow volume. The VAV air flow calibration process or field balancing is a very important part of the product delivery that allows an HVAC balancer to measure the flow very accurately and max flow and min flow and enter an adjustment to the VAV control calibration. At the high end of accuracy and resolution, ten point curves detailing the air pressure (proportional to voltage) in relation to velocity air flow may be customized and developed for the manufacture of flow pickup devices. There appears to be a need to develop an approach that can incorporate the minimum flow and calibration information in addition to the ease required for an HVAC balancer.

Advantages of the system may include the following. Function block architecture allows flexibility to accommodate new architectures, hardware, or changes in HVAC equipment due to improvements in sequences, control strategies, or communication to achieve balancing. A modular system gives ease of understanding. There is efficient use of resources—vastly simpler for balancing algorithm to implement resulting in savings of time and hardware/software resources. It may take advantage of a high point calibration technique in the present assignee's U.S. Pat. Nos. 6,549,826 and 5,479,812. This technique appears as being recognized in industry as leading in flow accuracy and low cost. The present invention facilitates this technique in a much more simple and elegant way. U.S. Pat. No. 6,549,826, issued Apr. 15, 2003, is hereby incorporated by reference. U.S. Pat. No. 5,479,812, issued Jan. 2, 1996, is hereby incorporated by reference. U.S. Pat. No. 6,745,085, issued Jun. 1, 2004, is hereby incorporated by reference. U.S. Pat. No. 6,536,678, issued Mar. 25, 2003, is hereby incorporated by reference. U.S. patent application Ser. No. 10/809,115, filed Mar. 25, 2004, is hereby incorporated by reference.

The system may result in an ability to use multi-platform, multi-purpose programmable controller algorithms that can be adapted to, combined, merged, and/or synthesized with multi-protocols (TCP/IP/Ethernet, BACnet™, LON™, and so on), other applications (RTU, CVAHU, UV, FCU, VAVAHU, and so forth), internet (T7350H, XL15B, webserver) application (HVAC, boiler control per U.S. Pat. No. 6,536,678 owned by the present assignee) and industry (security, test, OEM, and so forth).

Figure 11:
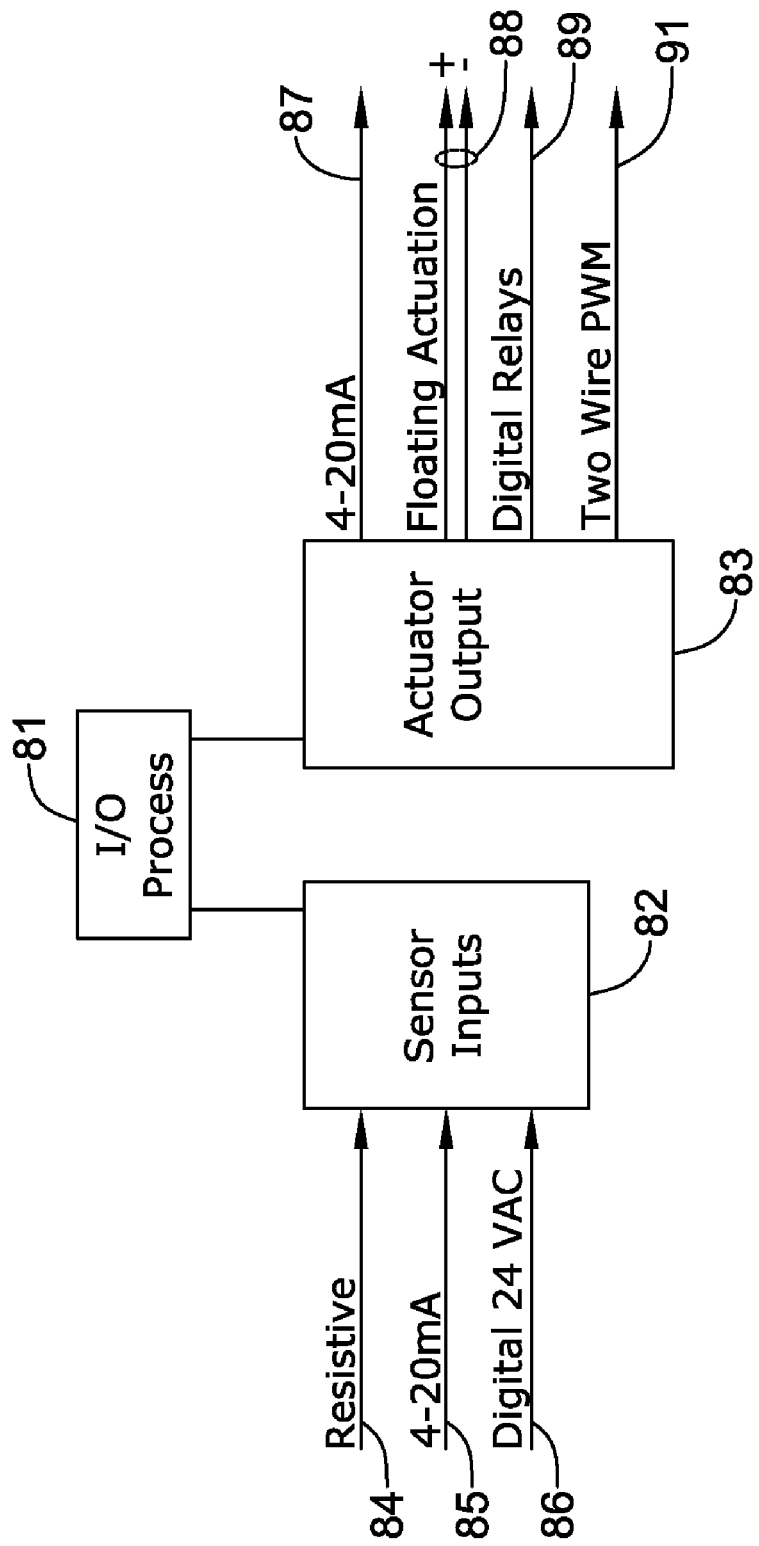
FIG. 11 is an input/output block diagram that may be associated with interacting with an operating system.

The may be an input/output processor module 81 that receives sensor inputs and provides actuator outputs. A sensor input module 82 may be connected to module 81. An actuator output module 83 may be connected to module 81. Inputs 84, 85 and 86 may receive resistive signals, 4-20 mA signals and digital 24 VAC signals, respectively. Other kinds of signals may be received by the inputs. Outputs 87, 88, 89 and 92 may provide signals for dampers, valves, and so forth. Outputs 87 may provide 4-20 mA signals. Output 88 may be a floating actuation of plus and minus signals of about 24 VAC to provide good resolution positioning of, for example, a damper at various angles relative to an air flow. Output 89 may provide digital relay signals and output 91 may be a two-wire PWM (pulse width modulated) signals. FIG. 11 is a diagram of modules 81, 82 and 83.

Figure 12:
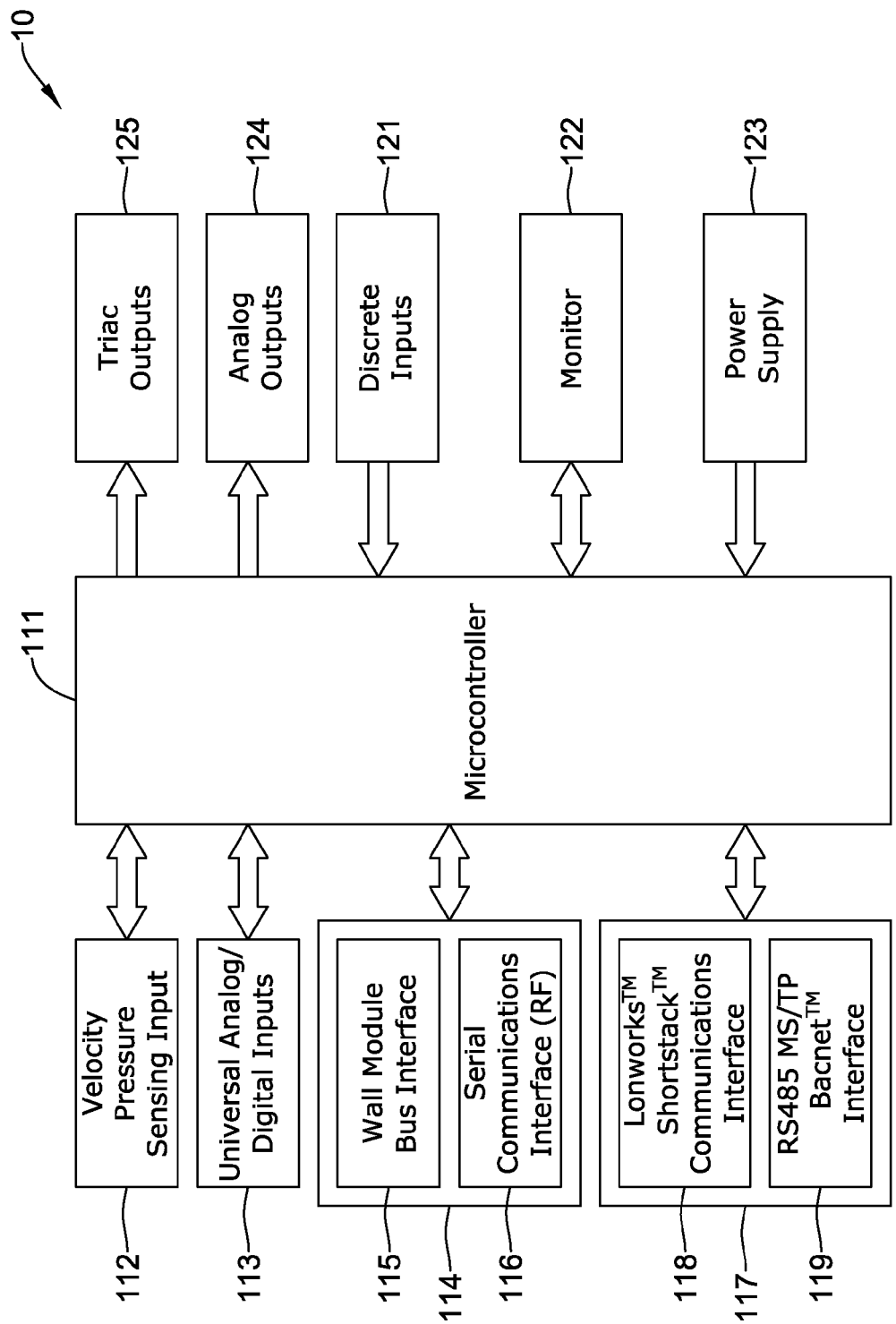
FIG. 12 is an overview block diagram of the present system with its interaction with a microcontroller.

FIG. 12 is an overview block diagram of the present system 10 with its interaction with a microcontroller. A central item may be a micro controller module 111. Microcontroller module 111 may have one or more processors. Velocity pressure sensing input module 112 may be connected to microcontroller 111. Universal analog/digital inputs module 113 may be connected to module 111. An interface module 114, having a wall module interface 115 and a serial communications interface (RF) 116, may be connected to module 111. Another interface module 117, having a LonWorks™ ShortStack™ communications interface 118 and an RS485 MS/TP BACnet™ interface 119 may be connected to module 111. A discrete inputs module 121 maybe connected to module 111. A monitor 122 may be connected to module 111. A power supply module 123 may be connected to module 111. An analog outputs module 124 and a triac outputs module 125 may be connected to module 111. Other modules, as desired, may be provided and connected to microcontroller module 111.

Figure 13:
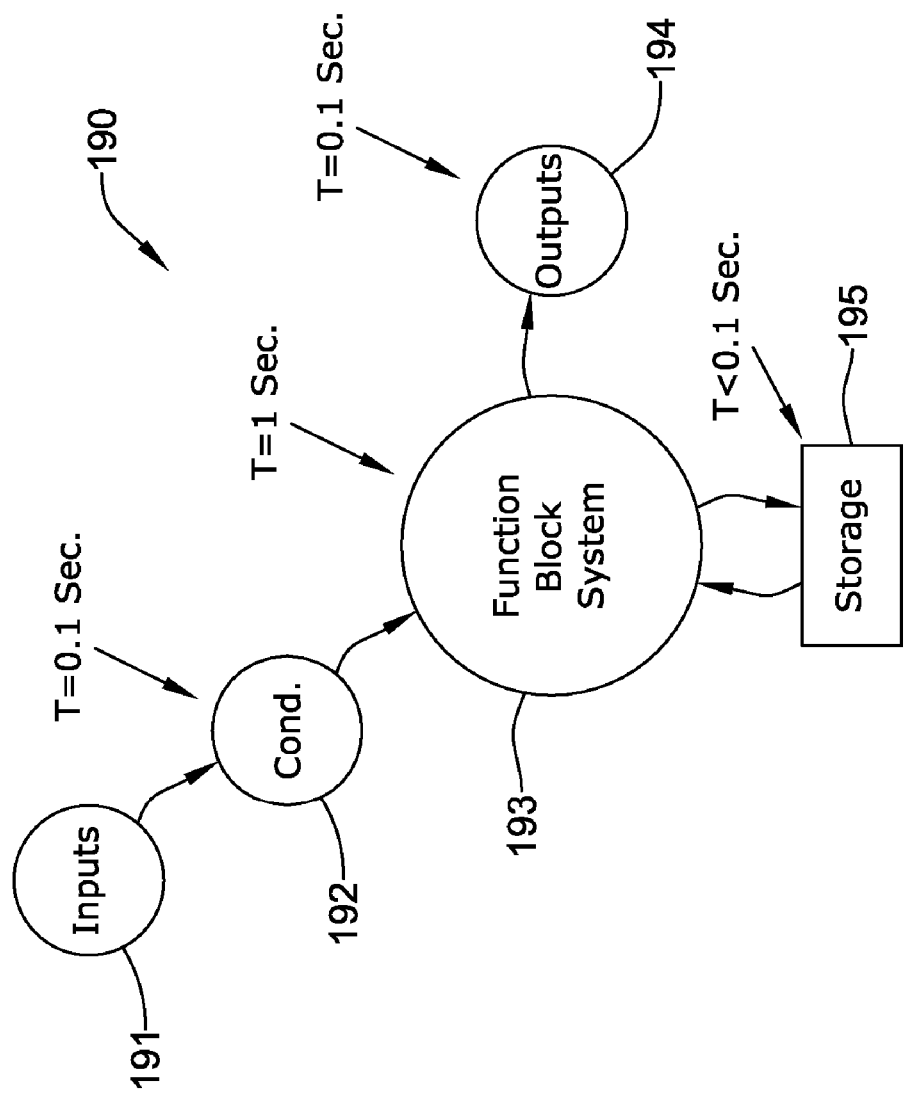
FIG. 13 shows a diagram of a balancing system and times for activity between the system and several other components.

FIG. 13 shows portions of a function block system 190 and their times for activity among them. For signals at inputs 191 to reach the function block system 193 via the conditioning 192 of the signals may take about 0.1 second. The time for the block system 193 to process the received signals may be about one second. To provide signals from the block system 193 to the outputs 194 may take about 0.1 second. The interaction of the block system 193 and storage or memory 195 may be significantly faster than 0.1 second.

Figure 14:
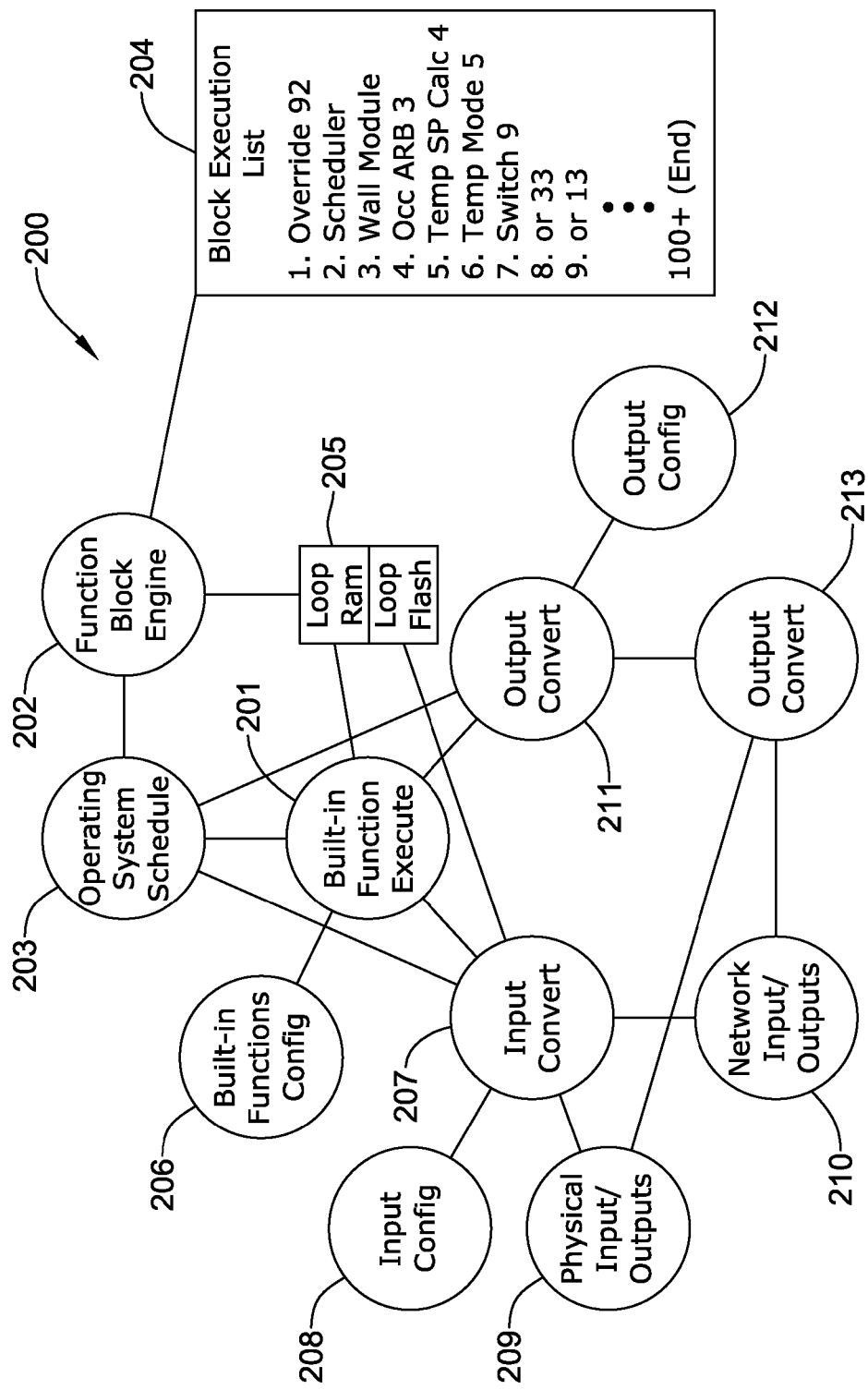
FIG. 14 is a diagram of a function block system.

FIG. 14 is a diagram of a function block system 200 which may have application to the balancing or other system. Built-in function execute 201 may be connected to operating system schedule 203, loop RAM/FLASH 205, built-in functions configuration 206, input converter 207, and output converter 211. Function block engine 202 may be connected to operating system schedule 203, block execution list 204, and loop RAM/FLASH 205. Operating system schedule 203 is connected to input converter 207 and output converter 211. Input converter 207 is connected to loop RAM/FLASH 205, input configuration 208, physical input/outputs 209, and network input/outputs 210. Output converter 211 is connected to output configuration 212 and output converter 213. Output converter 213 is connected to physical input/outputs 209 and network input/outputs 210.

Figure 15:
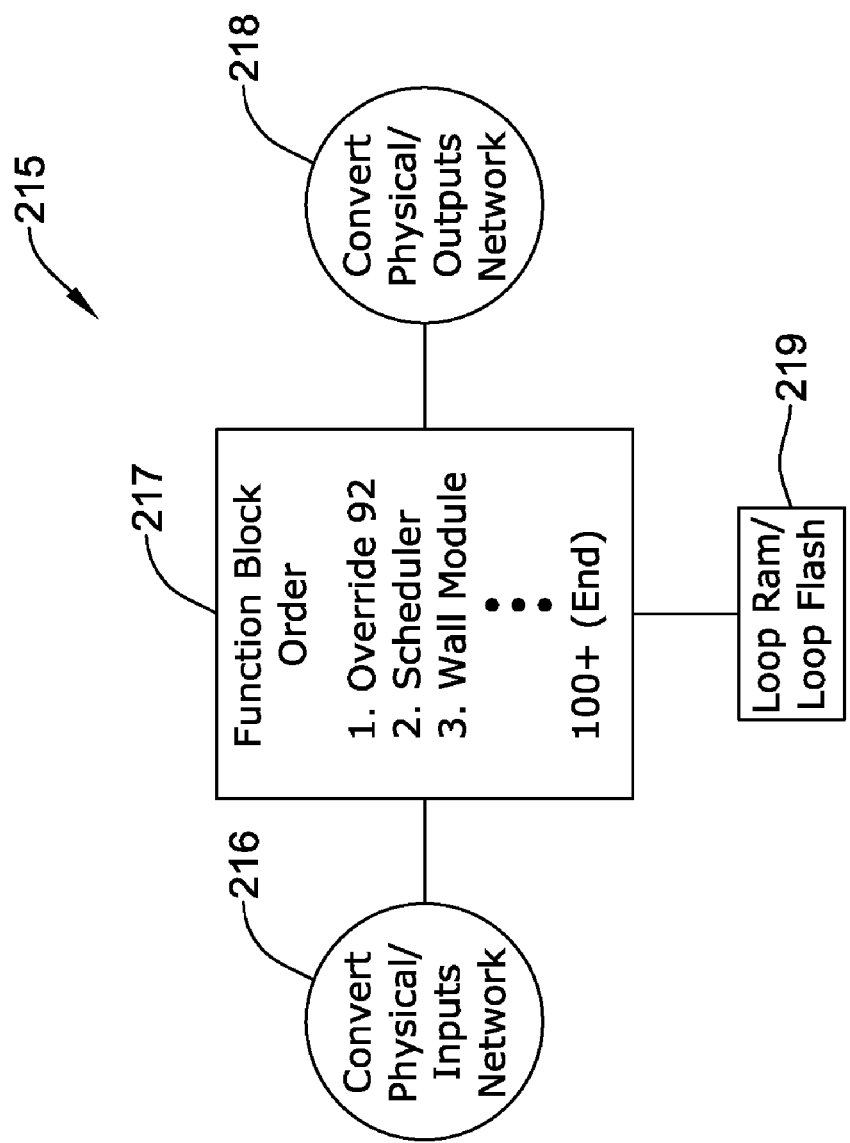
FIG. 15 is a summary variable air volume block flow diagram.

FIG. 15 is a summary VAV block flow diagram 215. A convert physical/inputs network 216 may be connected to a function block order list 217. The function block order list 217 may be connected to a convert physical/outputs network 218 and to a loop RAM/FLASH 219.

Figure 16:
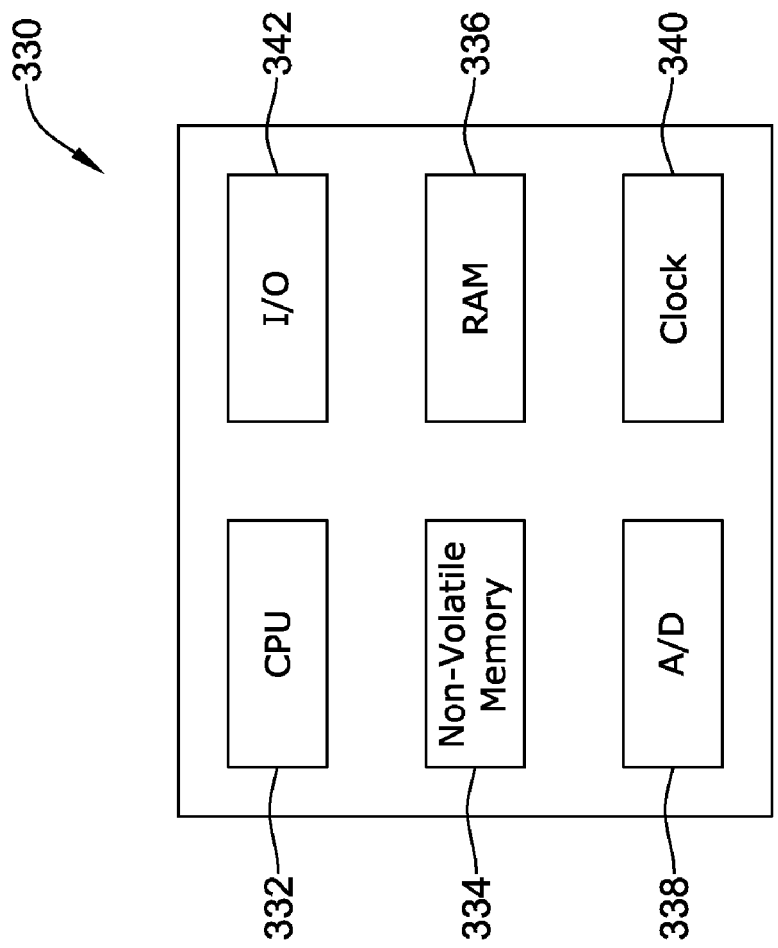
FIG. 16 is a block diagram of an illustrative programmable HVAC controller.

FIG. 16 is a block diagram of an illustrative programmable HVAC controller. The illustrative HVAC controller may be a programmable thermostat, or may be separate from the thermostat. In either case, the HVAC controller may provide one or more control signals that effect the operation of the HVAC system.

The illustrative HVAC controller may include a microcontroller 330 having a non-volatile memory 334 and a random-access memory (RAM) 336. Additionally, the illustrative microcontroller 330 may include a central-processing unit (CPU) 332, analog-to-digital converters (A/D) 338, input/outputs (I/O) 342, and a clock 340 or timer. The illustrative microcontroller 330 may include more or less than these illustrative components, depending on the circumstances. As illustrated, the aforementioned components may be provided internal to the microcontroller 330 without the need for any external components, but this is not required.

In some cases, the least expensive form of processor is a microcontroller. Microcontrollers typically contain all the memory 334 and 336 and I/O 342 interfaces, integrated on a single chip or device (e.g., microcontroller) without the need for external components. As noted above, one advantage of using a microcontroller 330 is the low cost when compared to the cost of a typical microprocessor. Additionally, microcontrollers 330 may be designed for specific tasks, such as HVAC tasks, which can help simplify the controller and reduce the number of parts needed, thereby further reducing the cost. While the use of a microcontroller may have some benefits, it is contemplated that the present system may be used in conjunction with a microprocessor or any other suitable controller, as desired.

In the illustrative microcontroller 330, the non-volatile memory 334 may be FLASH memory. However, it is contemplated that the non-volatile memory 334 may be Read Only Memory (ROM), programmable Read Only Memory (PROM), Electrically Erasable Programmable Read Only Memory (EEPROM), Random Access Memory (RAM) with a battery back-up, or any other suitable non-volatile memory 334, as desired. In the illustrative example, the amount of FLASH memory may be less than 100 Kb. In one case, the amount of FLASH memory may be about 60 Kb; however, it is contemplated that any amount of FLASH may be used depending on the requirements per application.

In some illustrative examples, the non-volatile memory 334 may be configured to have at least two portions including a first portion that is the equivalent of ROM and a second portion that is the equivalent of EEPROM. The first portion of non-volatile memory 334, often called the firmware portion, may be used to store at least in part one or more execution modules, such as, for example, a function block engine. In some cases, this portion of the non-volatile memory 334 may be programmed at the factory, and not subsequently changed. Additionally, the one or more execution modules (e.g., function block engine) stored in the firmware portion may execute, in some cases, one or more function blocks also stored in the non-volatile memory 334.

The second portion of the non-volatile memory 334 may include application configuration modules or data, including for example, a block execution list. In some cases, the non-volatile memory 334 in this second portion may be divided further to contain segments of data. This portion of the non-volatile memory 334 may be capable of being reconfigured post factory, such as during installation of the controller into an HVAC system in a building or structure. In other words, in some illustrative examples, the second portion of the non-volatile memory may be field programmable. In some cases, the amount of non-volatile memory 334 allotted for the second portion may be about 5 Kb. However, it is contemplated that any amount of field programmable memory may be provided, as desired.

It is further contemplated that the non-volatile memory 334 may also have a portion dedicated for the storage of constant values. This portion of memory may be provided in, for example, the firmware portion and/or the field programmable portion, as desired.

In the illustrative microcontroller 330, the RAM 336 may be used for variable storage. In some cases, the RAM 336 may be a relatively small repository for exchanging information during execution of the one or more programs or subroutines stored in the non-volatile memory 334. The RAM 336 may also be used for hosting the operating system of the microcontroller 330 and/or the communication capabilities, such as external interfaces. In the illustrative microcontroller 330, the amount of RAM 336 included may be about 5 Kb or less, 2 Kb or less, or any other suitable amount of RAM. In some cases, the operating system and communication capabilities may consume about 1 Kb of RAM 336, leaving about 1 Kb for other functions, such as storing variables and/or other data for the one or more programs.

The CPU 332 for the illustrative microcontroller 330 may interpret and execute instructions, and may control other parts of the microcontroller 330 as desired. In some cases, the CPU 332 may include a control unit and an arithmetic-logic unit contained on a chip. The clock 340 can provide a steady stream of timed pulses for the microcontroller 330, which may be used, for example, as the internal timing device of the microcontroller 330 upon which operations may depend. The I/Os 342 can transfer data to and from the microcontroller 330 and an external component. In some cases, for each input, there may be a corresponding output process and vice versa. The A/D 338 converter can provide transformations of an analog input into a digital input format helping to enable the microprocessor to be able to read and interpret analog input signals. In some cases, a D/A converter may also be provided to allow digital signals to be provided as analog outputs, if desired.

Figure 17:
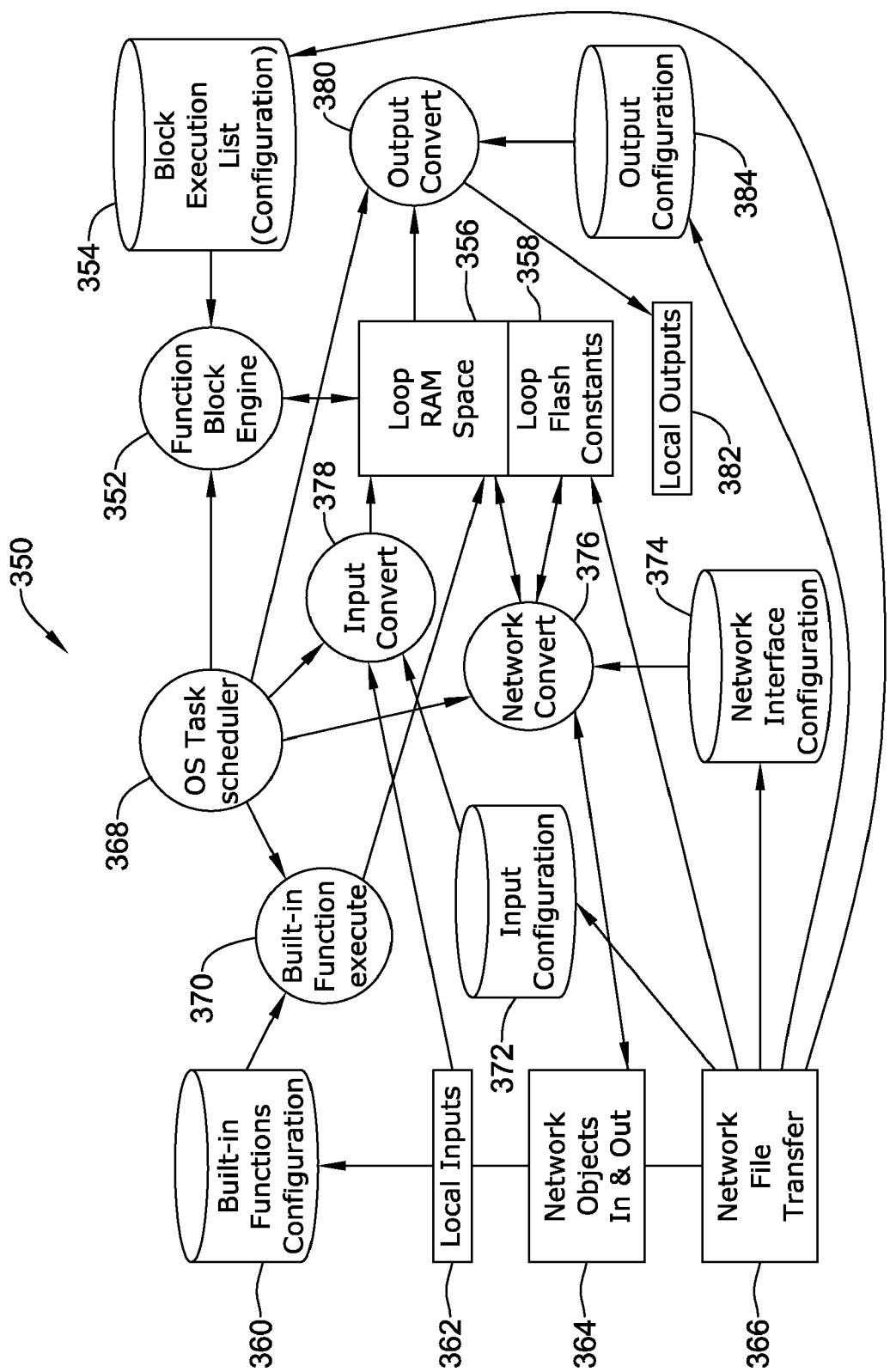
FIG. 17 is a schematic diagram of an illustrative application framework of a programmable controller.

FIG. 17 is a schematic diagram of an illustrative application framework of a programmable controller 350. The illustrative controller 350 includes one or more execution modules, one or more application configuration modules, and a parameter and variable storage space. The execution modules, as illustrated by the circles in FIG. 17, can include a function block engine 352, a built-in function execute module 370, an input convert module 378, a network convert module 376, and an output convert module 380. The application configuration modules, as illustrated by the cylinders, can include a block execution list 354, a built-in functions configuration 360, an input configuration 372, a network interface configuration 374, and an output configuration 384. The parameter and variable storage space can include a loop RAM space 356 and a loop flash constant space 358. Additionally, the illustrative controller 350 may include one or more external interfaces for communication capabilities, including a local input 362, a network file transfer 366, a network object in and out 364, and a local output 382. In some cases, the controller 350 may also include an operating system (OS) task scheduler 368.

The one or more execution modules can be resident in the non-volatile memory of the microcontroller 350, such as in FLASH memory. More specifically, in some cases, the one or more execution modules may be resident in the ROM equivalent or firmware portion of the non-volatile memory. At least one of the execution modules may include one or more programs, some of the one or more programs relating to the operation of the HVAC system. The one or more programs may include a set of sub-routines that the one or more execution modules can sequentially execute. The one or more execution modules may execute the one or more programs from the non-volatile memory.

The one or more application configuration modules can also be resident in the non-volatile memory, such as the FLASH memory, of the microcontroller 350. More specifically, the one or more application configuration modules can be resident in the EEPROM equivalent or the field programmable portion of the non-volatile memory. These modules can be pre-configured for standard HVAC applications or can be configured for custom HVAC applications, as desired. Additionally, the one or more application configuration modules can be field programmable. For example, in some cases, the one or more application configuration modules may be programmed and configured either during or after the installation of the controller into a HVAC system.

In some cases, the one or more application configuration modules can include a block execution list 354. The configuration of the block execution list 354 can direct the execution of the one or more execution modules (e.g., function blocks). In some cases, this configuration can be determined by the user or the installer. In some cases, a programming tool may be used that allows the installer to select the appropriate function blocks to create a custom block execution list 354, along with the appropriate configurations, to perform specific HVAC applications. This may help the one or more application configuration modules to be configured on a job-by-job basis, which in turn, can direct the execution of the execution modules on a job-by-job basis. In some cases, the one or more application configuration modules can include parameters or references that point to a location in memory for data, such as to the parameter and variable storage space.

The parameter and variable storage space may be provided in the controller 350 for the one or more execution modules and/or one or more application configuration modules to reference data or values to and from storage space. In an illustrative example, the variable parameter storage space, or loop RAM space 356, may be resident in RAM. This storage space can be used for the temporary storage of variables or parameters, such as function block outputs and/or temporary values from inputs, either local inputs or network inputs, of the controller 350.

Also, in the illustrative example, the constant parameter storage space, or loop flash constants 358, may be a storage space for storing constant values determined by the programmer or user. This storage space may be resident in non-volatile memory, such as the FLASH memory. Certain set points and operational parameters may be designated as constant parameter values selected by the application designer, installer, or user, and may be stored in the loop flash constants 358 storage space, if desired.

The HVAC controller 350 may also include external interfaces, such as local inputs 362 and local outputs 382. The local inputs 362 may be stored according to the input configuration 372 module executed by the input convert module 378. These modules may direct to storage the input value so that it can be used by other execution modules, such as the function block engine 352. The local outputs 382 may be configured according to the output configuration 384 as executed by the output convert module 380. This may output the value or data to an external HVAC component, such as a damper, thermostat, HVAC controller, or any other HVAC component as desired.

The OS task scheduler 368 may determine the operation and execution of the execution modules within the HVAC controller 350. For example, the execution modules may be executed in the following order: discrete inputs; including input convert 378 and network convert 376; built-in function execution 360; function block execution 352; physical output processing 380; and finally network output processing 376. However, it is contemplated that any suitable order may be used as desired.

Figure 18:
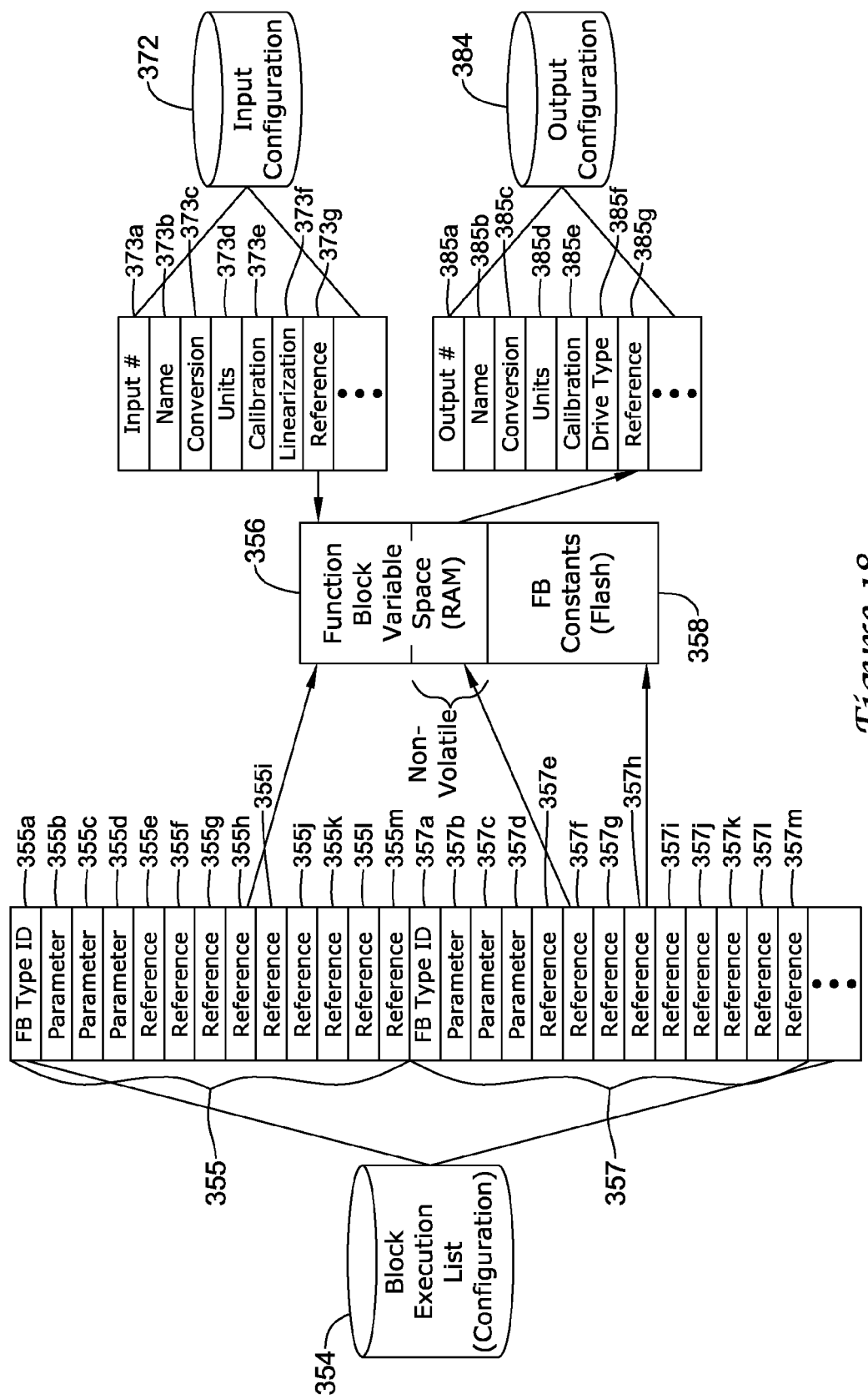
FIG. 18 is a schematic diagram of illustrative application configuration modules of FIG. 22.

FIG. 18 is a schematic diagram of some illustrative application configuration modules of FIG. 17, including an illustrative block execution list 354. As indicated above, the block execution list 354 may be resident in non-volatile memory, such as FLASH memory, and more specifically the field programmable portion of the FLASH memory, if desired. The illustrative block execution list 354 includes a listing of one or more function blocks 355 and 357, and is used to direct which function blocks and the order of execution of the function blocks, executed by the function block engine 352 according to its configuration.

The block execution list 354 may be programmed at the factory or by the user or the installer, to configure the order and type of function blocks 355 and 357 that are to be executed for the particular application. In some cases, the user or installer can have a programming tool that allows the user or installer to select the appropriate function blocks 355 and 357 and configuration to perform the desired tasks for the particular application. Thus, in some examples, the block execution list 354 configuration may be provided on a job-by-job basis for the controller. In some cases, this can allow the block execution list 354 to be programmed and configured in the field and changed depending on the desired application and function of the controller.

In the illustrative example, the Function blocks 355 and 357 are modules that perform a specific task by reading inputs, operating on them, and outputting one or more values. The function block 355 and 357 can be defined according to the block execution list 354, which can be programmed by the factory, user, installer, or application designer. In the illustrative example, function blocks 355 and 357 may be classified into six categories: analog function blocks, logic function blocks, math function blocks, control function blocks, zone control function blocks, and data function blocks.

The function blocks 355 and 357 may perform higher level functions, such as higher level functions for HVAC operations. Additionally, the controller may include some more generic function blocks for performing some basic applications, but, in many cases, these may be combined with other function blocks to perform higher level HVAC application.

Referring back to FIG. 18, function blocks 355 and 357 may include a number of function calls or pointers to particular locations in memory. In the illustrative example, each function block 355 and 357 may include a function block type 355a and 357a, and a number of parameter or references 355b-m and 357b-m. The references and parameter 355b-m and 357b-m may point to variables or constants that are stored in the parameter and variable storage space, such as in either the function block variable space 356 or the function block constant space 358. Additionally, in some cases, the reference and parameters 355b-m and 357b-m may relate to other function block outputs, inputs (either local or network), or pointers to any other data, as desired.

In one illustrative example, each function block may be about 22 bytes long. Each function block may include the function block type 355a and 357a, which can be one byte. Each function block can also include nine references or variables 355e-m and 357e-m, each reference or variable being allocated 2 byte WORD increments, totaling 18 bytes. Also, each function block 355 and 357 may include three parameter or configurations 355b-d and 357b-d, each being one byte, totaling 3 bytes. However, these sizes are merely for illustrative purposes and it is not meant to be limiting in any way.

It is contemplated that any size function blocks 355 and 357 may be used, and/or any number or size of function block types 355a and 357a, references or variables 355e-m and 357e-m, and parameters or configurations 355b-d and 357b-d. Furthermore, it is contemplated that the order may be the function block type 355a and 357a, then one parameter 355b and 357b, then the nine references 355e-m and 357e-m, and then the two remaining parameters 355c-d and 357c-d. More generally, it is contemplated that the function blocks 355 and 357 may be configured in any order and have any number of references and parameters, as desired.

The function block type 355a and 357a may be used to specify what function the function block 355 and 357 performs. Examples of functions that function block types 355a and 357a can perform may include, but are not limited to, one or more of: determining a minimum; determining a maximum; determining an average; performing a compare function; performing an analog latch function; performing a priority select function; performing a hysteretic relay function; performing a switch function; performing a select function; performing an AND/NAND function; performing an OR/NOR function; performing an exclusive OR/NOR function; performing a one shot function; performing an add function; performing a subtract function; performing a multiply function; performing a divide function; performing a square root function; performing an exponential function; performing a digital filter function; performing an enthalpy calculation function; performing a ratio function; performing a limit function; performing a reset function; performing a flow velocity calculation function; performing a proportional integral derivative (PID) function; performing a adaptive integral action (AIA) function; performing a stager/thermostat cycler function; performing a stage driver function; performing a stage driver add function; performing a rate limit function; performing a variable air volume (VAV) damper flow control function; performing an occupancy arbitrator function; performing a general set point calculator function; performing a temperature set point calculator function; performing a set temperature mode function; performing a schedule override function; performing a run time accumulate function; performing a counter function; and performing an alarm function. More generally, any suitable function may be performed by function block types 355a and 357a, as desired.

Function block references 355e-m and 357e-m may be pointers to variables that can specify inputs, outputs and/or other data that is used by the function block 355 and 357. These variables may include data inputs that are used by the function block 355 and 357 during execution. In the illustrative example, there may be a number of variable type references that may each have a unique mapping to a memory class. In the illustrative example shown in FIG. 18, there are nine different types of variables: input, parameter, input/parameter, parameter/input, output floating point number, nonvolatile output floating point number, output digital, static floating point number, and static digital. The input variables may include an input reference for the function block 355 and 357 stored in, for example, RAM memory. The parameter variable may be a value for the function block 355 and 357 to use, which in some cases, can be stored in either RAM or FLASH memory. The input/parameter variable can be a reference to either an input or a parameter, with the default being an input and may, in some cases, be stored in either FLASH or RAM memory. The parameter/input variable can be either a parameter or an input with the default being a parameter, and in some cases, can be stored in FLASH memory. The output floating point number variable may be an output of the function block 355 and 357, which can be called up as an input to another function blocks that is later executed. In some cases, the output floating point number variables may be stored in volatile RAM memory. The nonvolatile output floating point number variable may be an output of the function block 355 and 357, which can be called up as an input to another function block. In some cases, nonvolatile output floating point number variables may be stored in non-volatile RAM memory so that it retains its value on a power outage. The output digital variable may be an output of the function block 355 and 357 that can be called up as an input to another function block. In some cases, the output digital variables may be stored in RAM memory. The static floating point number variable may allow a function block 355 and 357 to use floats as static RAM variables. The static digital variable may allows a function block 55 and 57 to use digitals as static RAM variables. Additionally, there may be unused references, indicating that these references/variables are unused. More generally, it is contemplated that there may be any number of variable type references, as desired.

The output of function blocks 355 and 357 can be stored, in some cases, in the RAM for later use by the function block engine. As indicated above, and in some cases, the outputs of a function block 355 and 357 can be used as an input reference to another function block 355 and 357. Additionally, in some cases, outputs can be referenced to the input of the same function block 355 and 357, when appropriate. However, if an input is referenced to its output, there may be a delay before receiving the output signal at the input of the function block (e.g., by one cycle or iteration) due to the sequential execution of the function blocks in one illustrative example. In some cases, it may take about one second for the execution of the function blocks 355 and 357, but this should not be required.

The parameters 355b-d and 357b-d may include design time configuration information needed by the function block 355 and 357 to execute. For example, the parameters 355b-d and 357b-d may instruct a corresponding function block 355 and 357 on how to initialize itself. In the illustrative example, each function block 355 and 357 may have three parameters 355b-d and 357b-d, each including one byte of configuration information, for this purpose. However, it is contemplated that any suitable number of parameters of any suitable size may be used, as desired. In some cases, the parameter information may be entered by the application designer, the installer in the field, or the user, as desired. The parameters 355*b-d* and 357*b-d* may be configured to apply to just one specific function block type, one specific function block instance, or multiple function blocks, depending on the application. In some cases, the parameters 355*b-d* and 357*b-d* may be stored in the function block constants storage space 358, but this should not be required.

The function block variable space 356 and the function block constant space 358 may be provided in the controller. For example, the function block variable space 356, which may change, may be resident in RAM memory of the controller. In some cases, the RAM may have a portion that is volatile and a portion that is non-volatile. In the volatile RAM, upon a power disruption, the data may be lost or reset, whereas in the non-volatile RAM, upon a power disruption, the data should be retained. Thus, data that is desirable to maintain upon a power disruption may be stored in the non-volatile RAM, while other data may be stored in the volatile RAM.

The function block constant space 358 may be a constant value storage space for data, such as parameters, as determined by the application designer, installer or user. The constant value storage space may be resident in non-volatile memory, such as FLASH memory. This may include certain set points and operational parameters that are designated as constant parameter values selected by the application designer at design time, by the installer, or the user. In order to change a constant parameter, and in some cases, a new function block configuration may have to be downloaded to the controller. Additionally, in some cases, a function block description, which may be available to the user, programmer, and/or installer, can provide details as to which parameters are variable and which are fixed. Providing the function block constant space 358 may help improve the efficiency of the controller by maintaining parameters and/or variables that could be used by the function blocks 355 and 357.

External interfaces, such as the network input/output and local input/output may also use the function block 355 and 357 variable space to map data in and out of the controller. To input data into the controller, an input configuration 372 may be provided to properly configure the input so that the function blocks identified in the block execution list 354 may properly reference the data. In some cases, the input configuration 372 may include an input number 373*a*, name 373*b*, conversion 373*c*, units 373*d*, calibration 373*e*, linearization 373*f*, and references 373*g*. The input reference may map the input to the function block variable space 356 resident in the RAM memory. An output configuration 384 may also be provided to configure outputs that may be mapped out of the controller. The output configuration 384 may include an output number 385*a*, name 385*b*, conversion 385*c*, units 385*d*, calibration 385*e*, drive type 385*f*, and references 385*g*. The output reference may map data from the function block variable space 56 resident in the RAM.

Figure 19:
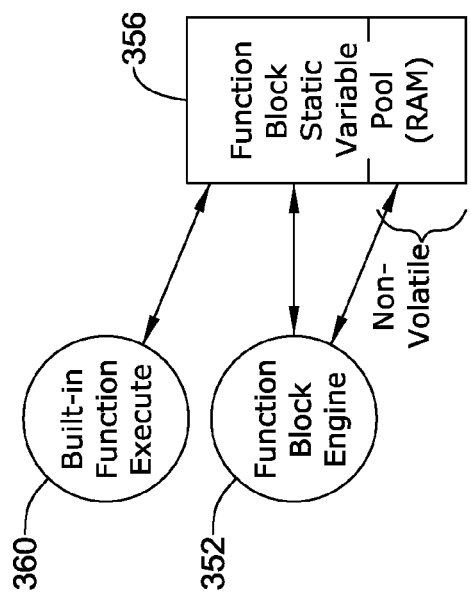
FIG. 19 is a schematic diagram of one or more execution modules of FIG. 32 including a function block engine.

FIG. 19 is a schematic diagram of the illustrative one or more execution modules of FIG. 17 including the function block engine 352. As discussed previously, the function block engine 352 may be resident in the non-volatile memory of the microcontroller, more specifically, in the firmware portion of the non-volatile memory. The function block engine 352 may include one or more programs, such as one or more HVAC application programs. The functional block engine 352 may be a set of sub-routines that can sequentially execute function blocks identified by the block execution list. In some circumstances, the function block engine 352 may execute the function blocks every second in the order provided by the block execution list.

During execution, the function block engine 352 may follow the block execution list of function blocks. This may include reading variables and/or parameters stored in the function block variable pool 356 and/or the loop flash constants 358, as directed by the function blocks and/or block execution list. The function block engine 352 may execute the function blocks from the non-volatile memory, such as FLASH memory, using the data read from the parameters and/or variables. In some cases, the function block engine 352 may also write values or data to the function block variable pool 356. In some cases, these written values are stored only temporarily in the function block variable pool 356 for use in the execution of other function blocks or as outputs of the controller.

The function block engine 352 may allow the application designer to program the controller to perform a wide variety of functions, such as HVAC functions. The function block engine 352 sequentially may execute each function block that the application designer has configured in the block execution list. In some cases, the inputs to the function blocks may be referenced from the function block variable pool 356 that may be resident in RAM. In some cases, there may only be a small stack space in the function block variable pool 356, which could be reused by the function blocks for local, temporary variable storage. Additionally, in some cases, local physical and network inputs may be provided with access to the variable space.

The built-in function configuration and execute block 360 may provide a means of translating inputs (both local and network), and providing the values as variables that can be used as inputs to any or selected function blocks. In other words, in some case, the function blocks may be unaware that an input to a function block came from a physical input, a network input, a parameter, or as an output from another function block. The input from the built-in function execute block 360 may be stored in the function block variable pool 356, in some cases only temporarily, for use by the function block engine 352.

The following is an approach for a balancing procedure for a configuration tool that may be used. First is a k factor method with the following steps: 1) Set nviFlowoverride from HVO_OFF_NORMAL (0) to HVO_Maximum (7); 2) Read nciMaxFlowCoolSP and nvoBoxFlowCool and compare; wait until the nvoBoxFlowCool is within 0.5% of the nciMaxFlowCoolSP; look at nvoCmdCoolDmpPos and monitor until changes stops for 5 seconds or direction changes; 3) Read nvoBoxFlowCool and nvoCmdCoolDmpPos for stability; average nvoVelSenPressC reading over a 5 sample window after stability is reached; if the Flow is unstable, ask the users "Would you like to balance anyway?" 4) Display apparent flow (nvoBoxFlowCool) and Display Current K Factor nciKFactorCool; show the new calculated K Factor based on the equation below and ask user to proceed with new calculated K factor; (K Factor) nciKFactorCool=(user entered measured Box Flow)/sqrt([5 sample average of nvoVelSenPressc]−nvoPressOffsetC); and 5) Set nviFlowoverride from HVO_Maximum (7) to HVO_OFF_NORMAL (0); (optional) check minimum flow if desired.

Next is a min/max method with the following steps: 1) Set nviFlowoverride from HVO_OFF_NORMAL (0) to HVO_Maximum (7); 2) Read nciMaxFlowCoolSP and nvoBoxFlowCool and compare; wait until they are within control range of algorithm; look at nvoCmdCoolDmpPos and monitor until changes stops for 5 seconds or direction changes; 3) Read nvoBoxFlowCool and nvoCmdCoolDmpPos for stability; average nvoVelSenPressC readings over a 5 sample window after stability is reached; if the Flow is unstable, ask the user "Would you like to balance anyway?" 4) Display apparent flow (nvoBoxFlowCool) and request input for actual max flow; enter in value in nciMeasMaxFlowC; 5) Set nviFlowOverride from HVO_OFF_NORMAL (0) to HVO_Minimum(7); 6) Read nciOccMinFlowCSP and nvoBoxFlowCool and compare; wait until they are within control range of algorithm; look at nvoCmdCoolDmpPos and monitor until changes stops for 5 seconds or direction changes; if the Flow is unstable, ask the user "Would you like to balance anyway?" 7) Read nvoBoxFlowCool and nvoCmdCoolDmpPos for stability; average readings over a 5 sample window after stability is reached; if the Flow is unstable, ask the user, "Would you like to balance anyway?" 8) Display apparent flow (nvoBoxFlowCool) and request input for actual min flow; enter in value in nciMeasMinFlowC; and 9) Set nviFlowoverride from HVO_Minimum(7) to HVO_OFF_NORMAL (0).

The following presents a simple work bench arrangement of the required hardware and the associated wiring connections to configure Excel™ 10 W775D, F Controllers (by Honeywell International Inc.). One may proceed as in the following: 1) With power disconnected to the housing subbase, insert the controller circuit board (contained in the housing cover) into the subbase unit; 2) Apply power to the controller, and insert the Serial Interface cable into the jack on either the Excel 10 W7751D or F Controllers; 3) Use the CARE/E-Vision™ PC tools to configure the controller (See the CARE E-Vision™ User's Guides, forms 74-5587 and 74-2588, for further details), use the ID number sticker on the controller or press the bypass button on the wall module; 4) When configuration is completed, power down and remove the W7751D, F from the subbase, mark the controller with the Plant name or location reference so the installer knows where to install each controller in the building; 5) Repeat with next W7751D, F to be configured; and 6) The data file used for this configuration should be used at the job site so the commissioning data matches the controllers.

One may do configuring in the field. If the controllers were installed at the site, the procedure to assign the node numbers to the Excel™ 10 VAV Controller may be as in the following: 1) Instruct the installer to remove the ID sticker from each controller during installation and to affix it to either the job blueprint at the appropriate location or to a tabulated list, be sure the installer returns these prints to the application engineer after the controllers are installed; 2) Connect to the E-Bus with the CARE™ PC tool; and 3) Proceed to configure the W7751 (using the job prints for location reference for the controllers) by following the standard CARE™ procedures.

One may configure a Zone Manager. The Q7750A Excel™ 10 Zone Manager may send out a one-time LonWorks™ message containing its 48-bit Neuron™ ID after any power-up WARMSTART™ or when the Excel™ 10 Zone Manager is reset by pressing the reset button. It may be important to note that pressing the reset button on the Excel™ 10 Zone Manager may cause all application files in the Q7751, including the C-Bus setup, to be lost. The LonWorks™ message is sent out one time and only on the E-Bus, not on the B-Port. The message may be the same as the one generated after pressing the service pin pushbutton available on Excel™ 10 VAV Controllers and also via the wall module bypass pushbutton. The CARE™ commission tool (E-Vision) can use this message to assign the node address.

The Assign ID procedure is the same as for an Excel™ 10 VAV Controller except, instead of pressing the bypass button, the reset button should be pressed or the power must be cycled (down then up) on the Q7750A Excel™ 10 Zone Manager.

The following is pertinent to Sensor Calibration. The space temperature and the optional resistive inputs may be calibrated. The wall module setpoint potentiometer can not necessarily be calibrated. One may perform the sensor calibration by adding an offset value (either positive or negative) to the sensed value using E-Vision™ menus (see E-Vision™ M user's guide, form number 74-2588).

The following may be used in Air Flow Balancing for Pressure Independent applications. In addition to the ten point Flow Pickup Calibration Table, the Excel™ 10 VAV Controller may provide for 3-point (Maximum, Minimum, and Zero) Air Flow Calibration. This may allow the box to be adjusted so it can be certified that the box provides the flow rates specified by the consulting engineer. When balancing is complete, the actual flow from a box should be within 5 to 10 percent of the indicated air flow (as shown on the E-Vision™ screen). On may note that there are many sources of error in flow-hood measurements. Flow hood meters may typically attain accuracy to within plus or minus three to five percent of full flow. The error can be due to the device being out of calibration, or that it was last calibrated with a different style of diffuser. Even the operator technique may play a role in obtaining repeatable, accurate flow readings. When working with slotted diffusers, one should not use a hood, but rather use a velocity-probe type of instrument.

One may follow the diffuser manufacturer's recommendation for a procedure of how to best measure the air flow through their products. Prior to air flow balancing for the first time, perform a zero flow calibration procedure. To do so, power the Excel™ 10 VAV Controller for one hour or more before performing the procedure. Select the controller being worked on with E-Vision™ (see the E-Vision™ User's Guide, form 74-2588, for general details on using E-Vision). Due to inconsistencies in VGA display cards and modes, be sure to maximize the E-Vision™ window on the screen (by clicking the up-arrow at the top-right corner of the E-Vision™ window). This assures that all E-Vision activities are user viewable. Refer to the Air Flow balancing section in the E-Vision user's Guide form, 74-2588 for the exact procedure. As to resetting Air Flow Calibration to Factory Defaults, one may refer to the Air Flow Balancing section in the E-Vision™ user's Guide form, 74-2588 for the exact procedure.

A VAV Zeroing Procedure may include the following): 1) Manually command Damper to Closed Position; 2) Read nvoCmdCoolDmpPos until it has closed (See step 3 in K factor Balancing Procedure); 3) Command nviAutoOffsetC to true; 4) Command nviAutoOffsetC to false; and 5) Observe nvoPressOC has changed.

Figure 20:
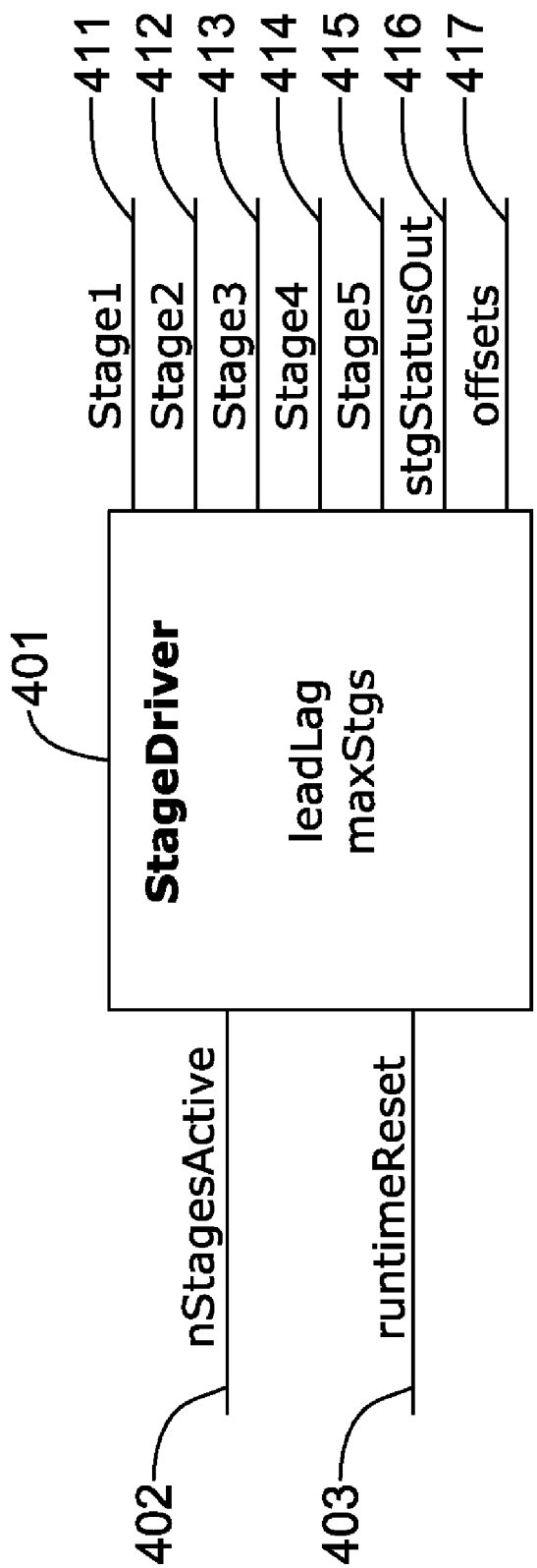
FIG. 20 is a diagram of a stage driver.

The present function block engine may have a stage driver 401 (StageDriver), as shown in FIG. 20. The StageDriverMaster function may take input number of stages active and determine which stages to energize or de-energize based on the lead/lag strategy chosen. StageDriver may work with StageDriverAdd to distribute additional stages above those provided in StageDriver. StageDriver may also maintain a nonvolatile runtime total and digital stage status information for each stage.

The configuration tool may set a runtime and stage stages offset in a single offsets variable. The offsets variable is not necessarily used as a Public Variable ID. The lower byte may store the offset in digital memory to reference the starting stage status memory index, and the upper byte may store the offset in nonvolatile memory to reference the starting runtime memory index. The stgStatusOut may be the offset to digital stage status that is used by connected StageDriverAdd blocks.

As more stages are set up during design, the configuration tool may calculate the starting address for both stage status and runtime and allocate the memory and calculate the offset from the base index that is the starting address for the runtime area and the stage status area in their respective memories.

The runtime area may be stored in non volatile floats (4 bytes). The stage status area may use a digital byte (1 byte) so 8 bits or 1 byte of information storage is used for each 8 stages assigned. The tool should assign a 1-byte extra buffer to ensure correct stage driver add functionality.

The stage status information may be accessible to drive additional stages. Additional StageDriverAdd function blocks may be use to drive stages above those provided in StageDriver up to 255 stages.

The StageDriver RAM structure may be defined as:

```
IN_ONLY nStgActive;
IN_ONLY runtimeReset;
OUT_DIG stage1;OUT_DIG stage2;OUT_DIG stage3;OUT_DIG
stage4;OUT_DIG stage5;
OUT_FLT stgStatusOut;
OUT_FLT_SAV offsets;
```

The parameters may include the following.

| UBYTE | leadLag; | //lead/lag type |
| UBYTE | maxStgs; | //maximum number of stages |

The StageDriverLoopStatic structure may be defined in the following.

UINT16 old_seconds; UINT16 oldnumstages; UINT16 seqEndPtr; UINT16 seqStartPtr

From iteration to iteration, the function block keeps track of theses items. On power up/reset these are cleared.

The memory index for Stage Status and Stage runtimer may be calculated with the following.

//baseStageStatus=VID_ControlDigitalBase+offset-
    StageStatus; and

//baseStageRuntimer=VID_ControlNonVolatileBase+
    offsetStageRuntimer;

where offsetStageStatus is the lower byte of offsets and offsetStageRuntime is the upper byte of offsets.

The Inputs may include the following. The nStagesActive (IN_ONLY) is the input number of stages to be distributed to on/off values to individual stages.

The runtimeReset (IN_ONLY) is the stage number runtime to be reset to 0 if the lead-lag parameter is set to LL_RUNTIME. 0 or unconnected may result in no reset occurring. This value should be returned to 0 to allow the reset stage number to resume counting. It might only be valid if leadLag is set to LL_RUNTIME. The stage runtime values may be only allocated and updated if the leadLag config is set to LL_RUNTIME. The runtime for each stage may be stored as a floating point number in intervals of 1 minute. The stages may be sampled once a minute and if the stage is on, then the stage runtime accumulator number for that stage can be incremented by one minute. The range of values for an integer number stored as a float, may be from −16,777,216 to 16,777,216. If the runtime is stored in minutes starting at 0 to 16,777,216, then the range of runtime may be from 0 to about 31.9 years of runtime.

The Outputs may include the following. Stage1, stage2, stage3, stage4, and stage5 (OUT_DIG) can be individual outputs that represent on or off values. These are outputs that may be turned on in a different order depending on the Lead-Lag strategy.

The stgStatusOut (OUT_FLT) may be connected from StageDriver to the StageDriverAdd block and give a floating point number combined to hold two pieces of information, which are an offset in the Common Memory to the StageBitStatus values and maximum number of stages available. This information may be used by the StageDriverAdd to find the correct offset to command which stages to turn on or off. The floating value may be converted to an integer and ANDed with 0xFF, and may give the value of the stageStatus Offset. The floating value stgStatusOut converted to an integer and right shifted 8 bits may give the byte value of the maxStages. These values may be needed to allow the StageDriverAdd to work properly. The values in stgStatusOut may be created by the StageDriver stage and no tool calculation is required.

The Offsets (OUT_FLT_SAV) may be noted. One may Store the public Variable ID to a float a value created by the tool to allocate storage memory and reference for stage status in digital memory and stage runtime in nonvolatile memory. There may be two offsets stored inside the float value, one for runtime, and one for stage status. The offset float value right-shifted 8 bits may give the number of nonvolatile float values from the beginning nonvolatile index (offset) where the runtime values are stored (one runtime value offset for each stage configured), and the offset ANDed with 0xff may give the number of digital values from the base where the stagestatus is stored (one byte per up to 8 stages configured). Each digital memory location may take up 1 byte storage in calculating the offset.

For example, if 3 nonvolatiles were already assigned and 4 digital outputs were already assigned before adding a stagedriver stage of 9 stages with runtime accumulation, then the offset float value may be 256*3+4=772.0. That means the tool may have 8 nonvolatile runtime locations starting at an offset 3 from the base of nonvolatile memory and the tool may allocate digital memory of two bytes for the stage status starting at an offset of 4 from the base of digital memory. The tool may set this float value for offsets and allocate the memory, and then stagedriver may use this information to know where to look for stagestatus and stage runtime information. This value should not be displayed to the end user.

The Float value that stores Offsets may be composed of two values. The offsetStageRuntimer (byte) may be a float value converted to an integer and shifted 8 bits—specifies the variable quantity offset to be applied to the beginning of a nonvolatile memory variable number that indicates the starting variable number used to store the individual stage runtime values. This number may be calculated by the configuration tool and is not necessarily changeable.

The offsetStageStatus (byte) may be a float value converted to an integer and ANDed with 0xFF—it specifies the variable number offset to be applied to the beginning of a digital memory area that indicates the starting variable number used to store the individual stage on/off values. This number may be calculated by the configuration tool and is not necessarily changeable. This value may be exported to other stages through the stageBitStatus output.

The parameters may be the following. The leadLag (Byte param:UBYTE) may specify whether the staging strategy should be first on last off (LL_STD=0−standard), first on first off (LL_FOFO=1−Rotating), run time accumulation where a next on is lowest runtime and a next off has highest runtime (LL_RUNTEQ=2−Runtime Accumulation). Runtime Accumulation selection may require the tool to allocate Nonvolatile memory and Set the Offsets value. For example, in a boiler control system configured for a maximum number of stages of 4, LL_STD may take the number of stages active and activate the stages in the following order: stage 1 on, then stage 1 and stage 2 on, then stage 1 on stage 2 on stage 3 on, then stage 1 on stage 2 on stage 3 on and stage 4 on. (It may be noted, whether in the present text or Figures, that stage1 and stage 1 are equivalent, with or without an upper case letter or letters, as are other like sets of terms.) When one stage is removed then it will be stage 1 on stage 2 on stage 3 on. If one more stage is removed then it may be stage 1 on stage 2 on. If one more stage is removed, then stage 1 may be on, and finally if one more stage is removed then there may be only one stage on. And again finally if one more stage is removed then no stages are necessarily on. Stage 1 may come on first and be the last stage to turn off. If one takes this same example and implements as a LL_FOFO which is rotating or First-on-first-off, then the boiler may keep track of where the starting stage is from the last cycle. Say, for example, there are no stages on and a stage is added. Then adding one stage will turn on stage 1. If another stage is added, then stage 1 is on and stage 2 is on. If one more stage is added then stage 1 is on, stage 2 is on and stage 3 is on. Now one may say that the number of stages goes from 3 to 2 so now it is time to remove a stage. Because of LL_FOFO, the first stage one turned on may be the first stage to turn off so stage 1 would go off and only stage 2 and stage 3 would be on. Then, if one were to turn off one more stage, stage 2 would go off and only stage 3 would be on. Now it one added one more stage, stage 4 would turn on in addition to stage 3. If one more stage were added (numstages=3), then stage 3 is on, stage 4 is on, and now stage 1 may turn on too.

For an example, one may take the example of LL_RUNTEQ for a sequence. Each stage may now have a runtime accumulation in minutes. It could be assumed that the 4 stages may turn on for 12 minutes. Each stage for stage 1, stage 2, stage 3, and stage 4 may be on and accumulate 12 minutes of runtime. Now it may be time to turn off one stage so all the "ON" stages are evaluated for the highest runtime and since they may be all the same. The last stage that is on and evaluated may have the highest runtime so stage 4 is turned off so stage 1 on stage 2 on and stage 3=on. Now one may run the boilers for 2 more minutes. Now stage 1 has 14 minutes runtime, stage 2 has 14 minutes runtime, stage 3 has 14 minutes runtime, and stage 4 has 12 minutes runtime. Now the number of stages requested may drop to 2 stages so stage 3 is turned off and now stage 1 on, stage 2 on, stage 3 off, and stage 4 off. So now the boilers may be run for 2 more minutes. The runtimes may now be stage 1 on=16 minutes, stage 2 on=16 minutes, stage 3=off=14 minutes, and stage 4=off=12 minutes. Now one may add one more stage so number of stages goes from 2 to 3. Now all the stages that are off may be evaluated for lowest runtime. Stage 4 may have the lowest runtime of 12 minutes so now stage 4 is turned on.

The maxStages (Byte param:UBYTE) may specify how many total stages nStagesActive can reach. MaxStages can go up to a total of 255 stages with this configuration, but additional stages could be brought in.

The Common Memory Resources (not accessible by user but accessible by function block) may include the following. Common memory resources could be second memory 735 and runtime memory 726 of FIG. 44. The stageRunTimer may be (STATIC_FL) per individual stage*number of stages. If stagingType=RUNTEQ, then individual stage runtime values may be stored in nonvolatile memory. This memory could be allocated by the configuration tool 730, operating system task, manual process, a physical hardware setting, or other mechanism or approach. The runtimes for each stage may represent the accumulated ON time in hours and be stored in this separate area of nonvolatile STATIC_FL variable memory. The public variable ID for this block of timers may be designated by the tool. The Parameter runtimeMemOffset may specify the variable number offset to the starting STATIC_FL memory to access this block. The total number of bytes allocated in Common memory may be maxStages time 4 bytes (STATIC_FL), so for 10 stages it would be 10 floats or 40 bytes. Each runtime value may be stored as a FLOAT and is sequentially stored starting with RuntimeStage1.

The stageStatus (UBYTE per 8 stages) may be a set of digital memory variables allocated by the configuration tool. The total number of bytes allocated in this stagestatus memory area may be the rounded up value of maxStages divided by 8, plus 8 bits so 18 stages would require 26 bits or 4 bytes rounded up. The stageStatus memory area may be accessed by both StageDriver and StageDriverFollower to determine if a particular stage should be on.

As noted herein, FIG. 20 is a block diagram of the stage driver (StageDriver) 401 with leadlag maxStgs. It may have inputs nStagesActive 402 and runtimeReset 403. The stage outputs may include Stage1 411, Stage2 412, Stage3 413, Stage4 414 and Stage5 415. Other outputs may include stgStatusOut 416 and offsets 417.

Figure 21:
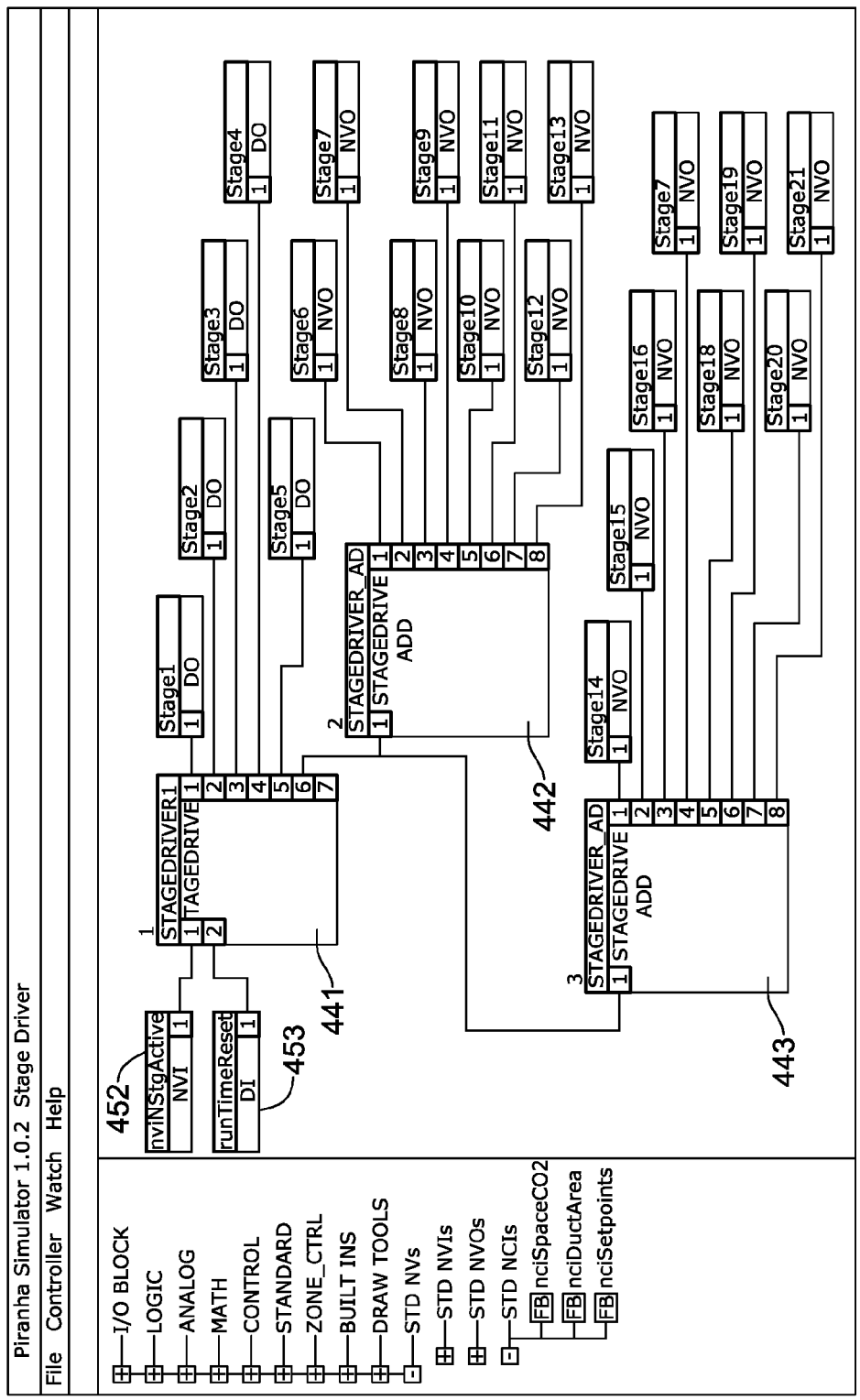
FIG. 21 is a diagram of a function block arrangement for the stage driver.

FIG. 21 is a diagram of a stage driver system 418. In the StageDriver block 441, nvinStgActive may be an input 452 that requests the number of stages to turn on. nviTimeReset may be an input 453 used to reset the individual stage runtimes. A selection for the StageDriver algorithm may allow the choice of Standard, First On/First Off (Rotating), and Runtime equalization. StageDriver Block 1 (441) may have individual stage outputs 1-5 labeled stage1-5. StageDriver Add 442 may have outputs of stages6-13. StageDriver Add 443 may have outputs of stages14-21. The Maximum stage parameter may be set to 21 stages. Output 6 of Block 441 may be stgStatusOut and be used to communicate the base memory location for the individual stage status (on/off) memory and also the maximum number of stages.

The algorithm for the StageDriver block 441 may determine which stages should be added or deleted based on the Standard, First on/First off, and runtime equalization selection. The StageDriver block may store the results of the individual stages in the stage status memory location, using 1 bit per stage. An individual Stage Driving block such as StageDriver or StageDriverAdd may access the individual bit status from the stage status memory location. In the case of Runtime equalization, there may be a separate nonvolatile memory area that is used by the algorithm in the StageDriver block that stores the runtime total. Individual runtimes may be reset by using the reset input.

StageDriverAdd Block 2 (442) may take the StgStatusOut information and the starting stage number for this stage (set to 6 in this example) and give individual outputs for stages 6-13. StageDriverAdd Block 3 (443) may take the StgStatusOut information and the starting stage number for this stage (set to 14 in this example) and give individual outputs for stages 14-21.

FIG. 22 is a table 431 of analog inputs for stage driver 401. It shows the input name, Cfg, a low and high of the range, the input value and the description for each input. FIG. 23 is a table 432 of analog outputs of stage driver 401. It shows the output name, Cfg, a low and high of the range, and the description for each output.

Aspects of the configuration may include the following. The user may specify the maximum number of stages (maxStgs) from 1 to 255. The user may specify the lead lag (leadlag) LL_STD=0–first on last off. LL_FOFO=1–first on first off. LL_RUNEQ=2–runtime equalization for lowest runtime.

If the leadlag is outside of the range of 0-2 then Stages may be initialized to off and not commanded.

Figure 24:
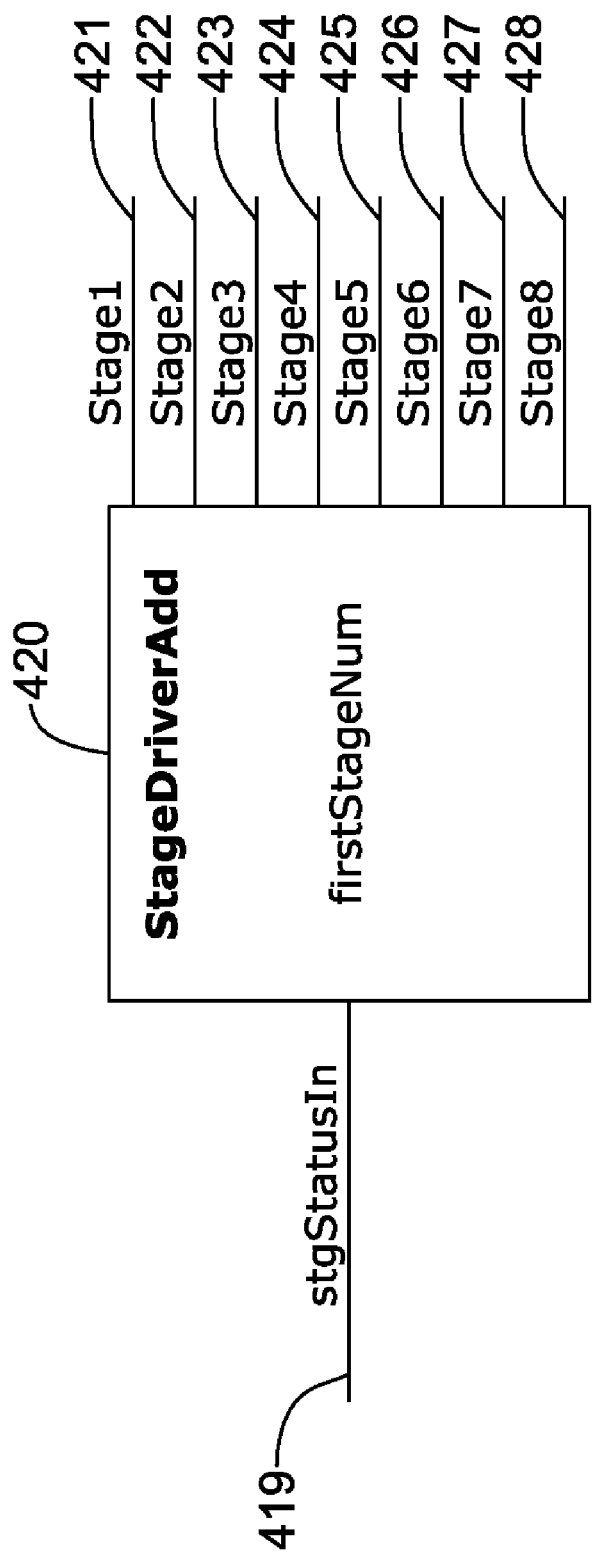
FIG. 24 is a diagram of a stage driver addition.

The stage driver addition (StageDriverAdd) 420 may be noted in FIG. 24. An input (stgStatusIn) 419, from stage driver 401 at stgStatusOut 416, may go to the stage driver addition 420 (firstStageNum). The outputs of block 420 may include Stage1 421, Stage2 422, Stage3 423, Stage4 424, Stages 425, Stage6 426, Stage7 427 and Stage8 428.

The StageDriverAdd 420 may take an input command from StageDriver 401 and determine which stages to energize or de-energize based on the lead/lag strategy chosen. StageDriverAdd 420 may work with StageDriver 401 to distribute stages. For example, if StageDriver 401 controls stage 1-6, then the first connection to StageDriverAdd 420 may be configured to handle stages 7-14 and the second StageDriverAdd may be configured to handle stages 15-22.

Inputs may be noted. The stgStatusIn 419 (IN_ONLY) may be the float value to be distributed to on/off values to individual stages. This input should come from an output of the StageDriver 401. The float should first be converted to a two byte unsigned integer. The upper byte (value right shifted 8 bits) may give the maximum number of stages used, and the lower byte (value times 0xff) may give the offset of a number of digital values to the start of the stage status location.

Parameters may include the following. The firstStageNum (BYTE_PARAM) may be the starting stage number of this block. For example, if StageDriverMaster commands stages 1-5, then firstStageNum for the next connected StageDriver-Follower would be 6. The default value of the first StageDriveAdd Block's parameter firstStageNum should be 6. It is possible to have the first stage number in the StageDriverAdd 420 overlap the stages controlled by StageDriver 401. For example, by setting firstStageNum to 1 on a StageDriverAdd may duplicate the stage 1-5 functionality of the StageDriver.

Outputs may include the following items, Stage1, stage2, stage3, stage4, stage5, stage6, stage7, and stage8 (OUT_DIG) may be individual outputs that represent on or off values. These may be outputs that are turned on in different orders depending on the leadLag strategy. FIG. 25 is a table 433 of the analog input. The table shows the input name, Cfg, the low and high of the range, the input value and description of the input. FIG. 26 is a table 434 of the analog outputs. The table may show the output name, Cfg, the low and high of the range, and a description of the output. An aspect of the configuration (Cfg) may be noted in that the user may specify the First Stage number (firstStageNum) from 1 to 255.

Figure 27:
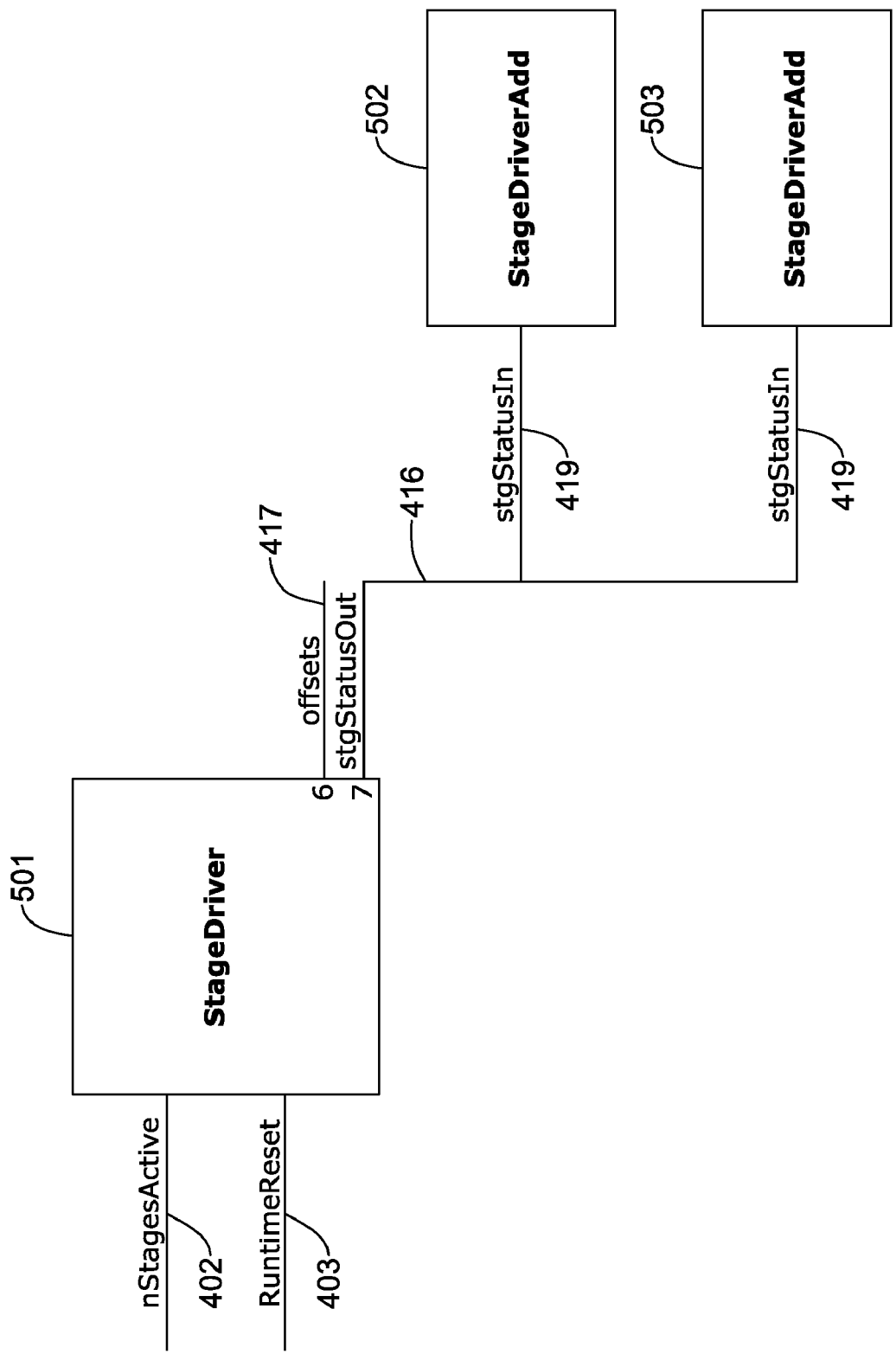
FIG. 27 shows a stage driver with several stage drivers adds.

FIG. 27 shows a stage driver 501 with outputs 416 as inputs 419 to at least two stage driver add blocks 502 and 503. Inputs to driver 501 may include n stages active 402 and runtime reset 403. Driver 501 may include tool set offsets with offset stage status (LSB) and offset stage run timer (MSB). The outputs 417 may include the offsets. Another output may include stgStatusOut 416 which may be inputs 419 to stage driver add blocks 502 and 503. The stgStatusOut 416 may equal (maxstgs×256)+offset Stage Status.

Figure 34:
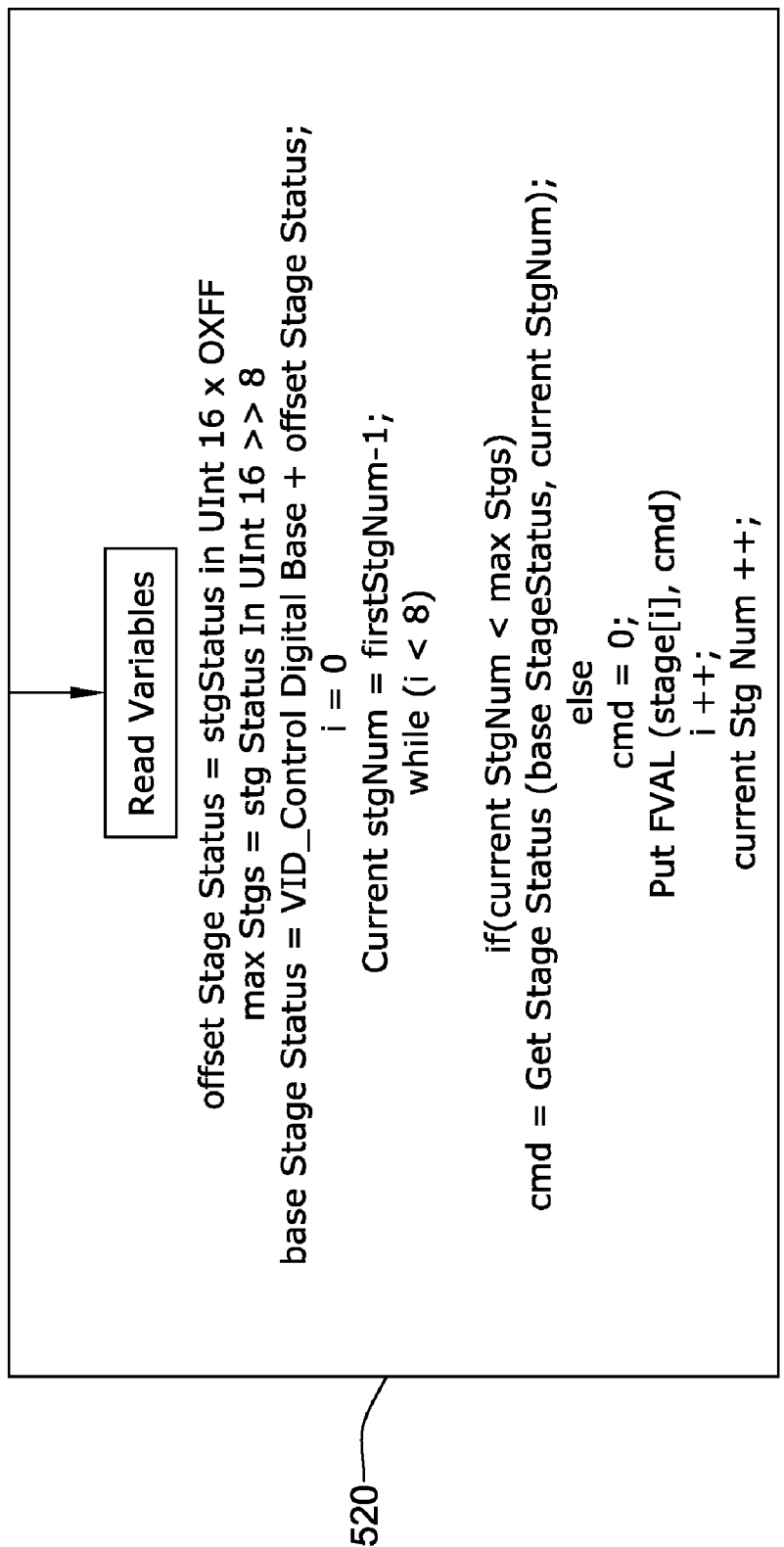
FIG. 34 is a diagram of the stage driver add.

A block diagram of a procedure for a stage driver is shown in FIGS. 28, 29, 30, 31, 32 and 33, sequentially. These Figures reveal a series of items 511, 512, 513, 514, 515, 516, 517, 518 and 519, in a serial fashion. The "no" line 545 may connect item 514 to item 516. FIG. 34 is a diagram of a procedure in an item 520 for a stage driver add.

FIGS. 28-34 show the components of the Stage Driver and StageDriverAdd algorithm. FIGS. 28-33 show the StageDriver routine, and FIG. 34 shows the StageDriverAdd algorithm.

Figure 28:
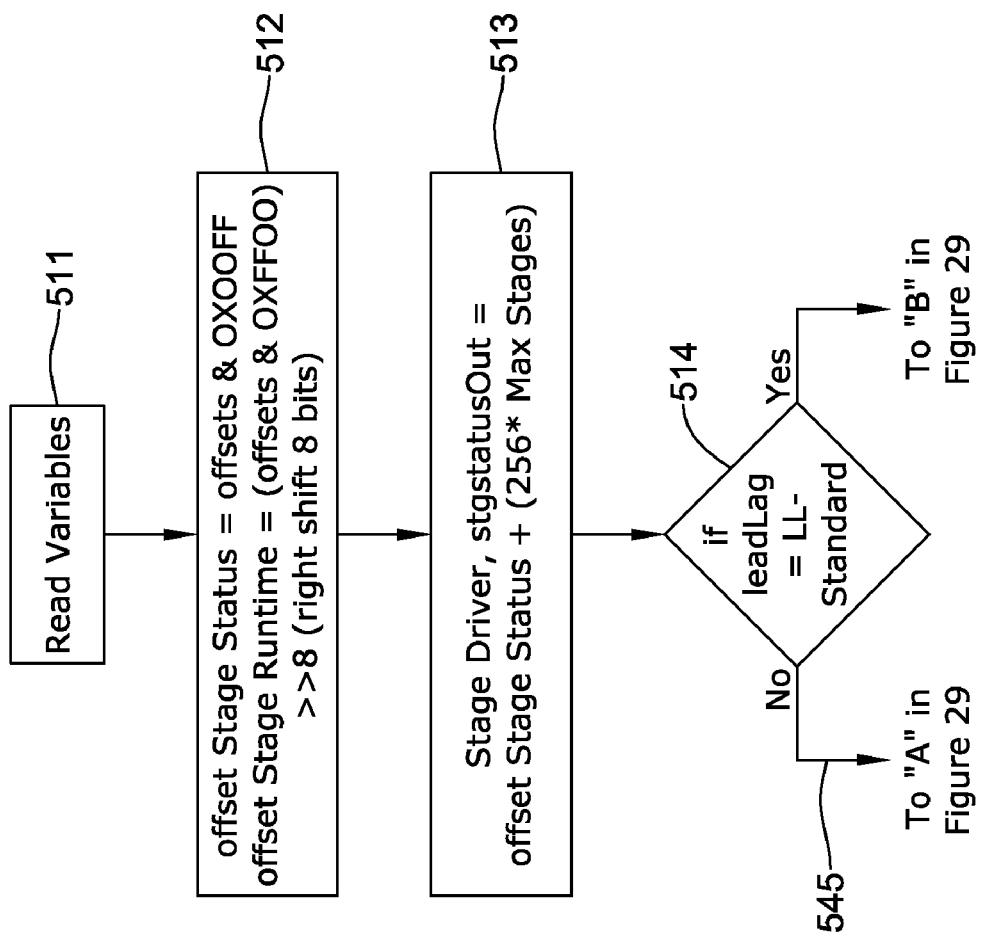

In FIG. 28, the StageDriver algorithm may start with the individual StageStatus and Stage Runtime Information pieces may be extracted from the offsets variable. The value in the offsets variable may be assigned by the configuration tool at design time. The stgStatusOut value used by other StageDriverAddStages may be combined from the MaxStage parameter and the OffsetStageStatus derived from the previous calculation.

Figure 29:
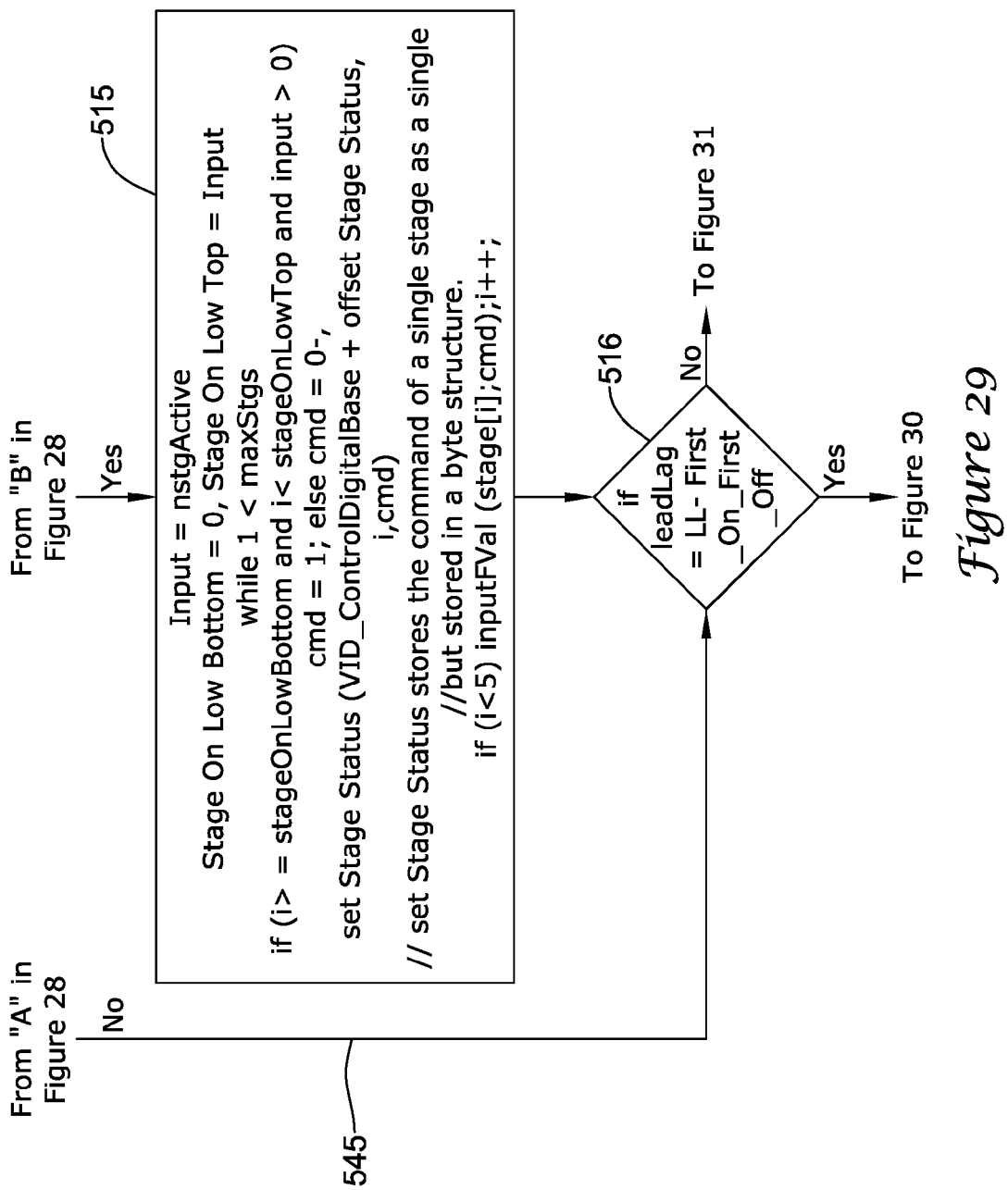

FIG. 29 shows the standard Lead/lag procedure which turns on stages up to the input number of stages and leaves the rest off. The actual on/off commands may be stored in the stage status memory location with one stage stored per bit. The function SetStageStatus may have the offset, stagenumber (i), and command (cmd) called for each stage. Additionally, if the value of the stages is from 1 to 5, the individual stage may be commanded to the command value stored from the previous step.

FIG. 30 shows the First on/first off (rotating) algorithm. An individual Start Pointer (SeqStartPtr) may be used to keep track of the first stage beginning point and as stages are added, the sequence End Pointer (seqEndPtr) may go up and as stages are deleted the SeqStartPtr may go up. The Stages between SeqStartPtr and SeqEndPtr may be on, and there may be wrap-around behavior based on the maximum stages requested.

Figure 31:
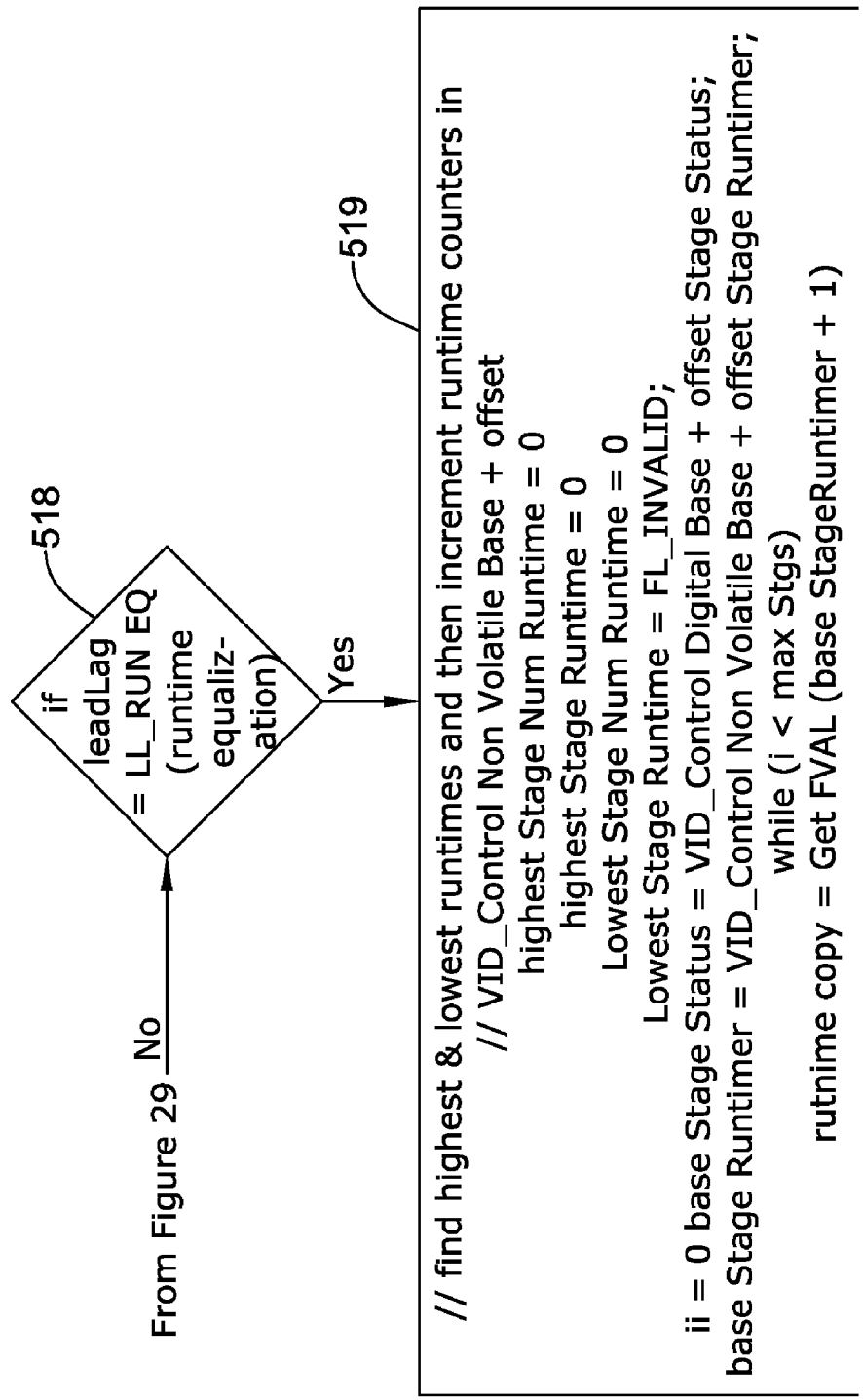

FIGS. 31, 32 and 33 show a Runtime equalization algorithm. An individual runtime value may be used to store the individual stage runtime value, using one float value per individual stage. As the algorithm goes through each individual stage, the value of each stage runtime may be compared to the highest stage runtime and lowest stage runtime found so far. If the individual stage is on (determined by a function Get StageStatus), then the runtime for that on stage may be compared against the highest stage runtime found so far. After all the stages have been cycled through, the stage with the highest runtime may be the candidate to be turned off. Similarly, all the stages that are off may be cycled through and each individual stage runtime may be compared against the lowest stage runtime found so far. After all the stages have been cycled through, the stage with the lowest runtime may be the candidate to be turned off. One stage per execution can change status with the runtime selection.

A runtime reset routine may allow an individual stage to be set to zero from the function block. Other memory access methods may allow individual setting of the runtime values.

FIG. 34 shows the Stagedriver Add routine. This routine may determine the individual stage status offset values where the stage information is stored and the max stages information from the stgStatusIn which is a connected valued from the StageStatus block. Individual stages on and off information may be determined from the GetStageStatus Function call. Each individual stage value may be commanded through the PutFVal function call.

FIG. 28 shows that the variables may be read at block 511. Then in block 512, off Stage Status=offsets & OX00FF, and offset Stage Runtime=(offsets & OXFF00)>>8 (right shift 8 bits). After block 512 is block 513 indicates Stage driver, stgstatusOut=offset Stage Status+(256*Max Stages. From block 513 goes an output to a decision diamond symbol 514 which asks if leadLag=LL−Standard. If the answer is No, the one goes to a decision diamond symbol 516 in FIG. 29, which asks if leadLag=LL−First_On_First_Off. If the answer from symbol 514 is yes, then one goes to block 515 of FIG. 29.

Block 515 may indicate, Input=nstgActive, Stage On Low Bottom=0, Stage On Low Top=Input while 1<maxStgs. Also, if (i.=stageOnLowBottom and i<stageOnLowTop and inout>0), cmd=1; else cmd=0; set Stage Status VID_Control- DigitalBase+offset Stage status, i, cmd). Then set Stage Status stores the command of a single stage as a single bit stored in a byte structure. If (i<5) inputFVal (stage[i]; cmd); i++. An output from block 515 may go to the decision diamond symbol 516. If an answer from symbol 516 is yes, the one may go to block 517 of FIG. 30. At block 517, Input=nstgActive, if (input c old num stages), diff=oldnumstages), stg=diff+oldmunstages−input, stg=diff+seqStartprt, and oldnumstages=input i startptrTemp=seqStartptr. If (input=0) seqEndptr=seqStartprt, else seqEndptr=(seqStartptr+input−1)% maxStgs, endptrTemp=seqEndptr, i=0, while (i<max Stgs). If (i>=start ptr temp) & ci<endptrtemp), else cmd=0. SetStageStatus (VID_ControlDigitalBase+offset Stage Status, i, cmd) if (i<5) PotFVAL (stage[i] cmd), i ++.

If the answer to the question of symbol 516 is no, then one may go to a decision diamond symbol 518 which asks if leadLag=LL_RUN EQ (runtime equalization). If the answer is yes, the one may go to block 519 which may indicate, find highest & lowest runtimes and then increment runtime counters in VID_Control Non Volatile Base+offset, highest Stage Num Runtime=0, highest Stage Runtime=0, and Lowest Stage Runtime=FL_INVALID. ii=0 base Stage Status=VID_Control Digital Base+offset Stage Status, base Stage Runtimer=VID_Control Non Volatile Base+offset Stage Runtimer, while (i<max Stgs). Runtime copy=Get FVAL (base StageRuntimer+1). Continuing block 519 in FIG. 32, stage Status+Get Stage Status (base Stage Status, i). If (stageStatus), stage is On, runtime copy ++, and number Stages Counted On, ++. Put FVAL (base Stage Runtimer+i, runtime copy) if (runtime copy>=highest Stage Runtime), highest Stage Runtime=runtime copy, highest Stage NumRuntime=i. Else stage is off if (runtime copy<lowest Stage Runtime) lowest Stage Runtime=runtime Copy, Lowest Stage Num Runtime=i, Stage Runtime=Runtime copy, i++, on to FIG. 33. If (input>number Stages Counted On), Set Stage Status (base Stage Status, lowest Stage Num Runtime, 1) if (input<number Stages counted On) Set Stage Status (base Stage Status, highest Stage Num Runtime, 0), cmd Stgs. i+0, while (i<5) runtime copy=Get FVAL (base Runtime+i), Stage Status=Get Stage Status, i), put FVAL (stage [i], stage Status, i++. If (runtime reset:=0), put FVAL (base Stage Runtimer+runtime Reset−1, 0) and reset runtime value to 0 for number specified.

From block 519, one may go to block 520 of FIG. 34, where variables are read. There may be offset Stage Status=stgStatus in UInt 16×OXFF, max Stgs=stg Status In UInt 16>>8, base Stage Status=VID_Control Digital Base+offset Stage Status, i=0. Current stgNum=firstStgNum−1, while (i<8). If (current StgNum<max Stgs), cmd=Get Stage Status (base StageStatus, current StgNum), else cmd=0. Put FVAL (stage[1i], cmd), i++, and current Stg Num ++.

For a stage driver block setup, one may have a configuration tool. The configuration tool should keep track of resources allocated in the stage driver block design, such as in an illustrative example (e.g., FIG. 21).

Stage driver 1 block may use resources as in the following.

| # Control Floats = 2 | FVALS = 2 |
| # Control Digitals = 25 | DVALS = 26 |
| # Control NonVolatiles = 1 | SetPoints = 1 |
| # Flash Constants = 0 | CONST 0 |
| # Bytes Loop Static = 8 | |
| # Function Blocks = 3 | LSTAT = 8 |
| # User NVIs = 1 | |
| # User NVOs = 16 | # FB = 3 |

The following information may consist of a project summary for the stage driver.

Device Name StageDriver
Resource Useage
Control Floats = 2
Control Digitals = 25
Control NonVolatiles = 23
Flash Constants = 0
Bytes RAM pool Used = 116
Bytes Loop Static = 8
Function Blocks = 3
User NVIs = 1
User NVOs = 16

Function Block Data

| Type | | Name | | |
|------|--|------|--|--|
| STAGEDRIVER | | STAGEDRIVER1 | | |
| Wrd | Name | PVID (hex) | PVID (dec) | Value |
| 0 | nStgActive | 8000 | 32768 | 0 |
| 1 | runtimeReset | 8203 | 33283 | 0 |
| 2 | stage1 | 8204 | 33284 | 0 |
| 3 | Stage2 | 8205 | 33285 | 0 |
| 4 | stage3 | 8206 | 33286 | 0 |
| 5 | stage4 | 8207 | 33287 | 0 |
| 6 | stage5 | 8208 | 33288 | 0 |
| 7 | stgStatusOut | 8001 | 32769 | 0 |
| 8 | offsets | 8116 | 33046 | 0 |

| Byt | Name | Value |
|-----|------|-------|
| 0 | leadLag | 2 |
| 1 | maxStgs | 22 |
| 2 | spare | 0 |

| Type | | Name | | |
|------|--|------|--|--|
| STAGEDRIVER_ADD | | STAGEDRIVER_ADD2 | | |
| Wrd | Name | PVID (hex) | PVID (dec) | Value |
| 0 | stgStatusIn | 8001 | 32769 | 0 |
| 1 | stage1 | 8209 | 33289 | 0 |
| 2 | stage2 | 820A | 33290 | 0 |
| 3 | stage3 | 820B | 33291 | 0 |
| 4 | stage4 | 820C | 33292 | 0 |
| 5 | stage5 | 820D | 33293 | 0 |
| 6 | stage6 | 820E | 33294 | 0 |
| 7 | stage7 | 820F | 33295 | 0 |
| 8 | stage8 | 8210 | 33296 | 0 |

| Byt | Name | Value |
|-----|------|-------|
| 0 | firstStgNum | 6 |
| 1 | | 0 |
| 2 | spare | 0 |

| Type | | Name | | |
|------|--|------|--|--|
| STAGEDRIVER_ADD | | STAGEDRIVER_ADD3 | | |
| Wrd | Name | PVID (hex) | PVID (dec) | Value |
| 0 | stgStatusIn | 8001 | 32769 | 0 |
| 1 | stage1 | 8211 | 33297 | 0 |
| 2 | stage2 | 8212 | 33298 | 0 |
| 3 | stage3 | 8213 | 33299 | 0 |
| 4 | stage4 | 8214 | 33300 | 0 |
| 5 | stage5 | 8215 | 33301 | 0 |
| 6 | stage6 | 8216 | 33302 | 0 |
| 7 | stage7 | 8217 | 33303 | 0 |
| 8 | stage8 | 8218 | 33304 | 0 |

-continued

| Byt | Name | Value |
|---|---|---|
| 0 | firstStgNum | 14 |
| 1 | | 0 |
| 2 | spare | 0 |

User NV Configuration Data

| NV Name | Field Name | PVID (hex) | PVID (dec) | Value |
|---|---|---|---|---|
| nviNStgActive | Field1 | 8000 | 32768 | 0 |
| Stage6 | Field1 | 8209 | 33289 | N/A |
| Stage7 | Field1 | 820A | 33290 | N/A |
| Stage8 | Field1 | 820B | 33291 | N/A |
| Stage9 | Field1 | 820C | 33292 | N/A |
| Stage10 | Field1 | 820D | 33293 | N/A |
| Stage11 | Field1 | 820E | 33294 | N/A |
| Stage12 | Field1 | 820F | 33295 | N/A |
| Stage13 | Field1 | 8210 | 33296 | N/A |
| Stage14 | | 8211 | 33297 | N/A |
| Stage15 | Field1 | 8212 | 33298 | N/A |
| Stage16 | Field1 | 8213 | 33299 | N/A |
| Stage17 | Field1 | 8214 | 33300 | N/A |
| Stage18 | Field1 | 8215 | 33301 | N/A |
| Stage19 | Field1 | 8216 | 33302 | N/A |
| Stage20 | Field1 | 8217 | 33303 | N/A |
| Stage21 | Field1 | 8218 | 33304 | N/A |

It is possible to use other memory classes. The present configuration is merely an illustrative example.

Figure 35:
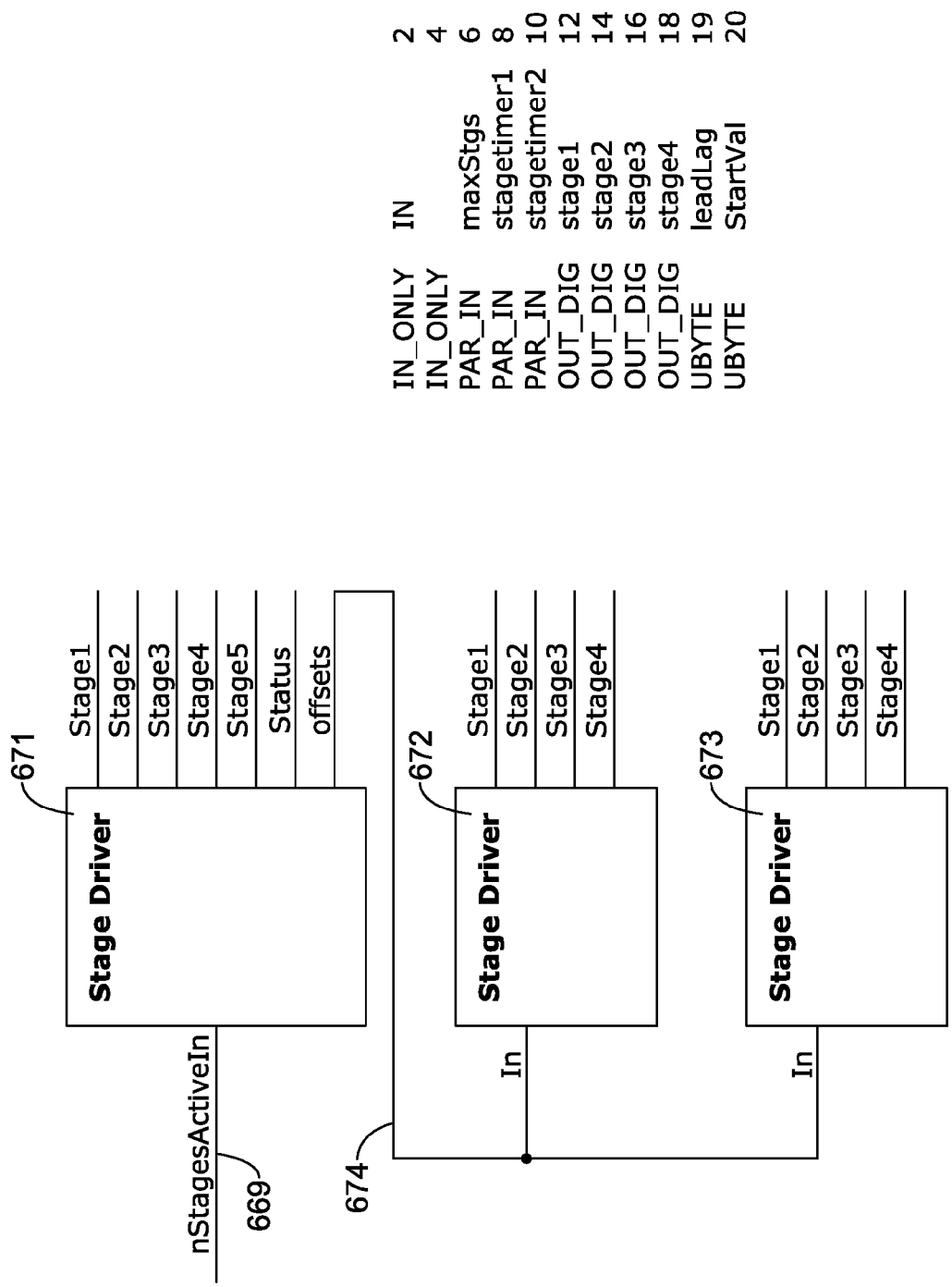

FIGS. 35-40 relate to stage drivers and various arrangements discussed herein. FIG. 35 shows a lead lag configuration with a stage driver 671 having a number of stages active input 669. Driver 671 may have a stage status output 674 to stage driver adds 672 and 673.

Figure 36:
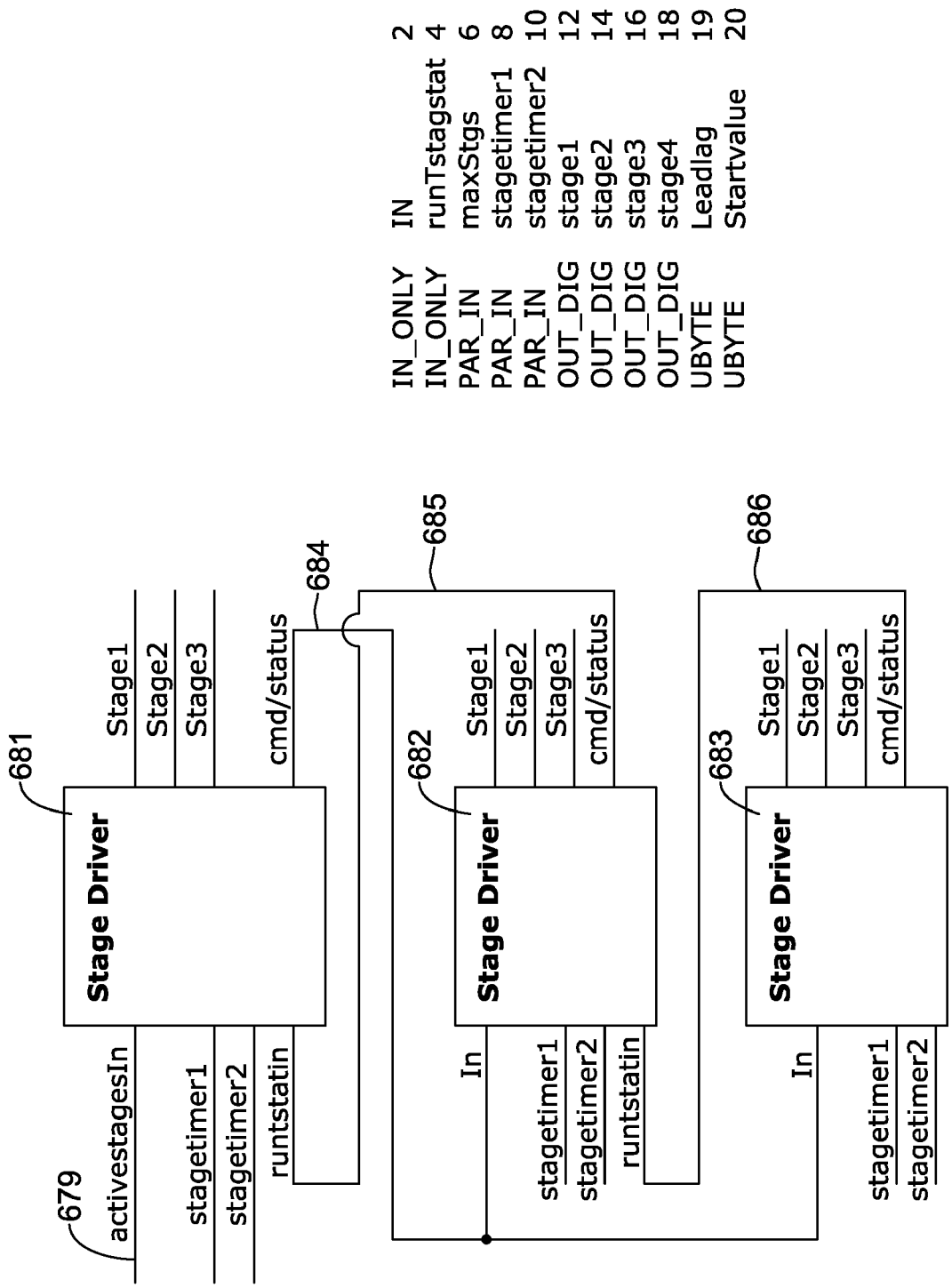

FIG. 36 shows a runtime configuration with a stage driver 681 having an active stages input 679. Driver 681 may have a cmd/status output 684 as inputs to stage drivers 682 and 683. A cmd/status output 685 from stage driver 682 may be a run time status input to stage driver 681. A cmd/status output 686 from stage driver 683 may be a run time status input to stage driver 682. Each stage driver may have stage timer inputs for the stages.

Figure 37:
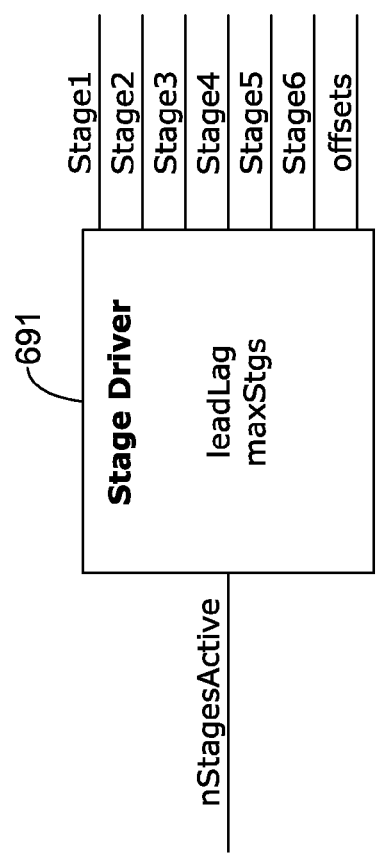

FIG. 37 is a diagram of a stage driver 691 having an n-stages active input and outputs for stages 1-6, with a lead lag max stages indicated to the driver. Driver 691 may have a stage status and offset outputs. FIG. 38 is a table 693 showing information about the inputs to driver 691.

Figure 39:
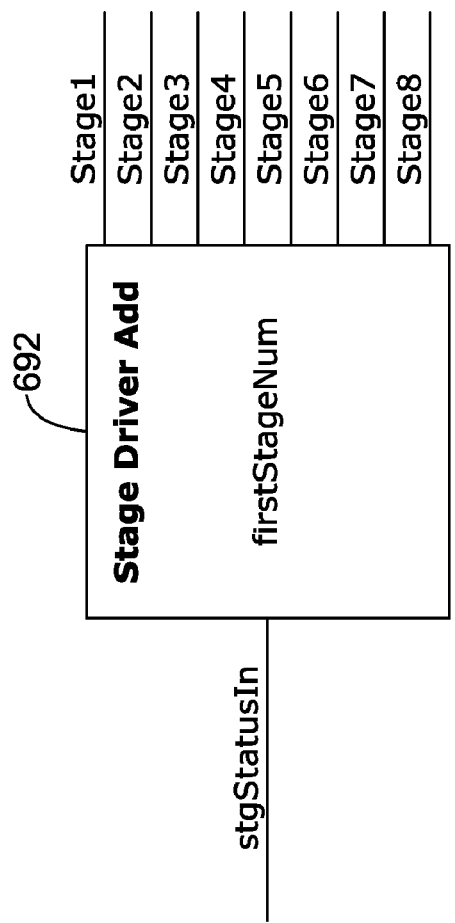

FIG. 39 is a diagram of a stage driver add 692 having a stage status input and outputs for stages 1-8, with a first stage number indicated to the driver add. FIG. 40 is a table 694 showing information about the inputs to the driver add 692.

A system may be also regarded as an "incremental stager linking with dynamic resource adaptation". In the design of programmable controls in the commercial HVAC industry, there appears a need to assign individual on/off stage outputs from a single input such as number of stages requested. The actual stages that turn on are dependent on the configuration of the stager such as first on/first off, first on last off (rotating), and runtime accumulation switching. Other configuration information may include the number of total stages maximum allowed. Furthermore, there appears the need to optimize this stage driver to use low cost microprocessor controls that have a small amount of memory and processor resources. Traditional block approaches and memory resources may require a fixed area that is an integer multiple of the maximum size of the block, for example, if 16 outputs are required, then a block of 16 or an elaborate scheme to share the information of staging and memory resources are required. The issue that this invention may address may be the ability to configure a single or multiple stages in a modular function fashion that optimizes the use of memory resources.

This invention may solve this problem though the use of connection between the source stage block and the additional stage blocks plus the use of a common memory area allocated by an intelligent tool. Furthermore, this invention may use a memory allocation scheme that dynamically assigned needed memory resources so that very little footprint beyond the minimum required is necessary. Additional stage blocks may have little knowledge or dependence on the original primary source stage block and have additional flexibility to start or duplicate stage coverage.

The StageDriver Master function takes input number of stages active and determines which stages to energize or de-energize based on the lead/lag strategy chosen. StageDriver works with StageDriverAdd to distribute additional stages above 7 stages. StageDriver drives digital output stages 1-6. It also maintains a nonvolatile runtime total and digital stage status information for each stage.

The configuration tool may set a runtime and stage stages offset in a single offsets variable. The offsets variable is not necessarily a Public Variable ID. The lower byte may store the offset in digital memory to reference the starting stage status memory index, and the upper byte may store the offset in nonvolatile memory to reference the starting runtime memory index. stgStatusOut is the offset to digital stage status that is used by connected StageDriverAdd blocks.

As more stages are set up during design, the configuration tool may calculate the starting address for both stage status and runtime and allocate the memory and calculate the offset from the base index that is the starting address for the runtime area and the stage status area in their respective memories.

Inputs may include the following. nStagesActive (IN_ONLY) is the input number of stages to be distributed to on/off values to individual stages.

Outputs may include the following. Stage1, stage2, stage3, stage4, stage5, and stage6 (OUT_DIG) are individual outputs that represent on or off values. These are outputs that are turned on in different order depending on the leadLag strategy.

stageStatusOut (OUT_FLT) is connected from StageDriver to the StageDriverFollower block and gives offset in the Common Memory to the StageBitStatus values. This information is used by the StageDriverAdd to find the correct offset to command which stages to turn on or off.

Offsets (OUT_FLT) may be used directly as an offset the Public variable ID to store two offsets, one for runtime, and one for stage status. The Actual OUT_FLT value is not necessarily used, just the two byte value stored in the Public Variable ID space. This value does not appear to refer to a Public Variable ID.

The Structure content of the 2 byte offset references for Offsets may be included the following. offsetStageRuntimer (byte) specifies the variable quantitative offset to be applied to the beginning of nonvolatile memory variable number that indicates the starting variable number used to store the individual stage runtime values. This number may be calculated by the configuration tool and is not necessarily changeable.

offsetStageStatus (byte) specifies the variable number offset to be applied to the beginning of digital memory area that indicates the starting variable number used to store the individual stage on/off values. This number may be calculated by the configuration tool and is not necessarily changeable. This value is exported to other stages through the stageBitStatus output.

Parameters may include the following. leadLag (Byte param:UBYTE) specifies whether the staging strategy should be first on last off (LL_STD=0–standard), first on first off (LL_FOFO=1–Rotating), run time accumulation where next on is lowest runtime and next off has highest runtime (LL_RUNTEQ=2–Runtime Accumulation).

maxStages (Byte param:UBYTE) specifies how many total stages nStagesActive can reach. MaxStages can go up to a total of 255 stages.

Common Memory Resources (not accessible by user but accessible by function block) may be noted. stageRunTimer (STATIC_FL per individual stage*number of stages–If stagingType=RUNTEQ, then individual stages runtimes values are stored in nonvolatile memory. This memory may be allocated by the configuration tool. There are other approaches since the configuration tool is optional. The runtimes for each stage represent the accumulated ON time in hours and are stored in this separate area of nonvolatile STATIC_FL variable memory. The public variable ID for this block of timers is designated by the tool. The Parameter runtimeMemOffset specifies the variable number offset to the starting STATIC_FL memory to access this block. The total number of bytes allocated in Common memory is maxStages time 4 bytes (STATIC_FL), so for 10 stages it would be 10 floats or 40 bytes. Each runtime value may be stored as a FLOAT and be sequentially stored starting with RuntimeStage1.

stageStatus (UBYTE per 8 stages) is a set of digital memory variables allocated by the configuration tool. The total number of bytes allocated in this stageStatus memory area may be the rounded up value of maxStages divided by 8, plus 8 bits so 18 stages would require 26 bits or 4 bytes rounded up. The stageStatus memory area may be accessed by both StageDriver and StageDriverFollower to determine if a particular stage should be on.

The StageDriverAdd function may take input command from StageDriver and determine which stages to energize or de-energize based on the lead/lag strategy chosen. StageDriverAdd works with StageDriver to distribute stages. For example if StageDriver controls stage 1-6, then the first connection to StageDriverAdd could be configured to handle stages 7-14 and the second StageDriverAdd could be configured to handle stages 15-22.

Inputs may include the following. stgStatusIn (IN_ONLY) is the offset value to be distributed to on/off values to individual stages. This input must come from the output of the StageDriver.

Parameters may include the following. firstStageNum (BYTE_PARAM) is the starting stage number of this block. For example if StageDriverMaster commands stages 1-6, then firstStageNum for the next connected StageDriverFollower would be 7. It is possible to have the first stage number in the StageDriverAdd overlap the stages controlled by StageDriver. For example by setting firstStageNum to 1 on A StageDriverAdd would duplicate the stage 1-6 functionality of StageDriver.

Outputs may include the following. Stage1, stage2, stage3, stage4, stage5, stage6, stage7, and stage8 (OUT_DIG) are individual outputs that represent on or off values. These are outputs that are turned on in different order depending on the leadLag strategy.

Stage driver—The StageDriver Master function takes input number of stages active and determines which stages to energize or de-energize based on the lead/lag strategy chosen. StageDriver works with StageDriverAdd to distribute additional stages above 7 stages. StageDriver drives digital output stages 1-6. It also maintains a nonvolatile runtime total and digital stage status information for each stage.

The configuration tool will set a runtime and stage stages offset in a single offsets variable. The offsets variable is not a Public Variable ID. The lower byte will store the offset in digital memory to reference the starting stage status memory index, and the upper byte will store the offset in nonvolatile memory to reference the starting runtime memory index. stgStatusOut is the offset to digital stage status that is used by connected StageDriverAdd blocks.

As more stages are set up during design, the configuration tool will calculate the starting address for both stage status and runtime and allocate the memory and calculate the offset from the base index that is the starting address for the runtime area and the stage status area in their respective memories.

The runtime area is stored in non volatile floats (4 bytes). The stage status area uses a digital byte (1 bytes) so 8 bits or 1 byte of information storage is used for each 8 stages assigned. The tool must assign a 1 byte extra buffer to ensure correct stage driver add functionality.

The stage status information is accessible to drive additional stages.

Additional StageDriverAdd function blocks are use to drive stages 7 up to 255.

The StageDriver ram structure is defined as:

```
IN_ONLY      nStgActive;
OUT_DIG stage1;OUT_DIG stage2;OUT_DIG stage3;OUT_DIG stage4;OUT_DIG stage5;OUT_DIG stage6;
OUT_DIG      stgStatusOut;
OUT_FLT      offsets;
UBYTE     leadLag;      //lead/lag type
UBYTE     maxStgs;      //maximum number of stages
```

The StageDriverLoopStatic structure may be defined in the following.

```
UINT16 oldnumstages; UINT16 seqEndPtr; UINT16 seqStartPtr;
```

The memory index for Stage Status and Stage runtimer is calculated in the following.

```
//baseStageStatus = VID_ControlDigitalBase + offsetStageStatus;
//baseStageRuntimer=VID_ControlNonVolatileBase + offsetStageRuntimer;
``` where offsetStageStatus is the lower byte of offsets and offsetStageRuntime is the upper byte of offsets.

Inputs may include the following.

nStagesActive (IN_ONLY) is the input number of stages to be distributed to on/off values to individual stages.

Outputs may include the following.

Stage1, stage2, stage3, stage4, stage5, and stages (OUT_DIG) are individual outputs that represent on or off values. These are outputs that are turned on in different order depending on the leadLag strategy.

stageStatusOut (OUT_FLT) is connected from StageDriver to the StageDriverFollower block and gives offset in the Common Memory to the StageBitStatus values. This information is used by the StageDriverAdd to find the correct offset to command which stages to turn on or off.

Offsets(OUT_FLT) may be used directly as an offset the Public variable ID to store two offsets, one for runtime, and one for stage status. The Actual OUT_FLT value is not used, just the two byte value stored in the Public Variable ID space. This value does not refer to a Public Variable ID.

The Structure content of the 2 byte offset references for Offsets may include the following. offsetStageRuntimer (byte) specifies the variable quantitative offset to be applied to the beginning of nonvolatile memory variable number that indicates the starting variable number used to store the individual stage runtime values. This number is calculated by the configuration tool and is not changeable.

offsetStageStatus (byte) specifies the variable number offset to be applied to the beginning of digital memory area that indicates the starting variable number used to store the individual stage on/off values. This number is calculated by the configuration tool and is not changeable. This value is exported to other stages through the stageBitStatus output.

Parameters may include the following. leadLag (Byte param:UBYTE) specifies whether the staging strategy should be first on last off (LL_STD=0–standard), first on first off (LL_FOFO=1–Rotating), run time accumulation where next on is lowest runtime and next off has highest runtime (LL_RUNTEQ=2–Runtime Accumulation).

maxStages (Byte param:UBYTE) specifies how many total stages nStagesActive can reach. MaxStages can go up to a total of 255 stages.

Common Memory Resources (not necessarily accessible by user but may be accessible by function block)

stageRunTimer (STATIC_FL per individual stage*number of stages–If stagingtype=RUNTEQ, then individual stages runtimes values are stored in nonvolatile memory. This memory is allocated by the configuration tool. The runtimes for each stage represent the accumulated ON time in hours and are stored in this separate area of nonvolatile STATIC_FL variable memory. The public variable ID for this block of timers is designated by the tool. The Parameter runtimeMemOffset specifies the variable number offset to the starting STATIC_FL memory to access this block. The total number of bytes allocated in Common memory is maxStages time 4 bytes (STATIC_FL), so for 10 stages it would be 10 floats or 40 bytes. Each runtime value is stored as a FLOAT and is sequentially stored starting with RuntimeStage1.

stageStatus (UBYTE per 8 stages) is a set of digital memory variable allocated by the configuration tool. The total number of bytes allocated in this stageStatus memory area is the rounded up value of maxStages divided by 8, plus 8 bits so 18 stages would require 26 bits or 4 bytes rounded up. The stageStatus memory area is accessed by both StageDriver and StageDriverFollower to determine if a particular stage should be on.

FIGS. 37 and 38 may be noted. Stage driver add—The StageDriverAdd function takes input command from StageDriver and determines which stages to energize or de-energize based on the lead/lag strategy chosen. StageDriverAdd works with StageDriver to distribute stages. For example if StageDriver controls stage 1-6, then the first connection to StageDriverAdd could be configured to handle stages 7-14 and the second StageDriverAdd could be configured to handle stages 15-22.

Inputs may include the following. stgStatusIn (IN_ONLY) is the offset value to be distributed to on/off values to individual stages. This input must come from the output of the StageDriver.

Parameters may include the following. firstStageNum (BYTE_PARAM) is the starting stage number of this block. For example if StageDriverMaster commands stages 1-6, then firstStageNum for the next connected StageDriverFollower would be 7. It is possible to have the first stage number in the StageDriverAdd overlap the stages controlled by StageDriver. For example by setting firstStageNum to 1 on A StageDriverAdd would duplicate the stage 1-6 functionality of StageDriver.

Outputs may include the following. Stage1, stage2, stage3, stage4, stage5, stage6, stage7, and stage8 (OUT_DIG) are individual outputs that represent on or off values. These are outputs that are turned on in different order depending on the leadLag strategy.

Figure 41:
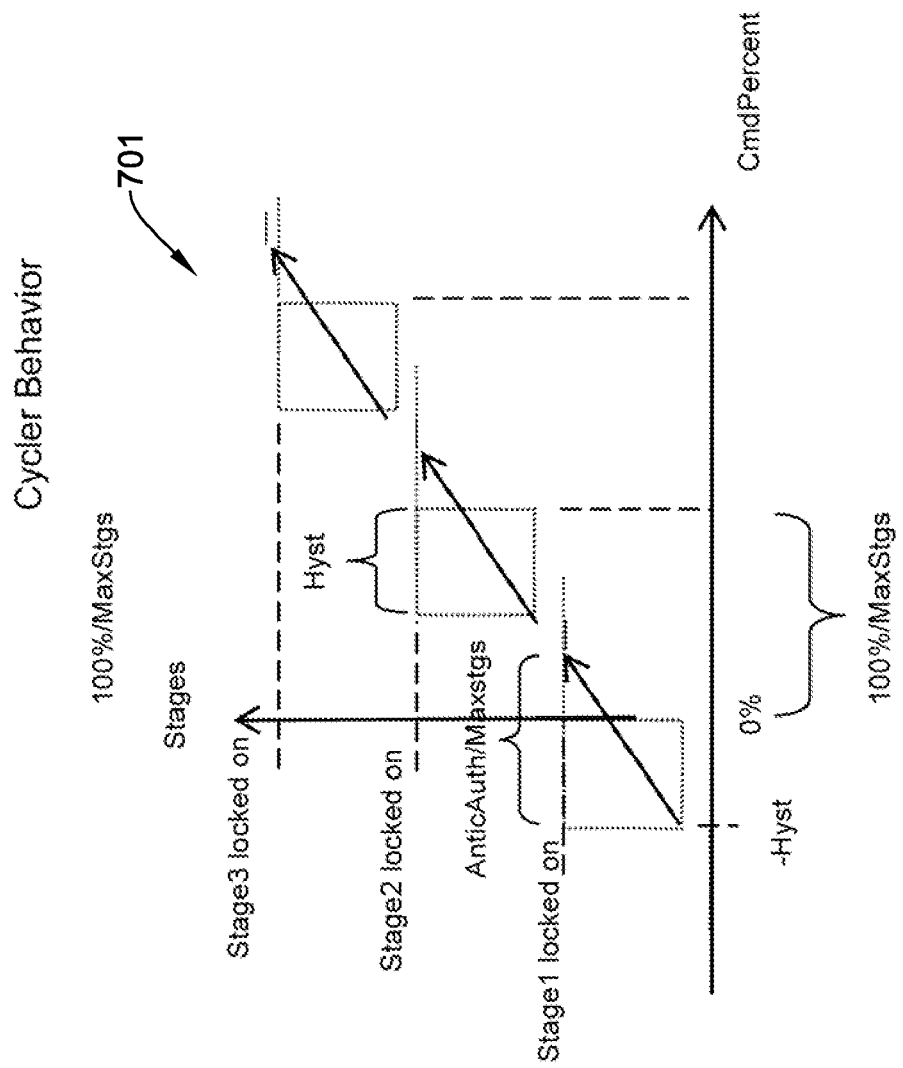
FIG. 41 shows a graph illustrative cycler behavior.

A Stager/Thermostat Cycler function may be a generic stage driver or a Thermostat Stage Cycler dependant on the value of the CPH parameter (cph=0 means stager functionality, and cph=1-60 gives thermostat cycler functionality). FIG. 41 shows a graph 701 as an example of cycler behavior.

The Cycler function is the traditional anticipator cycling algorithm used in some thermostats. Input is ether P or PI space temperature error in % (0-100). Standard (recommended) settings are cph=3 for cooling, cph=6 for heating, anticAuth=100%, hyst=100%/maxstages/2. Also, it may be noted that for multiple stage cyclers, the PID block feeding this function block should have an appropriately large throttling range to achieve smooth behavior.

Figure 42:
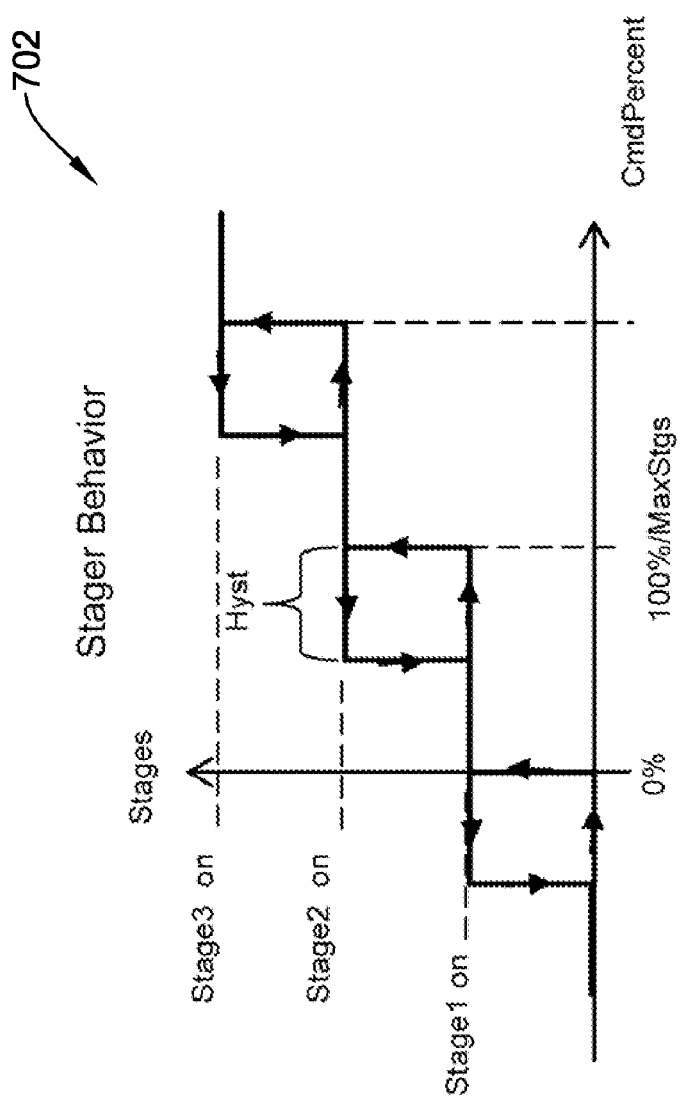
FIG. 42 is a graph of stager behavior.

The Stager Function may take a 0-100% (typically PID error) input and determine how many stages to turn on. The 0-100% input range may be divided evenly between how many stages are configured in MaxStages. The first stage may be turned on at CmdPercent>0 and off at CmdPercent<–Hyst. As indicated by a graph 702 of FIG. 42, a general criterion for turning on stage N may be $$CmdPercent > (N-1)*100\%/MaxStages.$$

For turning off stage N, a criterion may be $$CmdPercent < (N-1)*100\%/MaxStages - Hyst.$$

From iteration to iteration, the Function Block may keep track of the on timer, off timer, anticipator, and CPH multiplier. On power up/reset, the off timer and anticipator are cleared, the on timer is set equal to the inter-stage on time and the CPH multiplier is recalculated.

Figure 43:
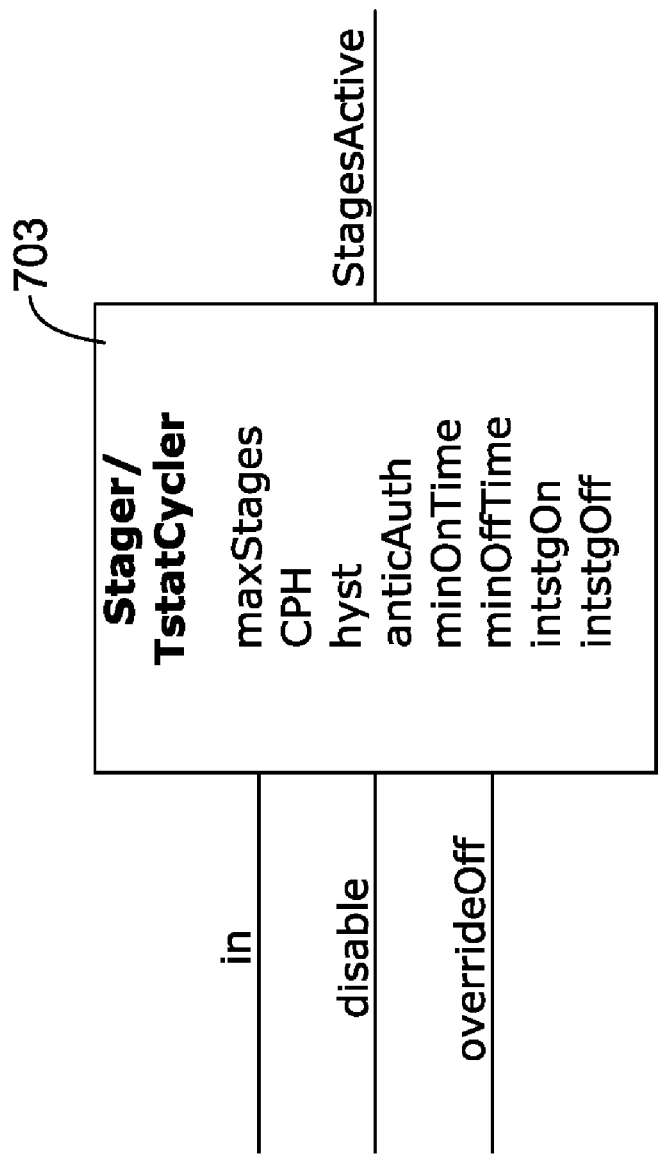
FIG. 43 is a diagram of a stager thermostat stage cycler.

When override is true, active stages are shed (turned off) based on min on and interstage timers regardless of the CmdPercent input. Output is number of stages active (0–MaxStages) which can be sent to the StageDriver function block. Configuration parameters, as noted in block 703 of FIG. 43 representing a Stager/TstatCycler, may include the following items with an associated description. MaxStages is the maximum stages available to turn on. CPH (non-zero) is max cycle rate in Cycles Per Hour when input is halfway between stages available and AnticAuth is at default value (100%). CPH=0 means the Stager logic is performed and has no other effect. Hyst is the switching differential around the switch points in % error. (Range: 0<Hyst<100/Maxstgs.) AnticAuth (cycler only (CPH !=0)) is the anticipator authority, which allows adjustment of the cycling behavior. It may represent the max amount of "fake" error in % that is input into the switching logic when MaxStages are turned on. (Range 0<AnticAuth<200.) MinOnTime is a minimum time a stage must be on once it is turned on. MinOffTime is a minimum time a stage must be off once it is turned off. InterstageOn is a minimum time before the next stage can be turned on after the previous one is turned on. InterstageOff is a minimum time before the next stage can be turned off after the previous one is turned off.

One may note the stage driver. The StageDriverMaster function takes input number of stages active and determines which stages to energize or de-energize based on the lead/lag strategy chosen. StageDriver works with StageDriverAdd to distribute additional stages above those provided in StageDriver. StageDriver may also maintain a nonvolatile runtime total and digital stage status information for each stage.

The StageDriverAdd function may take an input command from StageDriver and determine which stages to energize or de-energize based on the lead/lag strategy chosen. StageDriverAdd may work with StageDriver to distribute stages. For example if StageDriver controls stage 1-5, then the first connection to StageDriverAdd could be configured to handle stages 6-13 and the second StageDriverAdd could be configured to handle stages 14-18, more or less. If the number of stages is less, then there may be just a stage driver; or if there are more stages, then there may be more than two stage driver adds.

Figure 44:
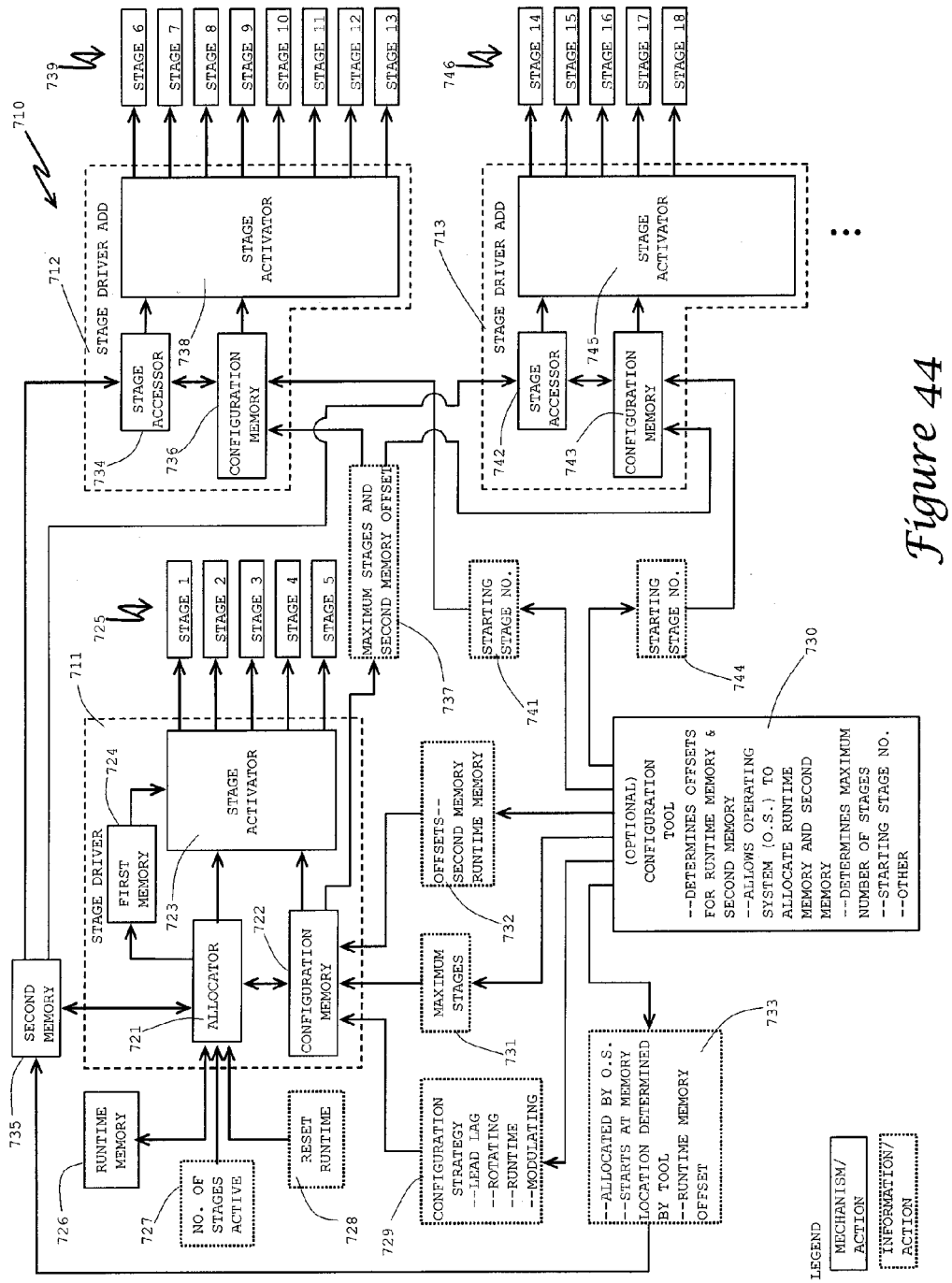
FIG. 44 is a diagram of a staging system.

FIG. 44 shows a layout of a staging system 710 having a stage driver 711, a stage driver add 712 and a stage driver add 713. There may be more or less stage driver adds in system 710. Stage driver 711 may have an allocator 721 which may allocate stages according to a pattern. A configuration memory 722 may be connected to allocator 721. Allocator 721 may be connected to a stage activator 723 and a first memory 724. The first memory 724 may be connected to the stage activator 723. The memory 724 may be local, volatile, and not be a public variable ID memory. Stage activator 723 may be connected to a number of stages 725 which may be activated by activator 723. In this example, the activator may be connected to stage 1, stage 2, stage 3, stage 4 and stage 5. A runtime memory 726 may be connected to allocator 721. The memory 726 may be nonvolatile. It may have public variable IDs. Runtime is not to be lost. A number of stages active indicator 727 may be connected to allocator 721. A reset runtime module 728 may be connected to allocator 721. Configuration memory 722 may receive a number of inputs from a configuration strategy module 729. These inputs may include configuration strategy information such as patterns of allocation of stage resources according to lead lag, rotating, runtime, modulating, and so on. The maximum number of stages to be used may be passed on from a module 731. Offsets from a module 732 related to the runtime memory 726 and a second memory 735 may be provided to the configuration memory 722. An offset may be a memory location for certain piece of information. The offsets may have several components. One may be a nonvolatile component, such as for runtime. One or more components may have public variable IDs. As to stage status, a second stage should follow a first stage, the third is to follow the second stage, and so on in a sequential manner. A similar sequential manner may be applicable to the stage runtime floats.

The second memory 735 would be applicable if one or more stage driver adds are incorporated in the system 710. A module 733 may provide information which is allocated by an operating system (O.S.) which may be connected or be tied in with network variables. Module 733 may provide information related to starts at a memory location and to runtime memory offsets.

The information from modules 729, 731, 732 and 733 may be input to the configuration memory by a user, be automatically provided by the modules, or be provided by a configuration tool 730. The configuration tool 730 may determine the offset for the runtime memory 726 and the second memory 735, allow an operating system to allocate runtime memory 726 and the second memory 735, and/or determine the runtime, stage status, maximum number of stages, and other items. The runtime memory 726 may be nonvolatile. The second memory 735 may be volatile or nonvolatile. The runtime memory 726 may be combined with the second memory 735.

Use of the configuration tool 730 may be optional. Information on lines from the configuration tool may instead be network variables or connections.

For controlling more stages in addition to those of stage driver 711, a stage driver add 712 may be brought in and connected with the stage driver. Stage drive add 712 may have a stage accessor 734 connected to the second memory 735. A configuration memory 736 may be connected to the stage accessor 734. Configuration memory 722 may provide maximum stages and second memory offset information as indication by module 737 to configuration memory 736. The offset information may include stage status and runtime. Information about a starting stage number indicated by a module 741 may be provided to configuration memory 736. Stage accessor 734 and configuration memory 736 may be connected to a stage activator 738. Stage activiator 738 may activate one or more stages 739. In this instance, stage 6, stage 7, stage 8, stage 9, stage 10, stage 11, stage 12 and stage 13 may be activated by activator 738 according to an allocation pattern provided to the activator.

If allocation and activation of more stages are needed or desired, another stage driver add 713 may be brought in and connected with the stage driver 711 and the stage driver add 712. Stage driver add 713 may be have a stage accessor 742 connected to the second memory 735. A configuration memory 743 may be connected to the stage accessor 742. Information about maximum stages and second memory offsets of module 737 may be provided to configuration memory 743. The offset information may include stage status and runtime. Information about a starting stage number indicated by a module 744 may be provided to configuration memory 743. Stage accessor 742 and configuration memory 743 may be connected to a stage activiator 745. Stage activiator 745 may activate one or more stages 746. In this instance, stage 14, stage 15, stage 16, stage 17, and stage 18 may be activated by activator 745 according to an allocation pattern provided to the activator. If allocation and activation of more stages are needed or desired, one or more stage driver adds may be brought in and connected with the stage driver 711 and stage driver adds 712 and 713. If less stages are activated or driven, then fewer or no stage driver adds may be needed.

To reiterate in other words, the stage control system 710 may have a stage number indicator connected to a stage driver. The stage driver may be connected to one or more stages. The stage driver may allocate stages with respect to the number of stages indicated by the stage number indicator and a pattern of operation.

The stage driver may have a first memory, an allocator and a stage activator. The allocator may be connected to the stage driver indicator and to the first memory. The stage activator may be connected to the first memory, the allocator and to the one or more stages. The stage activator may be an interface between the allocator, the first memory and the one or more stages. The stage activator may be for turning on or off the one or more stages according to allocator signals. Modulating of the stages may also be provided by the activator according to the allocator signals. A second memory may be connected to the stage driver, and one or more stage driver adds may be connected to the second memory and to the allocator.

The stage driver add may have an accessor connected to the second memory and to the stage allocator, and a stage activiator connected to the accessor and to the one or more stages. The accessor may be for obtaining stage status from the second memory and for driving the stage activator. There may be a third memory for holding the runtime of each stage. The stage allocator may operate with an allocation approach of first-on-last off, first-on-first off, or an amount of runtime. It may also utilize a modulating scheme with or without an allocation approach. One or more connections between various components of the system noted herein may be replaced with network variables.

Modular software may be used to implement the present system relative to stage selection and activation or driving. The modular software approach may be accomplished with the function block engine system approach described herein. The stages may be energy converting items such as building environment affecting units, boilers, heaters, coolers, humidifiers, pumps, refinery equipment, industrial machinery, and so forth. The present system may turn on or off units according to a pattern for achieving higher efficiency relative to energy usage, obtaining the greatest effect with the stages available with energy usage as a secondary or less consideration, and so on. The pattern of controlling the on time of the units and there level of output may be facilitate with modulating control. Modulating control as an allocation scheme for driving stages could or might not include the on/off allocation schemes noted herein. These schemes may be achieved with algorithms of the present system.

There may be a first memory in the stage driver. Also, there may be second memory which is a separate and independently accessible common memory. The second memory may be a non-volatile global memory. But it could be volatile at least in part. There may be float RAM memory offsets which imply or describe the volatile and non-volatile memories. The first local memory may be not necessary for a stage driver add. The stage driver add may find out the maximum number of stages and stage status information, such as the on/off condition of all stages, including those of the stage driver, from the second memory. Memory space is not necessarily needed for those stages which are not driven. Thus, memory resource usage may be kept at a minimum with the present system of stage control and driving.

An accessor obtaining stage status needs to first get a second memory location from the stage driver (i.e., a system tool that provides the starting memory location—offsets which indicate the second memory location and starting stage number. Also, a starting stage number (e.g., 44) within the stage driver add from the configuration tool, manually set up, or automatically assigned. The configuration tool is not necessary to the system. If there is no configuration tool, then the stages may be typically assigned sequentially (i.e., the next available stage) if "configured" in the stage driver add. A configuration tool may generally be needed for non-sequential assignment of stages. The accessor may find out stage status for various stages. The system needs to know the maximum stages, so it can ignore and shut off the extra stages to save energy and memory. For instance, one may look at stage 44 by checking the second memory to see what that stage is doing. The stage accessor may go to one stage at a time and give the stage activator information about the stages.

It can be noted that the allocator may include modulating information besides just that of the on/off allocation. The modulating may start at 20 percent or so, so the on/off procedure may be used, for instance, at starting at 20 percent of modulation. Modulating may be controlled by via a network. The Echelon network may be used to communicate between stages. Auto configuration may be used. The hierarchy of stages may be determined and the memory allocate in a plug and play scenario.

A first memory may be a local memory which is volatile. A second memory for storing stage status such as whether the stage is on or off may be global and volatile. A third memory for storing runtime may be global and non-volatile. The second and third memories could be combined.

An allocator may make decisions based on runtime. The allocator may increment the runtime memory for each stage. The memory may be incremented each minute, for example. If runtime is not used, then memory is not necessarily needed for the stage without used runtime. Here, the system may have a low memory footprint in that only the resources that are needed are used. There may be the flexibility to reuse the memory. There is an efficient use of resources, e.g., memory and processing, in the context that one pays for just what is needed; that is, the resources obtained are done in an incremental fashion. If resources for one stage are needed, then the resources used are only those needed for that stage, not the usage of a whole block designed for numerous stages when resources for only one additional stage are needed. If a resource is not needed then the resource may be available for other things or not be provided for the system.

The present stage driver algorithms are for optimization of efficiency in stage allocation and driving. The system may be highly extensible and automatically extensible. The system does not need to be redesigned for expansion. The system may also be highly and automatically reducible, deflatable or compressible. The system does not need to be redesigned for a decrease in size. The function block engine system may provide those features in the context of the present stage driver system. A function block may also provide patterns for turning on and off, and/or modulating stages. The function block implementation may have a small footprint, particularly in terms of memory and processing for the stage driver system. With the function block engine as described herein, one function block may be a stage driver, another may be a stage driver add, and so on. Each function block may have in/out slots, some of which are byte values or parameters that are not public variable IDs (PVIDs). A byte memory does not necessarily have PVIDs. Various kinds of memories may be used or changed relative to any of the function blocks. The stage driver system may be modular and scalable. The function blocks that may be used to implement the stage driver system may be scalable. There may be up to 255 stages available off the shelf for the driver system. However, an expansion may be provided to exceed 255 stages. The stage driver system may be programmable on-the-fly.

The stage driver and a stage driver add may typically be located in the same function block system (e.g., Piranha) or memory. If they are located over the network, the connections may be replaced with network connection. If everything were collocated in one memory, but if separated, they could be network connections such as in Echelon™, Piranha™, BACnet™, and so on. The connections may be replaced with network variables.

Appendix A shows tables of function blocks that may be applicable to the stager function block design noted herein. The first table lists the function block identification (FBID) the function block name (FBName), the field type and the in/out configuration (IOCfg). The second table lists the function block identification (FBID), the function block name (FBName), byte configuration (ByteCfg), the byte offset and comments.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

APPENDIX A

Inventor: Mike Pouchak
FUNCTION BLOCK TABLE

| FBID | FBName | FieldType | IOCfg |
|---|---|---|---|
| 62 | CYCLER | 01LoopType | |
| 62 | CYCLER | 02LoopStaticID | |
| 62 | CYCLER | 03Variable1 | IN_PAR |
| 62 | CYCLER | 04Variable2 | PAR_IN |
| 62 | CYCLER | 05Variable3 | PAR_IN |
| 62 | CYCLER | 06Variable4 | PAR_IN |
| 62 | CYCLER | 07Variable5 | PAR_IN |
| 62 | CYCLER | 08Variable6 | PAR_IN |
| 62 | CYCLER | 09Variable7 | IN_ONLY |
| 62 | CYCLER | 10Variable8 | IN_ONLY |
| 62 | CYCLER | 11Variable9 | OUT_DIG |
| 62 | CYCLER | 12EndByte1 | |
| 62 | CYCLER | 13EndByte2 | |
| 63 | STAGER | 01LoopType | |
| 63 | STAGER | 02LoopStaticID | |
| 63 | STAGER | 03Variable1 | IN_PAR |
| 63 | STAGER | 04Variable2 | PAR_IN |
| 63 | STAGER | 05Variable3 | PAR_IN |
| 63 | STAGER | 06Variable4 | PAR_IN |
| 63 | STAGER | 07Variable5 | PAR_IN |
| 63 | STAGER | 08Variable6 | PAR_IN |
| 63 | STAGER | 09Variable7 | IN_ONLY |
| 63 | STAGER | 10Variable8 | IN_ONLY |
| 63 | STAGER | 11Variable9 | OUT_DIG |
| 63 | STAGER | 12EndByte1 | |
| 63 | STAGER | 13EndByte2 | |
| 64 | STAGEDRIV | 01LoopType | |
| 64 | STAGEDRIV | 02LoopStaticID | |
| 64 | STAGEDRIV | 03Variable1 | IN_ONLY |
| 64 | STAGEDRIV | 04Variable2 | IN_ONLY |
| 64 | STAGEDRIV | 05Variable3 | OUT_DIG |
| 64 | STAGEDRIV | 06Variable4 | OUT_DIG |
| 64 | STAGEDRIV | 07Variable5 | OUT_DIG |
| 64 | STAGEDRIV | 08Variable6 | OUT_DIG |
| 64 | STAGEDRIV | 09Variable7 | OUT_DIG |
| 64 | STAGEDRIV | 10Variable8 | OUT_FLT |
| 64 | STAGEDRIV | 11Variable9 | OUT_FLT_SAV |
| 64 | STAGEDRIV | 12EndByte1 | |
| 64 | STAGEDRIV | 13EndByte2 | |
| 104 | STAGEDRIV_ADD | 01LoopType | |
| 104 | STAGEDRIV_ADD | 02LoopStaticID | |
| 104 | STAGEDRIV_ADD | 03Variable1 | IN_ONLY |
| 104 | STAGEDRIV_ADD | 04Variable2 | OUT_DIG |
| 104 | STAGEDRIV_ADD | 05Variable3 | OUT_DIG |
| 104 | STAGEDRIV_ADD | 06Variable4 | OUT_DIG |
| 104 | STAGEDRIV_ADD | 07Variable5 | OUT_DIG |
| 104 | STAGEDRIV_ADD | 08Variable6 | OUT_DIG |
| 104 | STAGEDRIV_ADD | 09Variable7 | OUT_DIG |
| 104 | STAGEDRIV_ADD | 10Variable8 | OUT_DIG |
| 104 | STAGEDRIV_ADD | 11Variable9 | OUT_DIG |
| 104 | STAGEDRIV_ADD | 12EndByte1 | |
| 104 | STAGEDRIV_ADD | | |

| FBID | FBName | ByteCfg | ByteOffset | Comments |
|---|---|---|---|---|
| 62 | CYCLER | | 0 | Loop Type |
| 62 | CYCLER | UBYTE | 1 | anticipator auth (0-200%) |
| 62 | CYCLER | | 2 | input (from PID) |
| 62 | CYCLER | | 4 | maximum stages |
| 62 | CYCLER | | 6 | minimum On time - seconds |
| 62 | CYCLER | | 8 | minimum Off time - seconds |
| 62 | CYCLER | | 10 | interstage Delay On time - seconds |
| 62 | CYCLER | | 12 | interstage Delay Off time - seconds |
| 62 | CYCLER | | 14 | override Off |
| 62 | CYCLER | | 16 | disable |
| 62 | CYCLER | | 18 | output-Number of stages |
| 62 | CYCLER | UBYTE | 20 | cycles per Hour |
| 62 | CYCLER | UBYTE | 21 | Hysteresis - note Anticipator = 4 * hyst |
| 63 | STAGER | | 0 | Loop Type |
| 63 | STAGER | UBYTE | 1 | anticipator Auth (0-200%) |
| 63 | STAGER | | 2 | input (from PID) |
| 63 | STAGER | | 4 | maximum stages |
| 63 | STAGER | | 6 | minimum On time - seconds |
| 63 | STAGER | | 8 | minimum Off time - seconds |

APPENDIX A-continued

Inventor: Mike Pouchak
FUNCTION BLOCK TABLE

| | | | | |
|---|---|---|---|---|
| 63 | STAGER | | 10 | interstage Delay On time - seconds |
| 63 | STAGER | | 12 | interstage Delay Off time - seconds |
| 63 | STAGER | | 14 | override Off |
| 63 | STAGER | | 16 | disable |
| 63 | STAGER | | 18 | output-Number of stages |
| 63 | STAGER | UBYTE | 20 | Must be Zero |
| 63 | STAGER | UBYTE | 21 | Hysteresis - note Anticipator = 4 * hyst |
| 64 | STAGEDRIV | | 0 | Loop Type |
| 64 | STAGEDRIV | UNUSED | 1 | |
| 64 | STAGEDRIV | | 2 | input (number of Stages active) |
| 64 | STAGEDRIV | | 4 | runtime reset |
| 64 | STAGEDRIV | | 6 | output-Stage 1 |
| 64 | STAGEDRIV | | 8 | output-Stage 2 |
| 64 | STAGEDRIV | | 10 | output-Stage 3 |
| 64 | STAGEDRIV | | 12 | output-Stage 4 |
| 64 | STAGEDRIV | | 14 | output-Stage 5 |
| 64 | STAGEDRIV | | 16 | output-Stage status |
| 64 | STAGEDRIV | | 18 | Internal Use Only |
| 64 | STAGEDRIV | UBYTE | 20 | STD = 0; FOFO = 1; RUNEQ = 2 |
| 64 | STAGEDRIV | UBYTE | 21 | maximum number of stages |
| 104 | STAGEDRIV_ADD | | 0 | Loop Type |
| 104 | STAGEDRIV_ADD | UNUSED | 1 | |
| 104 | STAGEDRIV_ADD | | 2 | input |
| 104 | STAGEDRIV_ADD | | 4 | output-Stage 1 |
| 104 | STAGEDRIV_ADD | | 6 | output-Stage 2 |
| 104 | STAGEDRIV_ADD | | 8 | output-Stage 3 |
| 104 | STAGEDRIV_ADD | | 10 | output-Stage 4 |
| 104 | STAGEDRIV_ADD | | 12 | output-Stage 5 |
| 104 | STAGEDRIV_ADD | | 14 | output-Stage 6 |
| 104 | STAGEDRIV_ADD | | 16 | output-Stage 7 |
| 104 | STAGEDRIV_ADD | | 18 | output-Stage 8 |
| 104 | STAGEDRIV_ADD | UBYTE | 20 | first stage enumeration |
| 104 | STAGEDRIV_ADD | UNUSED | 21 | |

What is claimed is:

1. A system for modular and flexible configuration of a shared-memory resource stage driver control system for optimizing energy usage in an energy conversion system, comprising:
   a Stage Driver for controlling one or more stages of an energy conversion system,
   one or more Stage Driver Add(s) for controlling one or more additional stages of an energy conversion system;
   a shared-memory resource for maintaining status and runtime of the one or more stages of the Stage Driver and Stage Driver Add(s);
   a function block engine for execution of stored instructions by a processor for performing the configuration, allocation, activation, and status maintenance functions of the Stage Driver and Stage Driver Add(s); and
   a configurator for automatically configuring a Stage Driver, one or more Stage Driver Add(s), a shared-memory resource, and function block engine based on a number of stages and a configuration strategy for implementation of a stage driver control system to optimize energy usage in an energy conversion system.

2. The system of claim 1, wherein the configuration strategy includes one of: lead-lag, rotating, runtime, and modulating.

3. The system of claim 1, wherein the activation pattern includes one of: first-on-last-off, first-on-first off, or amount of runtime.

4. The system of claim 1, wherein the Stage Driver comprises:
   a configuration memory for providing a maximum number of stages, a configuration strategy, and one or more shared-memory resource offsets;
   an allocator for allocating stages of the Stage Driver according to a number of active stages and the configuration strategy;
   an activator for turning on and off the one or more stages according to an activation pattern; and
   a status memory for maintaining status of the one or more stages.

5. The system of claim 1, each Stage Driver Add comprising:
   a configuration memory for providing a starting stage number and an offset to an area of a shared-memory resource;
   an activator for activating the one or more additional stages according to an activation pattern; and
   an accessor for providing access to the stage activator.

6. The system of claim 1, wherein the shared-memory resource comprises:
   shared status memory for maintaining status of the one or more stages of the one or more Stage Driver Add(s); and
   shared runtime memory for maintaining runtimes of the one or more stages of the Stage Driver and Stage Driver Add(s).

7. A method for modular and flexible configuration of a shared-memory resource stage driver control system for optimizing energy usage in an energy conversion system, comprising:
   controlling one or more stages of an energy conversion system with a Stage Driver;
   controlling one or more additional stages of an energy conversion system with one or more Stage Driver Add(s);

maintaining status and runtime of the one or more stages of the Stage Driver and Stage Driver Add(s) with a shared-memory resource;

executing of stored instructions by a processor for performing the configuration, allocation, activation, and status maintenance functions of the Stage Driver and Stage Driver Add(s) with a function block engine; and automatically configuring a Stage Driver, one or more Stage Driver Add(s), a shared-memory resource, and function block engine based on a number of stages and a configuration strategy for implementation of a stage driver control system to optimize energy usage in an energy conversion system.

8. The method of claim 7, wherein the configuration strategy includes one of: lead-lag, rotating, runtime, and modulating.

9. The method of claim 7, wherein the activation pattern includes one of: first-on-last-off, first-on-first-off, or amount of runtime.

10. The method of claim 7, wherein the Stage Driver comprises:
a configuration memory for providing a maximum number of stages, a configuration strategy, and one or more shared-memory resource offsets;
an allocator for allocating stages of the Stage Driver according to a number of active stages and the configuration strategy;
an activator for turning on and off the one or more stages according to an activation pattern; and
a status memory for maintaining status of the one or more stages.

11. The method of claim 7, each Stage Driver Add comprising:
a configuration memory for providing a starting stage number and an offset to an area of a shared-memory resource;
an activator for activating the one or more additional stages according to an activation pattern; and
an accessor for providing access to the stage activator.

12. The method of claim 7, wherein the shared-memory resource comprises:
shared status memory for maintaining status of the one or more stages of the one or more Stage Driver Add(s); and
shared runtime memory for maintaining runtimes of the one or more stages of the Stage Driver and Stage Driver Add(s).

* * * * *